United States Patent
Mittleman et al.

(10) Patent No.: US 12,033,288 B2
(45) Date of Patent: Jul. 9, 2024

(54) SMART-HOME DEVICE PLACEMENT AND INSTALLATION USING AUGMENTED-REALITY VISUALIZATIONS

(71) Applicant: Google LLC, Mountain View, CA (US)

(72) Inventors: Adam Mittleman, Redwood City, CA (US); Jason Chamberlain, Campbell, CA (US); Jacobi Grillo, San Jose, CA (US); Daniel Biran, Mountain View, CA (US); Mark Kraz, Santa Clara, CA (US); Lauren Chanen, San Francisco, CA (US); Daniel Foran, San Francisco, CA (US); David Fichou, Mountain View, CA (US); William Dong, Redwood City, CA (US); Bao-Tram Phan Nguyen, Mountain View, CA (US); Brian Silverstein, Mountain View, CA (US); Yash Modi, San Mateo, CA (US); Alex Finlayson, Mountain View, CA (US); Dongeek Shin, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/115,510

(22) Filed: Feb. 28, 2023

(65) Prior Publication Data

US 2023/0281935 A1 Sep. 7, 2023

Related U.S. Application Data

(63) Continuation of application No. 17/473,567, filed on Sep. 13, 2021, now Pat. No. 11,593,999, which is a
(Continued)

(51) Int. Cl.
*G06T 19/00* (2011.01)
*G06T 15/20* (2011.01)
(Continued)

(52) U.S. Cl.
CPC ............ *G06T 19/006* (2013.01); *G06T 15/20* (2013.01); *G06T 15/30* (2013.01); *G06T 19/20* (2013.01);
(Continued)

(58) Field of Classification Search
None
See application file for complete search history.

(56) References Cited

U.S. PATENT DOCUMENTS

| 9,129,404 | B1 | 9/2015 | Wagner |
| 9,214,137 | B2 | 12/2015 | Bala et al. |

(Continued)

FOREIGN PATENT DOCUMENTS

| CN | 102685394 A | 9/2012 |
| CN | 104102678 A | 10/2014 |

(Continued)

OTHER PUBLICATIONS

Application No. CN201980024648.3, Notice of Decision to Grant, Mailed on Jun. 20, 2022, 4 pages.
(Continued)

*Primary Examiner* — Robert J Craddock
(74) *Attorney, Agent, or Firm* — Kilpatrick Townsend & Stockton LLP

(57) ABSTRACT

A method for guiding installation of smart-home devices may include capturing, by a camera of a mobile computing device, a view of an installation location for a smart-home device; rendering, by the mobile computing device, a view of a virtual object that represents a real-world obstruction that will interfere with the operation or installation of the smart-home device; and displaying, by the mobile computing device, the view of a virtual object that represents real-world obstruction with the view of the installation location on the display of the mobile computing device.

20 Claims, 36 Drawing Sheets

Related U.S. Application Data continuation of application No. 17/099,399, filed on Nov. 16, 2020, now Pat. No. 11,120,636, which is a continuation of application No. 16/442,879, filed on Jun. 17, 2019, now Pat. No. 10,839,608.

(60) Provisional application No. 62/685,806, filed on Jun. 15, 2018.

(51) Int. Cl.
  *G06T 15/30* (2011.01)
  *G06T 19/20* (2011.01)

(52) U.S. Cl.
  CPC .............. *G06T 2219/2012* (2013.01); *G06T 2219/2021* (2013.01)

(56) References Cited

U.S. PATENT DOCUMENTS

| | | | |
|---|---|---|---|
| 10,395,427 | B1* | 8/2019 | Côté .................. G06T 7/75 |
| 10,839,608 | B2 | 11/2020 | Mittleman et al. |
| 11,120,636 | B2 | 9/2021 | Mittleman et al. |
| 11,593,999 | B2 | 2/2023 | Mittleman et al. |
| 2008/0071559 | A1 | 3/2008 | Arrasvuori |
| 2011/0115816 | A1 | 5/2011 | Brackney |
| 2013/0141421 | A1 | 6/2013 | Mount et al. |
| 2014/0095514 | A1 | 4/2014 | Filev et al. |
| 2014/0207282 | A1 | 7/2014 | Angle et al. |
| 2015/0212688 | A1 | 7/2015 | Mcmillan et al. |
| 2016/0034150 | A1 | 2/2016 | Behr et al. |
| 2016/0171773 | A1 | 6/2016 | Hara |
| 2016/0260261 | A1* | 9/2016 | Hsu ..................... G02B 27/01 |
| 2016/0330380 | A1 | 11/2016 | Martin et al. |
| 2017/0091998 | A1 | 3/2017 | Piccolo, III |
| 2017/0168559 | A1 | 6/2017 | Jayadevaprakash et al. |
| 2017/0351325 | A1 | 12/2017 | Hashimoto |
| 2018/0330169 | A1 | 11/2018 | Van Hoof et al. |
| 2019/0251753 | A1 | 8/2019 | Canada et al. |

FOREIGN PATENT DOCUMENTS

| | | |
|---|---|---|
| CN | 205642411 U | 10/2016 |
| CN | 106710002 A | 5/2017 |
| CN | 107466474 A | 12/2017 |
| EP | 2482260 A2 | 8/2012 |
| EP | 3076253 A1 | 10/2016 |
| KR | 20130133478 A | 12/2013 |
| WO | 2016154312 A1 | 9/2016 |

OTHER PUBLICATIONS

Application No. CN201980024648.3, Office Action, Mailed on Mar. 8, 2022, 11 pages.
Application No. CN201980024648.3, Office Action, Mailed on Jul. 23, 2021, 27 pages.
Application No. EP23157588.7, Extended European Search Report, Mailed on May 22, 2023, 8 pages.
Kim et al., "A Hybrid Learning System Proposal for PLC Wiring Training Using AR", IEEE, Dec. 2011, pp. 90-94.
Application No. PCT/US2019/037465, International Preliminary Report on Patentability, Mailed on Dec. 24, 2020, 9 pages.
Application No. PCT/US2019/037465, International Search Report and Written Opinion, Mailed on Oct. 25, 2019, 13 pages.

* cited by examiner

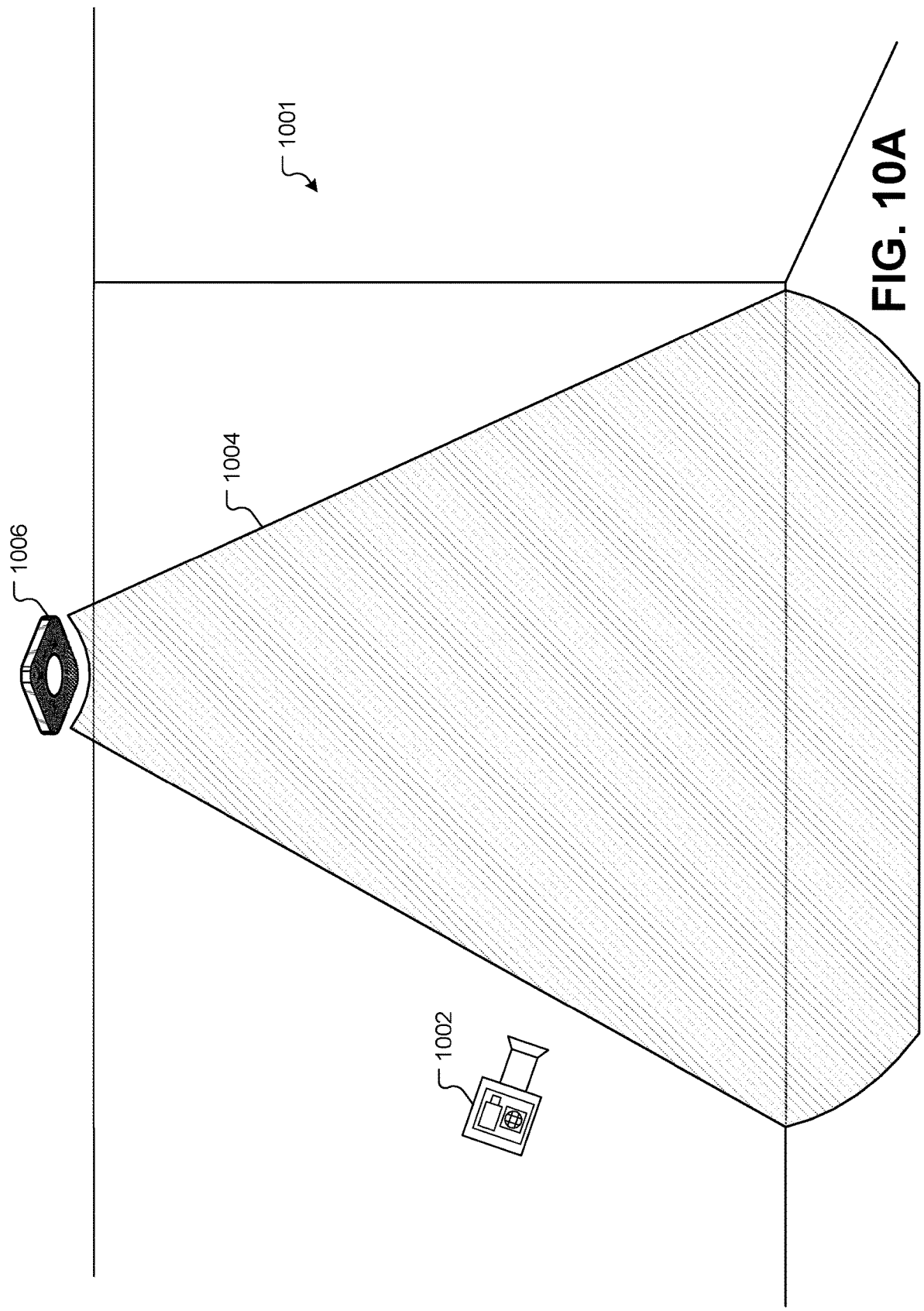

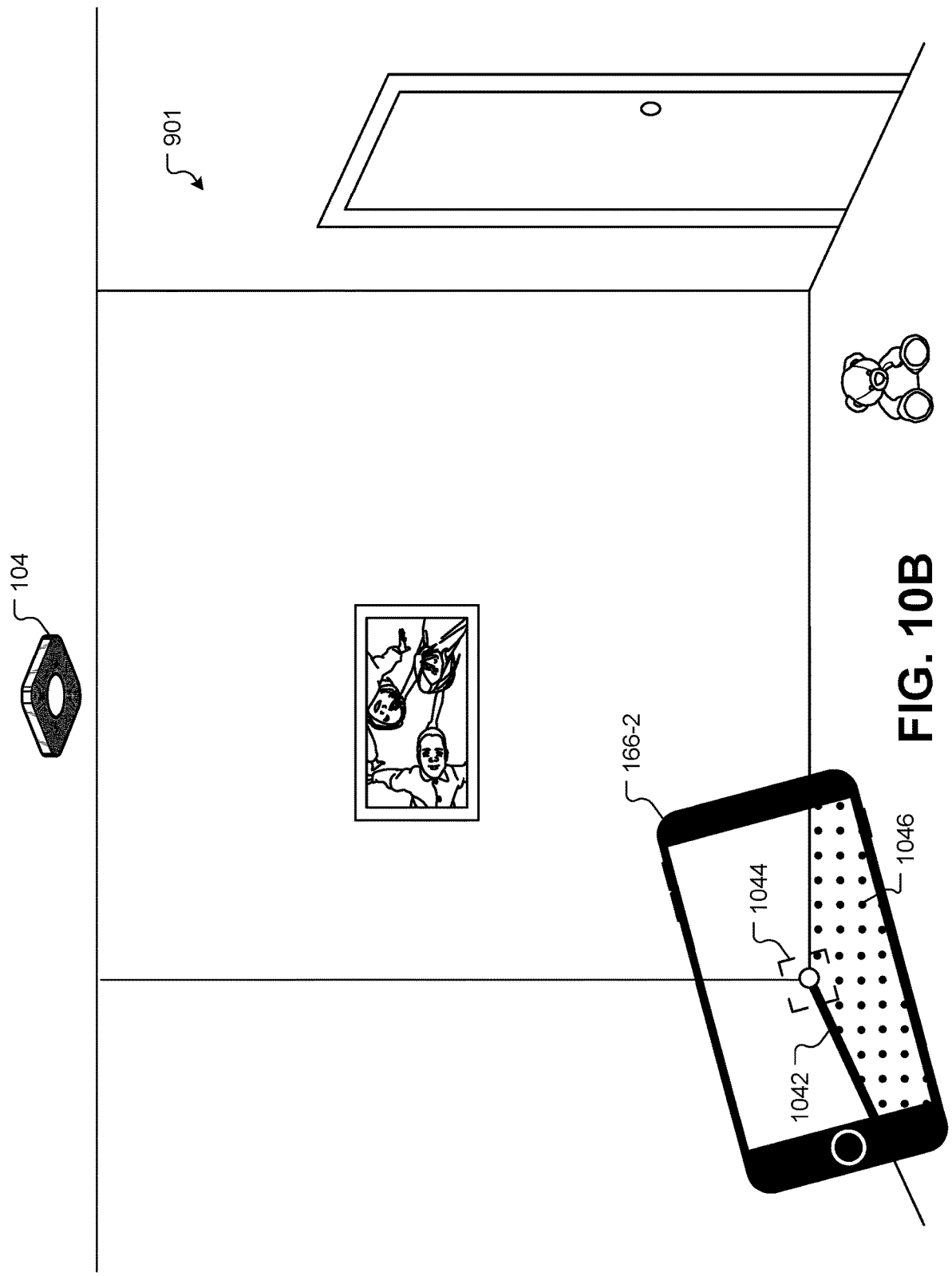

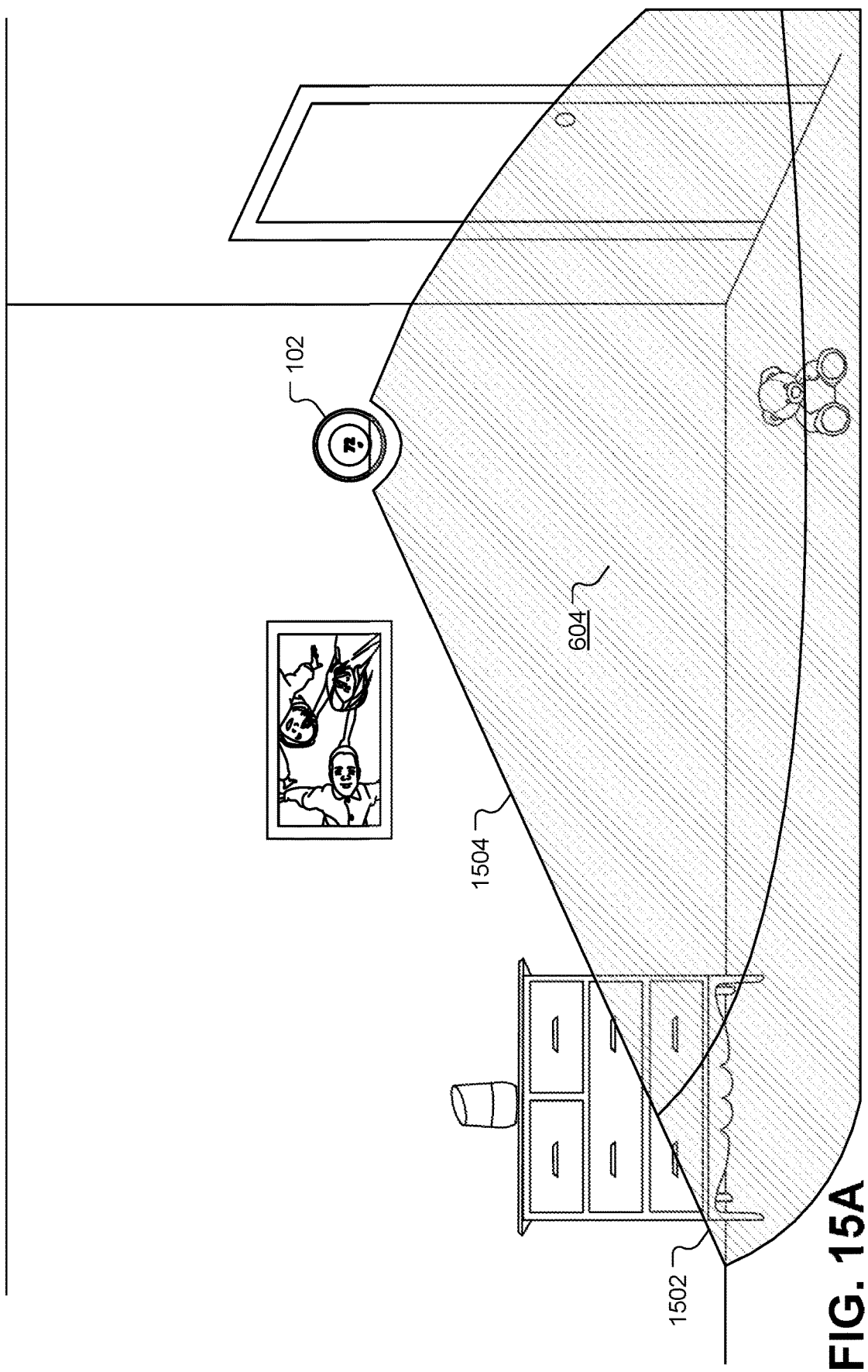

SMART-HOME DEVICE PLACEMENT AND INSTALLATION USING AUGMENTED-REALITY VISUALIZATIONS

CROSS REFERENCE TO RELATED APPLICATIONS

This application is a continuation of U.S. Non-Provisional application Ser. No. 17/473,567, filed Sep. 13, 2021, which is incorporated herein by reference. U.S. Non-Provisional application Ser. No. 17/473,567 is a continuation of U.S. Non-Provisional application Ser. No. 17/099,399, filed Nov. 16, 2020, which is incorporated herein by reference. U.S. Non-Provisional application Ser. No. 17/099,399 is a continuation of U.S. Non-Provisional application Ser. No. 16/442,879, filed Jun. 17, 2019, which is incorporated herein by reference. U.S. Non-Provisional application Ser. No. 16/442,879 claims the benefit of, and priority to, U.S. Provisional Application Ser. No. 62/685,806, filed Jun. 15, 2018, which is incorporated herein by reference.

TECHNICAL FIELD

This patent specification relates generally to installation and placement of smart-home devices. More specifically, this disclosure describes adding augmented-reality views to visualize coverage for invisible fields that are emitted and/or captured by smart-home devices to optimize device placement in an area.

BACKGROUND

Smart-home devices are rapidly becoming part of the modern home experience. These devices may include thermostats, keypads, touch screens, and/or other control devices for controlling environmental systems, such as HVAC systems or lighting systems. The smart-home environment may also include smart appliances, such as washing machines, dishwashers, refrigerators, garbage cans, and so forth, that interface with control and/or monitoring devices to increase the level of functionality and control provided to an occupant. Security systems, including cameras, keypads, sensors, motion detectors, glass-break sensors, microphones, and so forth, may also be installed as part of the smart-home architecture. Other smart—the home devices may include doorbells, monitoring systems, hazard detectors, smart lightbulbs, and virtually any other electronic device that can be controlled via a wired/wireless network.

Each of these smart-home devices may include sensors that have fields of view. A field of view of a sensor may include a range at which motion can be detected, a range at which wireless communications can be transmitted, an area within which smoke can be detected, and so forth. During installation, users may desire that the fields of view of various sensors on their smart-home devices effectively capture events in a surrounding area.

BRIEF SUMMARY

In some embodiments, a method for optimizing the placement of smart-home devices may include receiving, by a mobile computing device, a location for a smart-home device, where the mobile computing device may include a display and a camera. The method may also include rendering a view of a virtual object that represents a field-of-view of the smart-home device, where the view of the virtual object may be rendered based on a position corresponding to a position of the mobile computing device. The method may additionally include displaying, by the mobile computing device, the view of a virtual object that represents a field-of-view of the smart-home device on the display of the mobile computing device.

In some embodiments, a system may include one or more processors and one or more memory devices comprising instructions that, when executed by the one or more processors, cause the one or more processors to perform operations including receiving, by a mobile computing device, a location for a smart-home device, where the mobile computing device may include a display and a camera. The operations may also include rendering a view of a virtual object that represents a field-of-view of the smart-home device, where the view of the virtual object may be rendered based on a position corresponding to a position of the mobile computing device. The operations may additionally include displaying, by the mobile computing device, the view of a virtual object that represents a field-of-view of the smart-home device on the display of the mobile computing device.

In some embodiments, a non-transitory, computer-readable medium may include instructions that, when executed by one or more processors, cause the one or more processors to perform operations including receiving, by a mobile computing device, a location for a smart-home device, where the mobile computing device may include a display and a camera. The operations may also include rendering a view of a virtual object that represents a field-of-view of the smart-home device, where the view of the virtual object may be rendered based on a position corresponding to a position of the mobile computing device. The operations may additionally include displaying, by the mobile computing device, the view of a virtual object that represents a field-of-view of the smart-home device on the display of the mobile computing device.

In any embodiments, one or more of the following features may be included in any combination and without limitation. Receiving the location for the smart-home device may include capturing, by the camera of the mobile computing device, a view of the smart-home device, and determining the location for the smart-home device relative to a location of the mobile computing device. Receiving the location for the smart-home device may include receiving a first position of the mobile computing device, receiving a second position of the mobile computing device relative to the first position, and using the first position as the location for the smart-home device. Receiving the location for the smart-home device may include receiving a finger-tap input on the display of the mobile computing device, and determining the location for the smart-home device based on the view of the camera of the mobile computing device and the finger-tap input. The virtual object may include a cone projecting away from the location for the smart-home device. The virtual object may be rendered as part of a virtual 3-D scene from a perspective of a virtual camera that corresponds to the position of the mobile computing device in the 3-D virtual scene. Rendering the view of the virtual object may include clipping a portion of the view of the virtual object based on an obstruction within the field-of-view of the smart-home device. The smart-home device may include a magnetic sensor, and the field-of-view of the smart-home device may include an area in which the magnetic sensor can detect a magnet. The smart-home device may include a radio, and the field-of-view of the smart-home device may include a range of the radio. The smart-home device may include a motion sensor, and the field-of-view of the smart-home device may include an area in which the motion sensor can detect motion. The smart-home device may include a camera, and the field-of-view of the smart-home device may include an area that can be captured by the camera. The view of the virtual object may be rendered in a first color when a user and/or the mobile computing device is not in the field-of-view of the smart-home device, and the view of the virtual object may be rendered in a second color when the user and/or mobile computing device is in the field-of-view of the smart-home device. The view of the virtual object may be rendered in a first color for a first portion of the field-of-view and may be rendered in a second color for a second portion of the field-of-view. A shape of the virtual object may change according to sensitivity settings on the smart-home device. The method/operations may also include identifying a source in the smart-home environment that interferes with the field of view of the smart-home device, rendering a view of a second virtual object that represents an area of interference generated by the source, and displaying, by the mobile computing device, the view of the second virtual object with the view of the virtual object. The method/operations may also include receiving information descriptive of at least a portion of a smart-home environment, determining locations in the smart-home environment where the smart-home device should or should not be installed, rendering a view of a second virtual object that represents the locations in the smart-home environment where the smart-home device should or should not be installed, and displaying, by the mobile computing device, the view of the second virtual object with the view of the virtual object. The method/operations may also include receiving a view of the smart-home device during installation, generating a view of instructions for installing the smart-home device, and displaying the instructions for installing the smart-home device on the display of the mobile computing device layered over the view of the smart-home device during installation. The method/operations may also include connecting to a second computing device; and receiving live installation instructions from a user through the second computing device.

A further understanding of the nature and advantages of the present invention may be realized by reference to the remaining portions of the specification and the drawings. Also note that other embodiments may be described in the following disclosure and claims.

BRIEF DESCRIPTION OF THE DRAWINGS

FIG. 10A illustrates a virtual 3-D scene that may be rendered and displayed on the mobile device, according to some embodiments.

FIG. 10B illustrates how the geometry of the smart-home environment can be mapped visually using the camera of the mobile device, according to some embodiments.

FIG. 15A illustrates a field of view with range indications, according to some embodiments.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure. It will be apparent to one skilled in the art that the present invention may be practiced without some or all of these specific details. In other instances, well known details have not been described in detail in order not to unnecessarily obscure the present invention.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Figure 1:
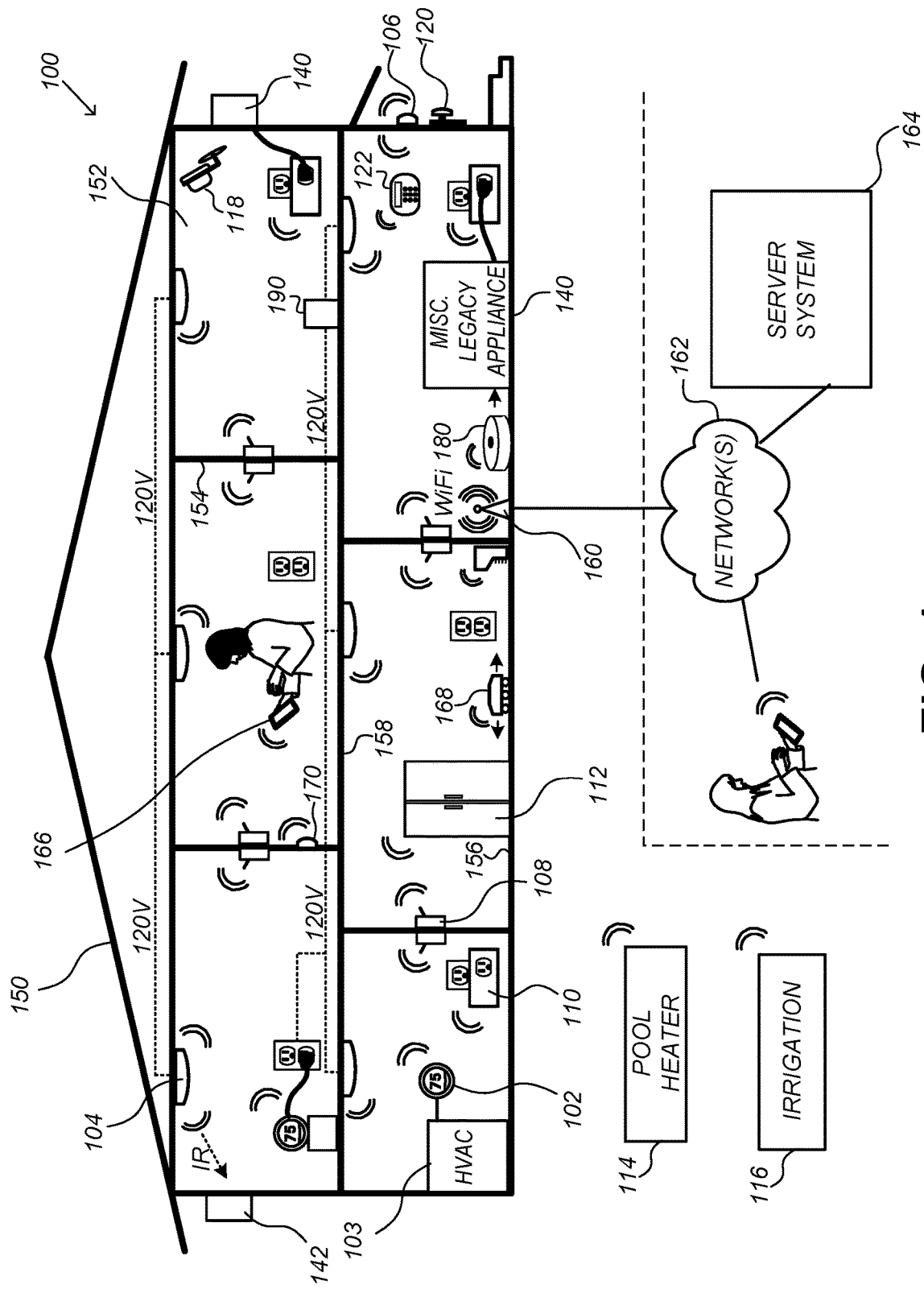
FIG. 1 is an example of a smart-home environment within which one or more of the devices, methods, systems, services, and/or computer program products described further herein will be applicable, according to some embodiments.

FIG. 1 illustrates an example smart-home environment 100, according to some embodiments. The smart-home environment 100 includes a structure 150 (e.g., a house, office building, garage, or mobile home) with various integrated devices. It will be appreciated that devices may also be integrated into a smart-home environment 100 that does not include an entire structure 150, such as an apartment, condominium, or office space. Further, the smart-home environment 100 may control and/or be coupled to devices outside of the actual structure 150. Indeed, several devices in the smart-home environment 100 need not be physically within the structure 150. For example, a device controlling a pool heater 114 or irrigation system 116 may be located outside of the structure 150.

The term "smart-home environment" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space. Similarly, while the terms user, customer, installer, homeowner, occupant, guest, tenant, landlord, repair person, etc., may be used to refer to a person or persons acting in the context of some particular situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, as well as being one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. While the identity of the person performing the action may be germane to a particular advantage provided by one or more of the implementations, such an identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156, or ceiling 158.

In some implementations, the integrated devices of the smart-home environment 100 include intelligent, multi-sensing, network-connected devices that integrate seamlessly with each other in a smart-home network and/or with a central server or a cloud-computing system to provide a variety of useful smart-home functions. The smart-home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122"). Although not depicted explicitly in FIG. 1, the smart-home environment 100 may also include other monitoring systems, such as baby monitoring systems, elderly monitoring systems, handicapped monitoring systems, and so forth.

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 may include a thermal radiation sensor directed at a stove/oven 112. A thermal radiation sensor may determine the temperature of the respective heat source (or a portion thereof) at which it is directed and may provide corresponding black-body radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual devices, and/or control settings on a security system (e.g., to activate or deactivate the security system when occupants go and come). In some implementations, the smart doorbell 106 may include some or all of the components and features of the camera 118. In some implementations, the smart doorbell 106 includes a camera 118.

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart-home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker) for providing notifications. In some implementations, the smart alarm system 122 may also be set to an "armed" mode, such that detection of a trigger condition or event causes the alarm to be sounded unless a disarming action is performed.

In some implementations, the smart-home environment 100 may include one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart-home environment 100 of FIG. 1 may include a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as older-model conventional washers/dryers, refrigerators, and/or the like, which may be controlled by smart wall plugs 110. The smart-home environment 100 may further include a variety of partially communicating legacy appliances 142, such as infrared ("IR") controlled wall air conditioners or other IR-controlled devices, which may be controlled by IR signals provided by the smart hazard detectors 104, hand-held remote controls, key FOBs, or the smart wall switches 108.

In some implementations, the smart-home environment 100 may include one or more network-connected cameras 118 that are configured to provide video monitoring and security in the smart-home environment 100. The cameras 118 may be used to determine the occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio). In some implementations, the cameras 118 may each be configured to operate in a day mode and in a low-light mode (e.g., a night mode). In some implementations, the cameras 118 each include one or more IR illuminators for providing illumination while the camera is operating in the low-light mode. In some implementations, the cameras 118 include one or more outdoor cameras. In some implementations, the outdoor cameras include additional features and/or components such as weatherproofing and/or solar ray compensation.

The smart-home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart-home environment 100 may include radio-frequency identification (RFID) readers (e.g., in each room 152 or a portion thereof) that determine occupancy based on RFID tags located on or embedded in occupants. For example, RFID readers may be integrated into the smart hazard detectors 104, and RFID tags may be worn in users clothing for integrated in hand-held devices such as a smart phone.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 and/or receives commands for controlling the pool temperature. Similarly, the smart-home environment 100 may include an irrigation monitor 116 that communicates information regarding irrigation systems within the smart-home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart-home environment 100 using a network-connected computer or portable electronic device 166. In some examples, some or all of the occupants (e.g., individuals who live in the home) may register their device 166 with the smart-home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart-home environment 100 may make inferences about (1) which individuals live in the home and are therefore occupants, and (2) which devices 166 are associated with those individuals. As such, the smart-home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices" or "the smart-home devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices may serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a server system 164 (also called a central server system and/or a cloud-computing system herein). The server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the server system 164 to smart devices (e.g., when available, when purchased, or at routine intervals).

In some implementations, the network interface 160 includes a conventional network device (e.g., a router), and the smart-home environment 100 of FIG. 1 includes a hub device 180 that is communicatively coupled to the network(s) 162 directly or via the network interface 160. The hub device 180 may be further communicatively coupled to one or more of the above intelligent, multi-sensing, network-connected devices (e.g., smart devices of the smart-home environment 100). Each of these smart devices optionally communicates with the hub device 180 using one or more radio communication networks available at least in the smart-home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends the capabilities of low-capability smart devices to match the capabilities of the highly capable smart devices of the same type, integrates functionality of multiple different device types—even across different communication protocols, and is configured to streamline adding of new devices and commissioning of the hub device. In some implementations, hub device 180 further comprises a local storage device for storing data related to, or output by, smart devices of smart-home environment 100. In some implementations, the data includes one or more of: video data output by a camera device, metadata output by a smart device, settings information for a smart device, usage logs for a smart device, and the like.

In some implementations, smart-home environment 100 includes a local storage device 190 for storing data related to, or output by, smart devices of smart-home environment 100. In some implementations, the data includes one or more of: video data output by a camera device (e.g., camera 118), metadata output by a smart device, settings information for a smart device, usage logs for a smart device, and the like. In some implementations, local storage device 190 is communicatively coupled to one or more smart devices via a smart home network. In some implementations, local storage device 190 is selectively coupled to one or more smart devices via a wired and/or wireless communication network. In some implementations, local storage device 190 is used to store video data when external network conditions are poor. For example, local storage device 190 is used when an encoding bitrate of camera 118 exceeds the available bandwidth of the external network (e.g., network(s) 162). In some implementations, local storage device 190 temporarily stores video data from one or more cameras (e.g., camera 118) prior to transferring the video data to a server system (e.g., server system 164).

In some implementations, the smart-home environment 100 includes service robots 168 that are configured to carry out, in an autonomous manner, any of a variety of household tasks.

Figure 2A:
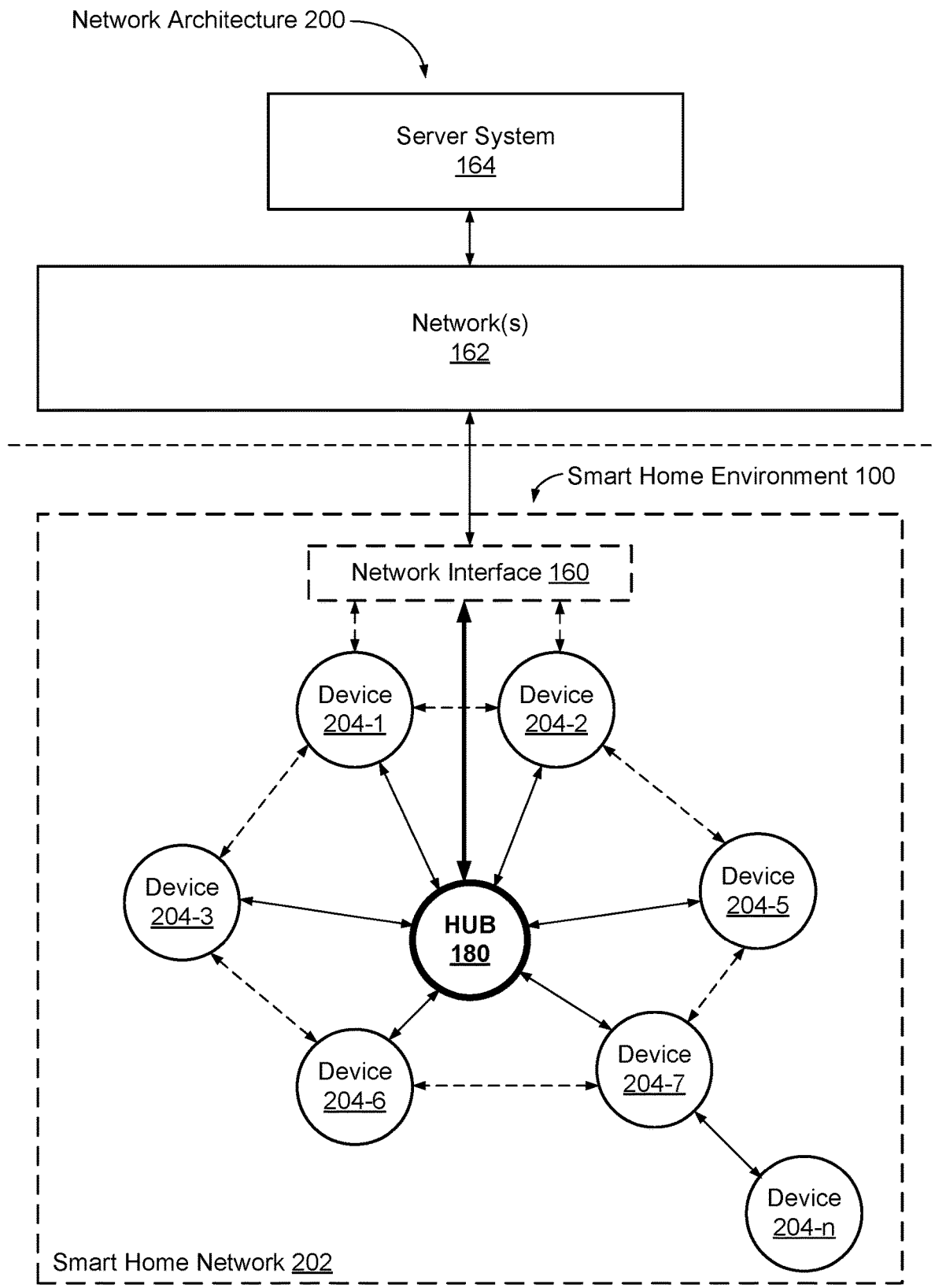
FIG. 2A illustrates a simplified block diagram of a representative network architecture that includes a smart-home network in accordance, according to some embodiments.

FIG. 2A illustrates a simplified block diagram of a representative network architecture 200 that includes a smart home network 202 in accordance with some implementations. In some implementations, the smart devices 204 in the smart-home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or server system 164) and sends commands (e.g., to smart devices 204 in the smart home network 202) to control operation of the smart-home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are typically equipped with the capability of using a wireless protocol to facilitate bidirectional communication with a variety of other devices in the smart-home environment 100, as well as with the server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, ZWave, 6LoWPAN, Thread, Bluetooth, etc.

In some implementations, some low-power nodes may be incapable of bidirectional communication. These low-power nodes may send messages, but they are unable to "listen." Thus, other devices in the smart-home environment 100, such as the spokesman nodes, need not send information to these low-power nodes. In some implementations, some low-power nodes are capable of only a limited bidirectional communication. For example, other devices are able to communicate with the low-power nodes only during a certain time period.

In some implementations, the smart devices may serve as low-power and spokesman nodes to create a mesh network in the smart-home environment 100. In some implementations, individual low-power nodes in the smart-home environment may regularly send out messages regarding what they are sensing, and the other low-powered nodes in the smart-home environment—in addition to sending out their own messages—may forward these messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 164 (using, e.g., the relatively high-power communication protocol). Thus, the low-powered nodes using low-power communication protocols are able to send and/or receive messages across the entire smart home network 202, as well as over the Internet 162 to the server system 164. In some implementations, the mesh network enables the server system 164 to regularly receive data from most or all of the smart devices in the home, make inferences based on the data, facilitate state synchronization across devices within and outside of the smart home network 202, and send commands to one or more of the smart devices to perform tasks in the smart-home environment.

The spokesman nodes and some of the low-powered nodes are capable of "listening." Accordingly, users, other devices, and/or the server system 164 may communicate control commands to the low-powered nodes. For example, a user may use the electronic device 166 (e.g., a smart phone) to send commands over the Internet to the server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the server system 164.

In some implementations, a smart nightlight 170, which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As described above, these messages may be sent wirelessly (e.g., using the mesh network) from node to node (i.e., smart device to smart device) within the smart home network 202 as well as over the Internet 162 to the server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

As explained above with reference to FIG. 1, in some implementations, the smart-home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart-home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network (WAN). All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 2B:
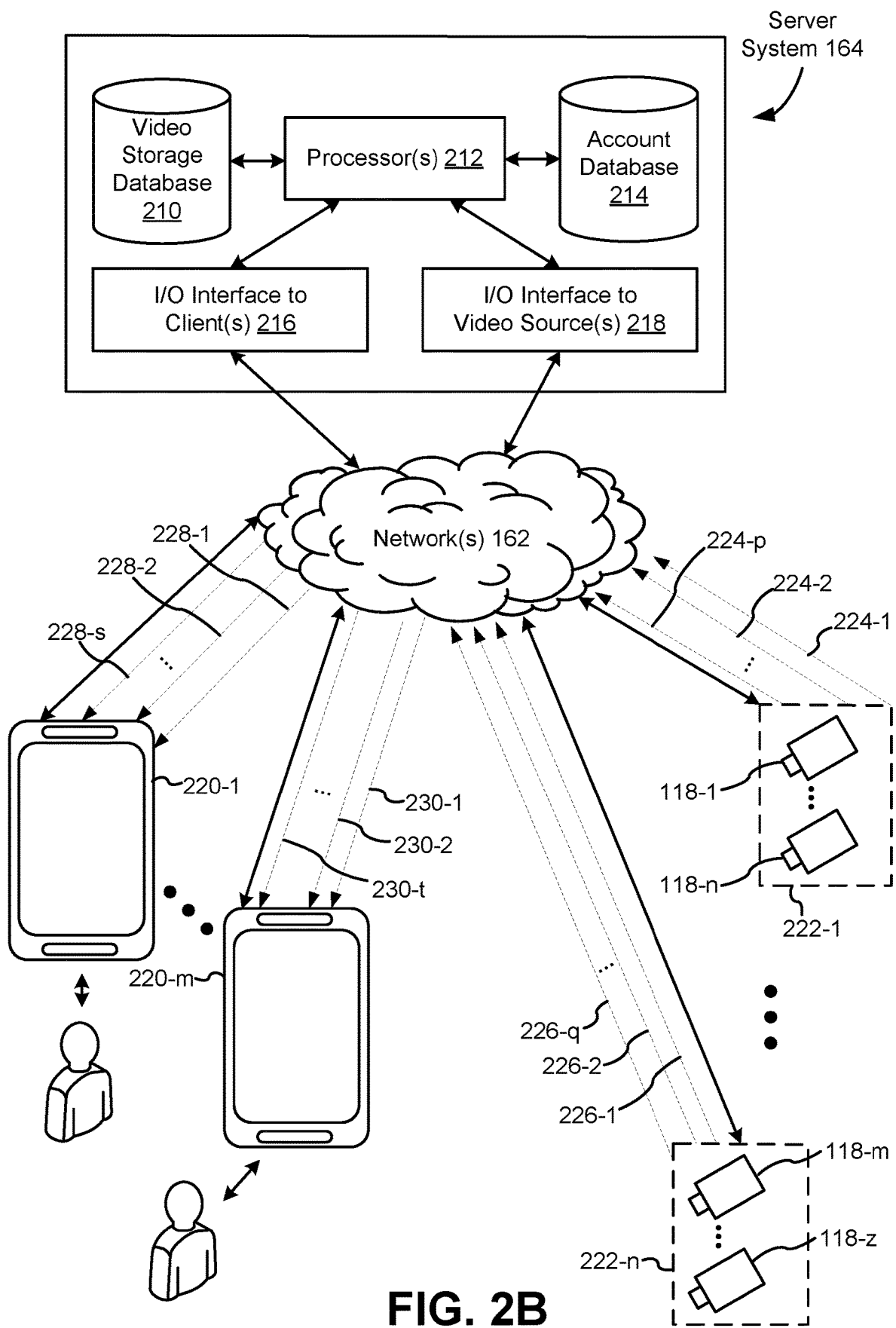
FIG. 2B illustrates a simplified operating environment in which a server system interacts with client devices and smart devices, according to some embodiments.

FIG. 2B illustrates a representative operating environment in which a server system 164 provides data processing for monitoring and facilitating review of events (e.g., motion, audio, security, etc.) in video streams captured by video cameras 118. As shown in FIG. 2B, the server system 164 receives video data from video sources 222 (including cameras 118) located at various physical locations (e.g., inside homes, restaurants, stores, streets, parking lots, and/or the smart-home environments 100 of FIG. 1). Each video source 222 may be bound to one or more reviewer accounts, and the server system 164 provides video monitoring data for the video source 222 to client devices 220 associated with the reviewer accounts. For example, the portable electronic device 166 is an example of the client device 220. In some implementations, the server system 164 is a video processing server that provides video processing services to video sources and client devices 220.

In some implementations, each of the video sources 222 includes one or more video cameras 118 that capture video and send the captured video to the server system 164 substantially in real-time. In some implementations, each of the video sources 222 includes a controller device (not shown) that serves as an intermediary between the one or more cameras 118 and the server system 164. The controller device receives the video data from the one or more cameras 118, optionally performs some preliminary processing on the video data, and sends the video data to the server system 164 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the server system 164.

In accordance with some implementations, each of the client devices 220 includes a client-side module. The client-side module communicates with a server-side module executed on the server system 164 through the one or more networks 162. The client-side module provides client-side functionality for the event monitoring and review processing and communications with the server-side module. The server-side module provides server-side functionality for event monitoring and review processing for any number of client-side modules each residing on a respective client device 220. The server-side module also provides server-side functionality for video processing and camera control for any number of the video sources 222, including any number of control devices and the cameras 118.

In some implementations, the server system 164 includes one or more processors 212, a video storage database 210, an account database 214, an I/O interface to one or more client devices 216, and an I/O interface to one or more video sources 218. The I/O interface to one or more clients 216 facilitates the client-facing input and output processing. The account database 214 stores a plurality of profiles for reviewer accounts registered with the video processing server, where a respective user profile includes account credentials for a respective reviewer account, and one or more video sources linked to the respective reviewer account. The I/O interface to one or more video sources 218 facilitates communications with one or more video sources 222 (e.g., groups of one or more cameras 118 and associated controller devices). The video storage database 210 stores raw video data received from the video sources 222, as well as various types of metadata, such as motion events, event categories, event category models, event filters, and event masks, for use in data processing for event monitoring and review for each reviewer account.

Examples of a representative client device 220 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an eBook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 may be implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a server computer, a handheld computer, a tablet computer, a laptop computer, a desktop computer, or a combination of any two or more of these data processing devices or other data processing devices.

The server-client environment shown in FIG. 2B includes both a client-side portion (e.g., the client-side module) and a server-side portion (e.g., the server-side module). The division of functionality between the client and server portions of operating environment can vary in different implementations. Similarly, the division of functionality between a video source 222 and the server system 164 can vary in different implementations. For example, in some implementations, the client-side module is a thin-client that provides only user-facing input and output processing functions, and delegates all other data processing functionality to a backend server (e.g., the server system 164). Similarly, in some implementations, a respective one of the video sources 222 is a simple video capturing device that continuously captures and streams video data to the server system 164 with limited or no local preliminary processing on the video data. Although many aspects of the present technology are described from the perspective of the server system 164, the corresponding actions performed by a client device 220 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects of the present technology may be performed by the server system 164, a client device 220, and a video source 222 cooperatively.

In some implementations, a video source 222 (e.g., a camera 118) transmits one or more streams of video data to the server system 164. In some implementations, the one or more streams may include multiple streams, of respective resolutions and/or frame rates, of the raw video captured by the camera 118. In some implementations, the multiple streams may include a "primary" stream with a certain resolution and frame rate, corresponding to the raw video captured by the camera 118, and one or more additional streams. An additional stream may be the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream.

In some implementations, one or more of the streams are sent from the video source 222 directly to a client device 220 (e.g., without being routed to, or processed by, the server system 164). In some implementations, one or more of the streams is stored at the camera 118 (e.g., in memory 406, FIG. 4) and/or a local storage device (e.g., a dedicated recording device), such as a digital video recorder (DVR). For example, in accordance with some implementations, the camera 118 stores the most recent 24 hours of video footage recorded by the camera. In some implementations, portions of the one or more streams are stored at the camera 118 and/or the local storage device (e.g., portions corresponding to particular events or times of interest).

In some implementations, the server system 164 transmits one or more streams of video data to a client device 220 to facilitate event monitoring by a user. In some implementations, the one or more streams may include multiple streams, of respective resolutions and/or frame rates, of the same video feed. In some implementations, the multiple streams may include a "primary" stream with a certain resolution and frame rate, corresponding to the video feed, and one or more additional streams. An additional stream may be the same video stream as the "primary" stream but at a different resolution and/or frame rate, or a stream that shows a portion of the "primary" stream (e.g., cropped to include portion of the field of view or pixels of the primary stream) at the same or different resolution and/or frame rate as the "primary" stream, as described in greater detail in U.S. patent application Ser. No. 15/594,518, which is incorporated herein by reference.

Figure 3:
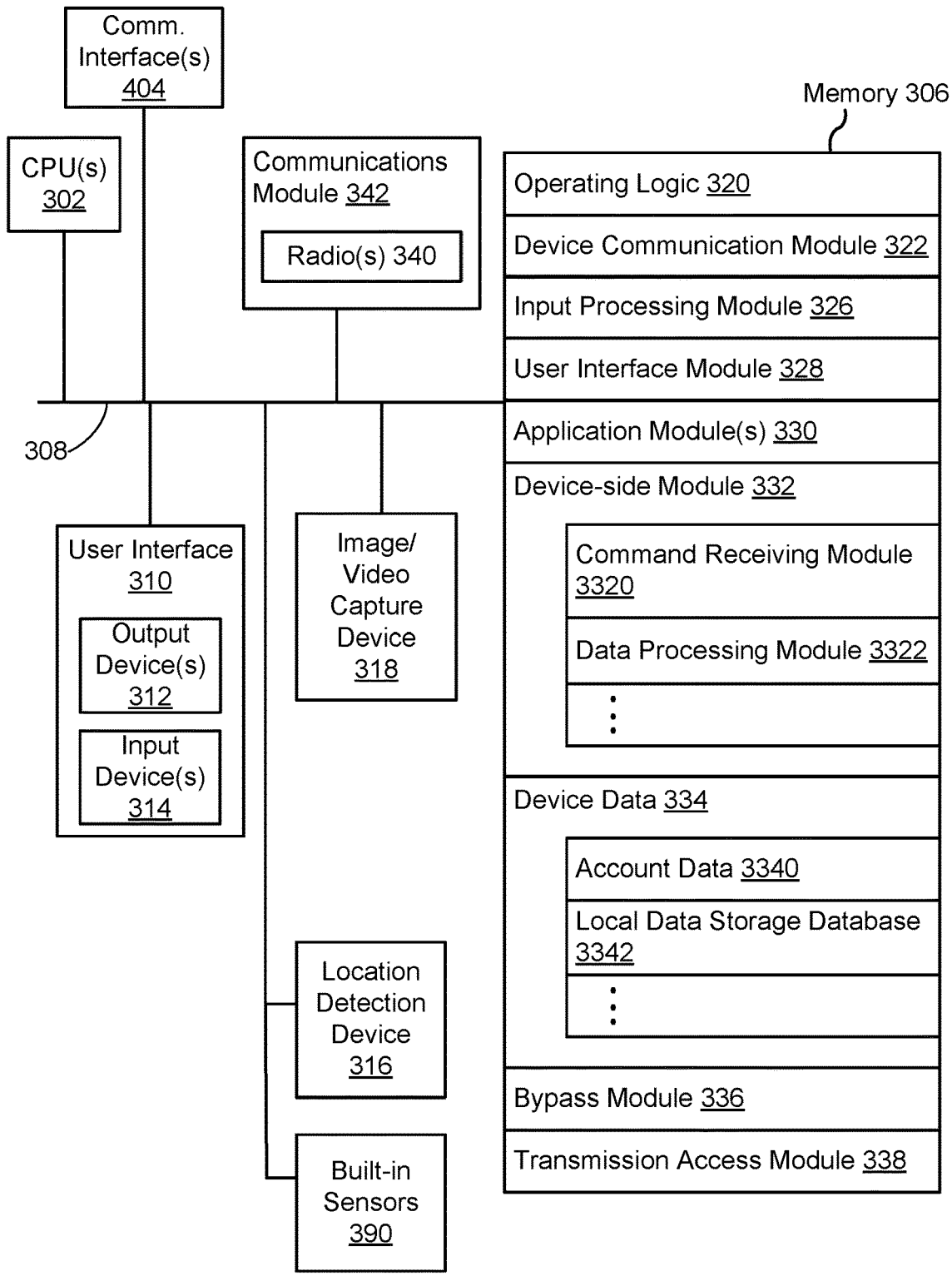
FIG. 3 is a block diagram illustrating a representative smart device in accordance with some implementations.

FIG. 3 is a block diagram illustrating a representative smart device 204 in accordance with some implementations. In some implementations, the smart device 204 (e.g., any devices of a smart-home environment 100, FIG. 1) includes one or more processing units (e.g., CPUs, ASICs, FPGAs, microprocessors, and the like) 302, one or more communication interfaces 304, memory 306, communications module 342 with radios 340, and one or more communication buses 308 for interconnecting these components (sometimes called a chipset). In some implementations, the user interface 310 includes one or more output devices 312 that enable presentation of media content, including one or more speakers and/or one or more visual displays. In some implementations, the user interface 310 also includes one or more input devices 314, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 318 (e.g., cameras, video cameras, scanners, photo sensor units). The built-in sensors 390 may include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 340 enable one or more radio communication networks in the smart-home environments, and allow a smart device 204 to communicate with other devices. In some implementations, the radios 340 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) custom or standard wired protocols (e.g., Ethernet, HomePlug, etc.), and/or any other suitable communication protocol, including communication protocols not yet developed as of the filing date of this document.

The communication interfaces 304 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, or alternatively the non-volatile memory within the memory 306, includes a non-transitory computer readable storage medium. In some implementations, the memory 306, or the non-transitory computer readable storage medium of the memory 306, stores the following programs, modules, and data structures, or a subset or superset thereof: operating logic 320 including procedures for handling various basic system services and for performing hardware dependent tasks; a device communication module 322 for connecting to and communicating with other network devices (e.g., network interface 160, such as a router that provides Internet connectivity, networked storage devices, network routing devices, server system 164, etc.) connected to one or more networks 162 via one or more communication interfaces 304 (wired or wireless); an input processing module 326 for detecting one or more user inputs or interactions from the one or more input devices 314 and interpreting the detected inputs or interactions; a user interface module 328 for providing and displaying a user interface in which settings, captured data, and/or other data for one or more devices (e.g., the smart device 204, and/or other devices in smart-home environment 100) can be configured and/or viewed; one or more applications 330 for execution by the smart device (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices); a device-side module 332, which provides device-side functionalities for device control, data processing and data review, including but not limited to: a command receiving module 3320 for receiving, forwarding, and/or executing instructions and control commands (e.g., from a client device 220, from a server system 164, from user inputs detected on the user interface 310, etc.) for operating the smart device 204; a data processing module 3322 for processing data captured or received by one or more inputs (e.g., input devices 314, image/video capture devices 318, location detection device 316), sensors (e.g., built-in sensors 390), interfaces (e.g., communication interfaces 304, radios 340), and/or other components of the smart device 204, and for preparing and sending processed data to a device for review (e.g., client devices 220 for review by a user); device data 334 storing data associated with devices (e.g., the smart device 204), including, but is not limited to: account data 3340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; local data storage database 3342 for selectively storing raw or processed data associated with the smart device 204 (e.g., video surveillance footage captured by a camera 118); a bypass module 336 for detecting whether radio(s) 340 are transmitting signals via respective antennas coupled to the radio(s) 340 and to accordingly couple radio(s) 340 to their respective antennas either via a bypass line or an amplifier (e.g., a low noise amplifier); and a transmission access module 338 for granting or denying transmission access to one or more radio(s) 340 (e.g., based on detected control signals and transmission requests).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above.

Many of the smart-home devices described above in relation to FIG. 1 may have or be associated with non-visible fields of view that affect the operation, effectiveness, and/or performance of the smart-home devices. These non-visible fields of view can be emitted by the smart-home devices and/or received by sensors on the smart-home devices. Additionally, these non-visible fields of view can define ranges and/or placement strategies for the smart-home devices throughout the home. For users, a problem is that the adoption of a smart-home architecture often involves the inter-connectivity of all of these non-visible fields of view, but users are unable to see this interaction between devices. Because the connectivity and the coverage of smart home devices is not visible to the human eye, the installation, debugging, and/or operation of the smart-home devices in the smart-home system is very difficult for a non-expert user to optimize.

Figure 4:
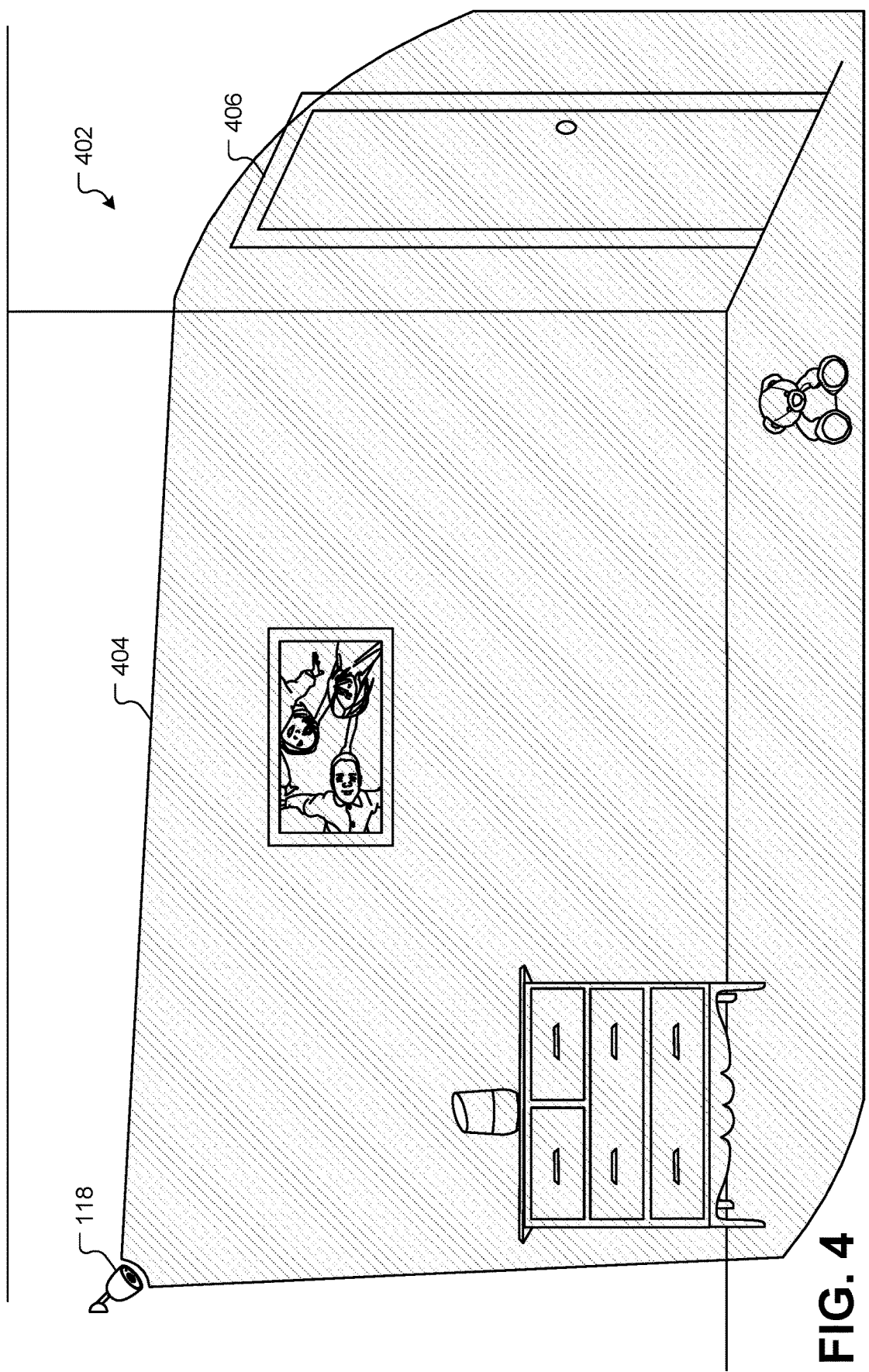
FIG. 4 illustrates a smart-home device in the form of a camera that has a field of view in a smart-home environment, according to some embodiments.

FIG. 4 illustrates a smart-home device in the form of a camera 118 that has a field of view 404 in a smart-home environment 402, according to some embodiments. The camera 118 may include visible and/or thermal light sensors that receive light from the smart-home environment 402 to capture a real-time stream of images in the smart-home environment 402. The field of view 404 of the light received by the camera 118 can be determined by the aperture, lens, and light-sensitive receivers of the camera 118. When installing the camera 118 as part of a monitoring system or home security system, it will often be desirable to ensure that the area to be monitored has complete camera coverage. For example, the camera 118 in FIG. 4 as an acceptable view of the door 406. However, the camera 118 is unable to see the area of the room that is beneath or behind the camera 118. During installation, it is difficult for a user to know which portions of the room are not visible to the camera 118 because the field of view 404 is not visible to the human eye. Prior to this disclosure, the only way to determine whether the field of view 404 of the camera 118 adequately covered the area to be monitored was to actually view the video feed of the camera 118. There was no way to determine the exact boundaries the field of view 404 without activating the camera and viewing the video feed.

Figure 5:
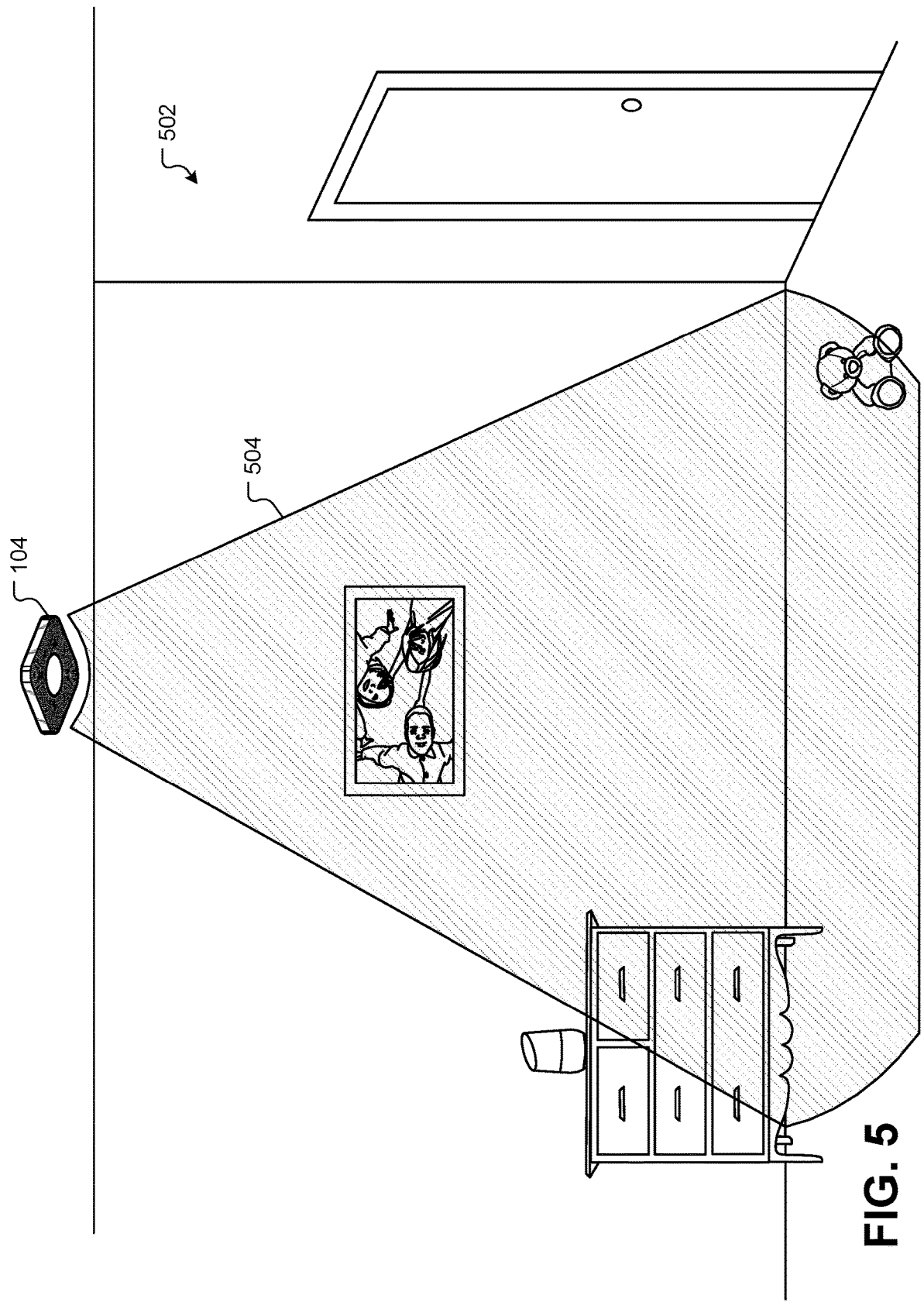
FIG. 5 illustrates a smart-home device in the form of a hazard detector that has a field of view in a smart-home environment, according to some embodiments.

FIG. 5 illustrates a smart-home device in the form of a hazard detector 104 that has a field of view 504 in a smart-home environment 502, according to some embodiments. The hazard detector 104 may include a number of different sensors, each of which has a different field of view. For example, the hazard detector 104 may include a motion detector that can be used to determine occupancy in the smart-home environment 502 and/or to activate a nightlight feature on the hazard detector 104. Additionally or alternatively, the hazard detector 104 may include sensors that detect carbon monoxide, smoke, and/or other dangerous gases or conditions. For example, the field of view of a smoke detector may be defined as an area within which a smoke source will trigger the smoke sensor of the hazard detector 104. In another example, the field of view of a carbon monoxide detector may be defined as an area within which a carbon monoxide source will trigger the carbon monoxide sensor of the hazard detector 104. In another example, the field-of-view may include an area that may be illuminated by a nightlight feature of the hazard detector 104. The field of view 504 in FIG. 5 represents a field of view of a motion sensor as an example, such as a passive infrared (PIR) sensor for detecting the motion of thermal bodies. The motion sensor may typically receive infrared radiation from a thermal body within the field of view 504. In short, each of the sensors may also have their own field of view, which may also be referred to as an effective field or a responsive field for each sensor. In the implementations described below that provide an augmented reality visualization of the field of view 504, the user may be able to switch between the fields of view of different sensors.

As described above in relation to the camera 118, the field of view 504 of the hazard detector 104 is not visible to the naked eye. Prior to this disclosure, the user would have no way of determining whether the smart-home environment 502 was properly covered by one or more hazard detectors. For example, if the smart-home environment 502 represented a hallway, a plurality of hazard detectors 104 may be installed down the length of the hallway to provide automatic nightlight illumination as users walk down the hallway in the dark. In another example, users may wish to know how to space the hazard detectors 104 to ensure that smoke or carbon monoxide is readily detected in the smart-home environment 502.

Figure 6:
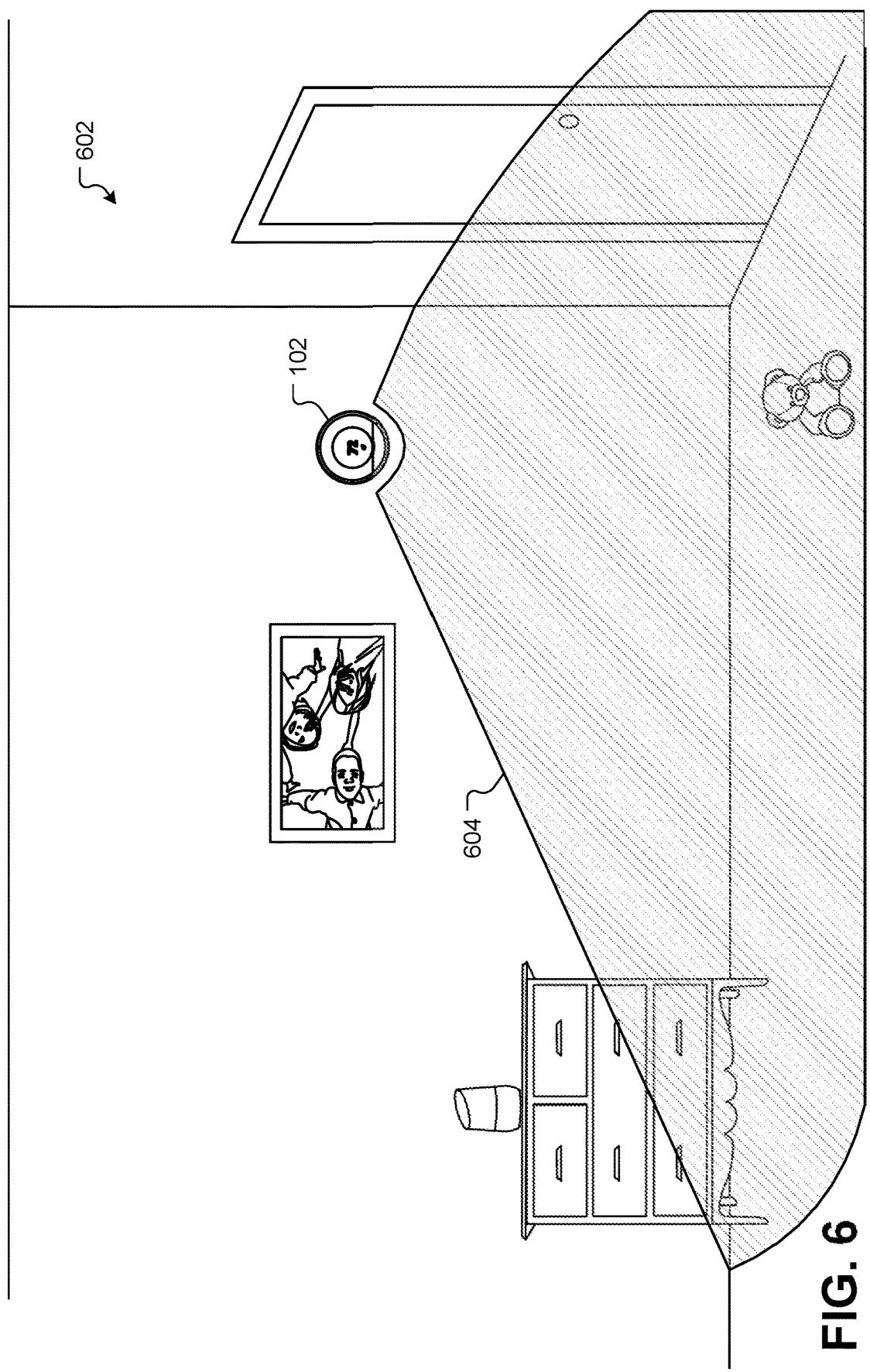
FIG. 6 illustrates a smart-home device in the form of a thermostat that has a field of view in a smart-home environment, according to some embodiments.

FIG. 6 illustrates a smart-home device in the form of a thermostat 102 that has a field of view 604 in a smart-home environment 602, according to some embodiments. The thermostat 102 may include multiple sensors, including temperature sensors, ambient light sensors, PIR motion sensors, and so forth, each of which has their own field of view. The field of view 604 depicted in FIG. 6 may be associated with a PIR motion sensor on the thermostat 102. The field of view 604 of the motion sensor on the thermostat 102 may be oriented downward towards the floor of the smart-home environment 602, in order to more readily detect a user approaching the thermostat 102 in order to interact with the thermostat 102. An additional motion sensor on the thermostat 102 may be oriented outwards into the room to detect the presence of a user in the home. These two motion sensors can work together to detect both occupancy and approach, and can control the user interface of the thermostat 102 based on whether a user is present and/or approaching. In another example, the field of view of the thermostat 102 may also refer to a three-dimensional area surrounding the thermostat 102 in which the temperature sensors of the thermostat 102 detect ambient temperature. During installation, it may be desirable to ensure that this field of view of the temperature sensors does not intersect with other thermal radiation or emissions, such as heat pipes, HVAC ventilation, sunlight through windows, and so forth.

When installing the thermostat 102, users typically want to ensure that the field of view 604 of the motion sensor is pointed towards a useful area of the smart-home environment 602 where users will be present, or from where users will approach the thermostat 102. It can be difficult for users to know the height at which the thermostat 102 should be installed such that the field of view 604 is optimized to detect approaching viewers. They can also be difficult for users to know where in the smart-home environment 602 the thermostat 102 should be installed to best detect and regulate temperature using the HVAC system. The temperature sensors of the thermostat 102 can be caused to mistakenly estimate the ambient temperature in the smart-home environment 602 when the thermostat 102 is placed in a location that can be influenced by external thermal sources, such as incident sunlight, heating vents, hot water pipes, and other heat sources. Prior to this disclosure, users had to guess where the sensors of the thermostat 102 would be most effective, and then relocate the thermostat 102 through trial and error if the initial installation location was less than optimal.

Figure 7:
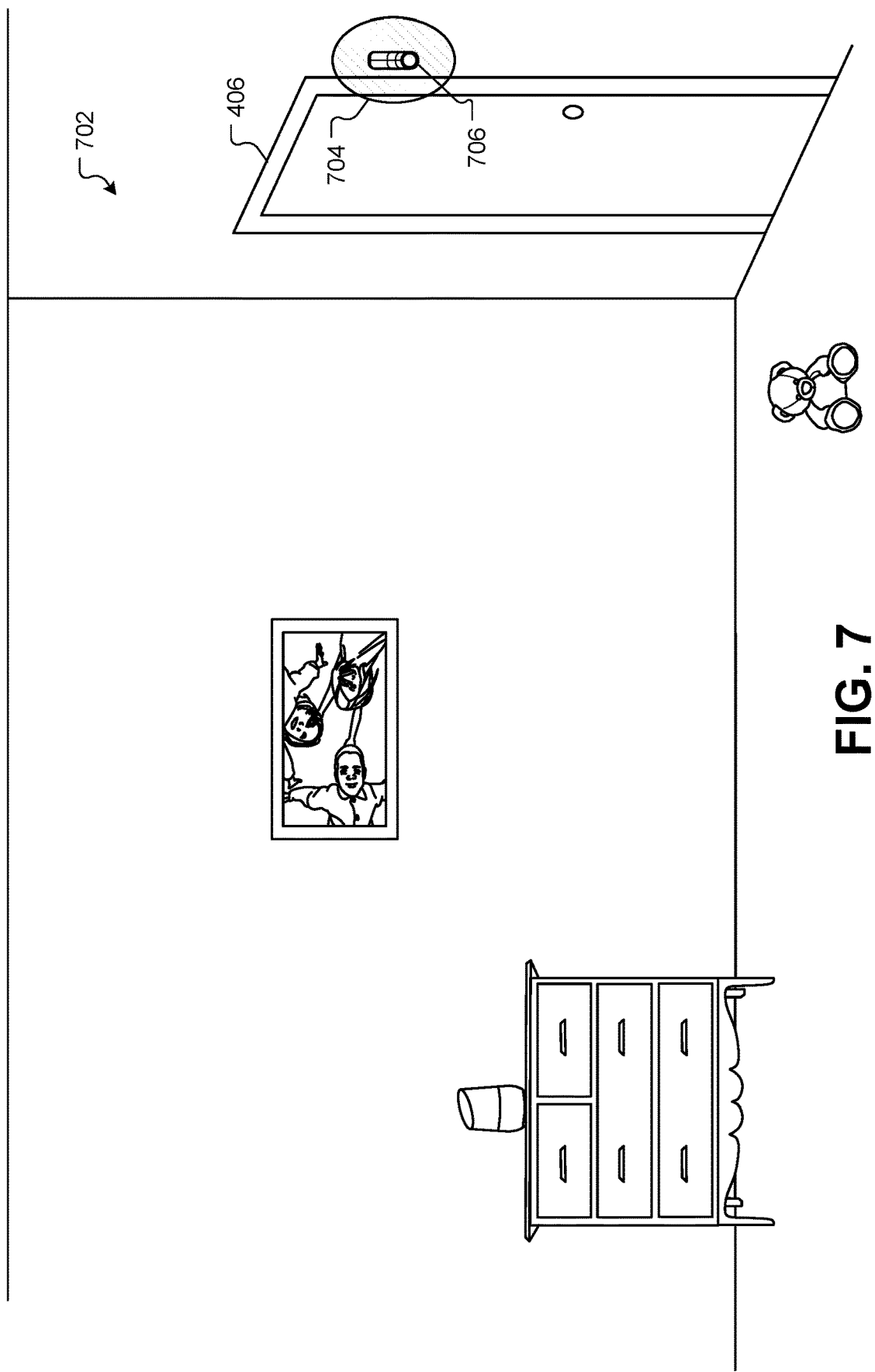
FIG. 7 illustrates a smart-home device in the form of a security device that has a field of view in a smart-home environment, according to some embodiments.

FIG. 7 illustrates a smart-home device in the form of a security device 706 that has a field of view 704 in a smart-home environment 702, according to some embodiments. The security device 706 may include a number of different sensors, such as a motion detector and/or a magnetic sensor. The magnetic sensor may be configured to sense a magnet in the side of the door 406 to determine when the door is open and/or closed. The effective range within which the magnet in the door 406 will be detected by the security device 706 may be considered the field of view 704 of the security device 706. As described above, the motion sensor of the security device 706 may also have its own field of view that extends outward into the smart-home environment 702 to the detect motion of thermal bodies. The security device 706 may also be equipped with an illumination function or a nightlight that emits a field of view corresponding to an area that will be illuminated by the nightlight.

When placing the security device 706, users need to ensure that the security device 706 is close enough to the magnet installed in the door 406 that the security device 706 can accurately determine that the door 406 is open and/or closed. However, the effective range (i.e., field of view) of the security device 706 is not visible to the human eye. Alternatively or additionally, the magnet in the door 406 may also be associated with a field of view that represents the magnetic fields generated by the magnet that are greater than a threshold magnetic strength. Also, a user will typically want to a plurality of security devices 706 with motion detectors throughout the smart home environment 702 such that they are accurately able to detect an intruder or other thermal body moving through the smart-home environment 702. Prior to this disclosure, there was no way for a user to determine when these fields of view overlapped between sensors and were thus inefficient in their placement, or left gaps between sensors and were thus ineffective at detecting an intruder.

Figure 8:
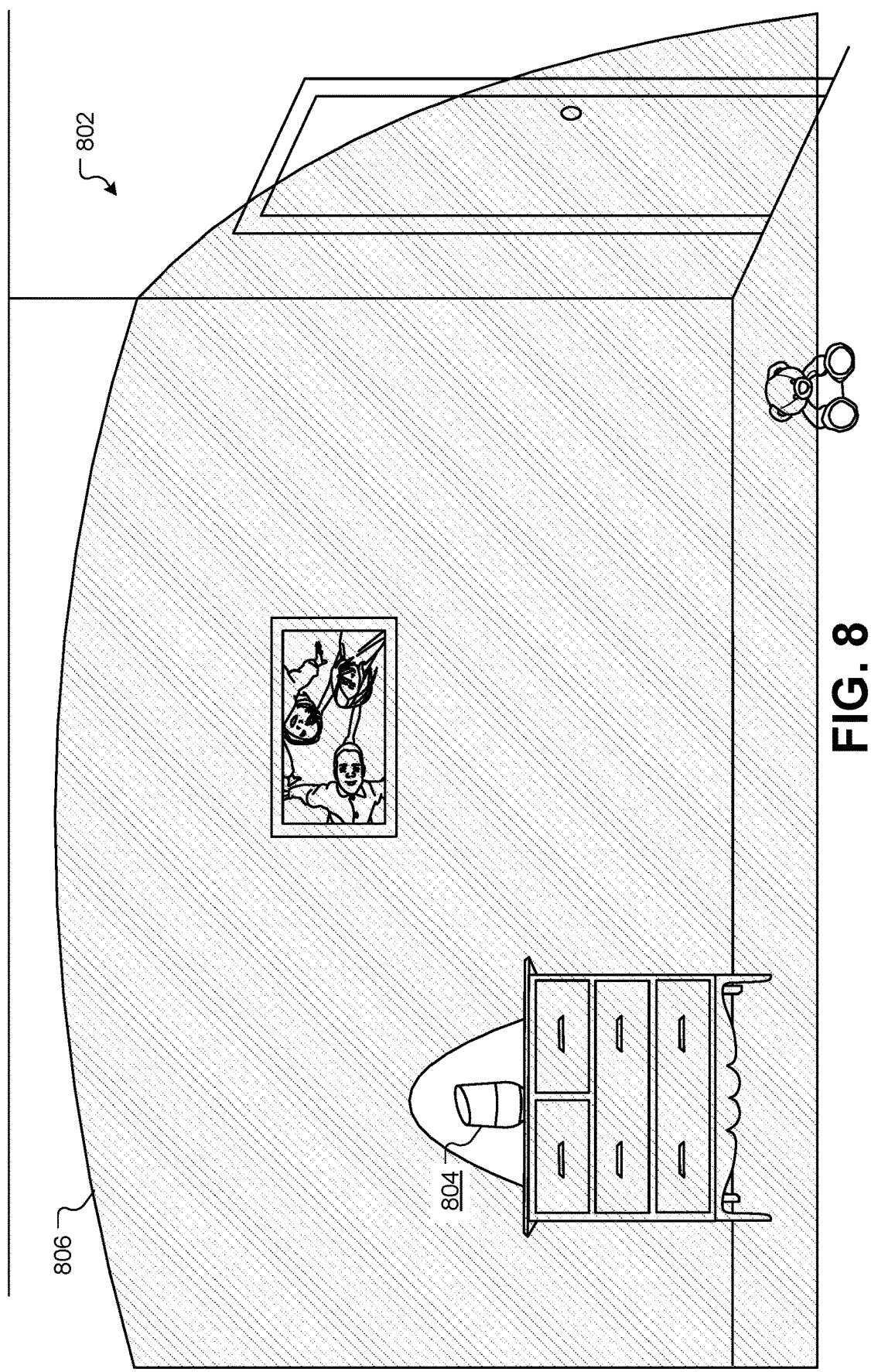
FIG. 8 illustrates a smart-home device in the form of a home assistant with an associated field of view in a smart-home environment, according to some embodiments.

FIG. 8 illustrates a smart-home device in the form of a home assistant 804 with an associated field of view 806 in a smart-home environment 802, according to some embodiments. The home assistant 804 may include a number of different sensors and/or non-visible fields that are emitted therefrom, each of which may have their own associated field of view. For example, the home assistant 804 may include a microphone that can detect human voices and be used to recognize voice commands to the home assistant 804. The field of view (not shown) of the microphone sensor may represent the effective range at which the home assistant 804 is able to accurately receive and interpret voice commands above a certain decibel threshold.

Additionally or alternatively, the home assistant 804 may include wireless communication devices, such as wireless radio devices using various wireless protocols (e.g., Bluetooth®, IEEE 802.11, Thread®, etc.) to communicate with other computing devices and/or smart-home devices. The effective range of the wireless communication devices on the home assistant 804 may also be represented as a field of view 806. Understanding the shape and size of the field of view 806 may be important for determining where other electronic devices that communicate with the home assistant 804 may be located. The field of view 806 may include null locations where wireless communication may be less efficient. The field of view 806 may also include locations where a strong wireless signal may be received. The field of view 806 may also be useful in determining how far apart wireless devices may be spaced before they are out of range. Prior to this disclosure, the location of the home assistant 804 relative to users issuing voice commands and/or other computing devices with which the home assistant 804 may communicate had to be determined through trial and error.

In each of the examples described above, providing a way to visualize the fields of view of the various sensors and/or emissions of the different smart-home device embodiments may provide a useful tool when installing smart-home devices in an environment. Additionally, visualizing the fields of view may help users analyze the existing installation and determine whether the installation can be optimized by changing the location of various smart-home devices. When additional information about the home is known, such as locations of heat generating sources, pipes, electricity, etc., this information can be used to determine whether external sources are interfering with the sensors or broadcasts of various smart home devices.

In the implementations described below, a user may be provided a visualization of one or more fields of view of one or more smart-home devices using a mobile computing device with the camera. As the user aims the camera at the area surrounding the smart-home device, an electronic display on the mobile computing device can render a three-dimensional object into the two-dimensional view of the environment. The three-dimensional object can represent a field of view of any smart-home devices captured by the camera. In some implementations, the display of the mobile computing device can include additional information, such as wall studs, wiring, pipes, heat sources, optimal installation locations, less-than-optimal installation locations, and instructions for installing the smart-home devices. For example, a user can aim the camera on their smart phone at a security device with a motion detector installed in their home. When viewing the motion detector through the camera on the display of the phone, the phone can render an object that represents the field of view of the motion detector. Thus, the user can see exactly where the range of that motion detector extends in their home. In another example, a user can view a wall of their home through their smart phone. The view of the wall through the smart phone can add instructions that show where on the wall a thermostat should be installed for optimal temperature detection and occupancy detection. In another example, a user can view the wiring of a smart doorbell through the camera and electronic display of their phone. The display can render arrows and text instructions that explain where certain wire should be inserted during installation. Each of these implementations and examples will be described in greater detail below.

Figure 9:
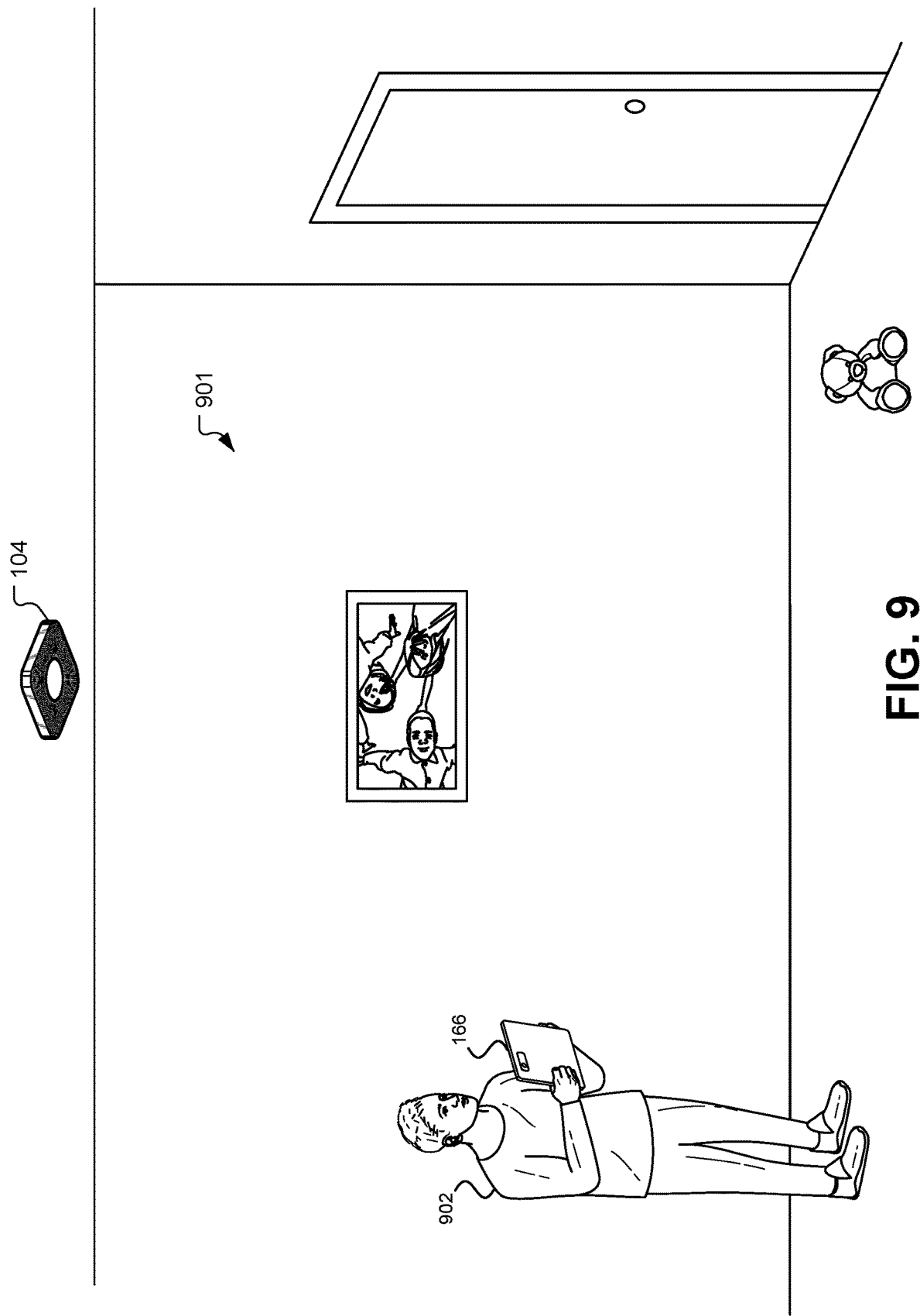
FIG. 9 illustrates a user with a mobile device viewing a smart-home environment 901 through the mobile device, according to some embodiments.

FIG. 9 illustrates a user 902 with a mobile device 166 viewing a smart-home environment 901 through the mobile device 166, according to some embodiments. The smart-home environment 901 includes a hazard detector 104. As described above, the hazard detector 104 may include multiple sensors, including a smoke sensor, a carbon monoxide sensor, a light sensor, a motion sensor, and/or other environmental sensors. The hazard detector 104 may also include wireless communication devices and a light. Each of these sensors/devices may have their own fields-of-view as described above. However, this example will focus on the field of view of the motion sensor that extends downward out of the hazard detector 104. Therefore, the principles described below for visualizing the field of view of the motion sensor of the hazard detector 104 will be understood to apply to any of the other smart-home devices described herein and any of the other sensors and/or fields of view described herein.

After installation of the hazard detector 104, the user 902 may wish to see the field of view of the motion detector of the hazard detector 104. To do so, the user 902 can use the mobile device 166, such as a PDA, a smart phone, a smart watch, a tablet computer, a laptop computer, Google Glass®, and/or any other computing device with access to a camera and electronic display. To view the smart-home environment 901, the user 902 can aim the camera of the mobile device 166 towards the portion of the smart home environment 901 they wish to view. The camera of the mobile device 166 can capture a view of the smart-home environment 901 and display that view on the electronic display of the mobile device 166. In some implementations, the camera of the mobile device 166 may be on a back side of the mobile device 166 pointing away from the user, while the electronic display will be on a front side of the mobile device 166 pointing towards the user. Therefore, the user can look "through" the mobile device 166 like a window to see portions of the smart-home environment 901. In this example, the user 902 can aim the mobile device 166 such that its view captures the area directly underneath the hazard detector 104. Prior to this disclosure, the image on the electronic display of the mobile device 166 seen by the user 902 would be identical to what would be seen by the naked eye of the user 902 if the mobile device 166 was removed from in front of the user 902.

FIG. 10A illustrates a virtual 3-D scene 1001 that may be rendered and displayed on the mobile device 166, according to some embodiments. The virtual 3-D scene 1001 may include a location of a smart home device, such as the hazard detector 104. In some embodiments, the scene 1001 may include a 3-D model or other graphic representation 1006 of the hazard detector. Alternatively, some embodiments may simply use the location of the hazard detector 104 in the smart-home environment 901 to generate a graphic representation of the field of view in the scene 1001 without a corresponding graphic representation of the hazard detector 104. FIG. 10A illustrates a graphic representation 1006 of the hazard detector to illustrate its location, however such a graphic representation 1006 is not necessary.

The virtual scene 1001 may also include a virtual camera 1002. The virtual camera 1002 may be oriented and/or positioned based on an orientation/position of the mobile device 166 in the smart-home environment 901. Similarly, the location of the hazard detector 1006 in the virtual scene 1001 may be based on a location of the hazard detector 104 in the smart-home environment 901. In some embodiments, the virtual scene 1001 may also include representations of walls, floors, ceilings, furniture, entries/exits, light sources, power sources, appliances, windows, HVAC vents, wiring, pipes, plumbing fixtures, and/or any other object that may exist in the smart-home environment 901. Each of these objects may have a corresponding 3-D virtual model in the virtual scene 1001 and may be visible to the virtual camera 1002. In some embodiments, the mobile device 166 may determine and/or store the location of the mobile device 166 relative to the walls, floors, ceilings, exits, windows, etc., of the smart-home environment 901, and the location of the virtual camera 1002 may be located in a corresponding location in the virtual scene 1001. Thus, the virtual scene

1001 may be an approximate representation of the physical features of the smart-home environment 901, including the location of the mobile device 166 approximated by the location of the virtual camera 1002.

The physical measurements and/or features of the smart-home environment 901 can be stored on the mobile device 166 and/or downloaded from a device management server. These physical measurements and/or features can be used to build the virtual scene 1001. For example, architectural plans of a home may be publicly available and retrieved by the mobile device 166 and/or the device management server. These architectural plans can be used to generate the virtual scene 1001 by duplicating the measurements, physical features, and orientation of the home. The mobile device 166 may be equipped with location-determining hardware, such as GPS units, accelerometers, magnetic compasses, and so forth, and may be configured to determine an absolute location of the mobile device 166. The architectural plans may include the coordinates of the home, and these can be used in conjunction with the absolute location of the mobile device 166 to place the mobile device 166 in the smart-home environment 901. This location information can be used to properly place and/or orient the virtual camera 1002 in the virtual scene 1001.

In some embodiments, absolute locations and other details of the smart home environment 901 need not be ascertained by the mobile device 166. Instead, the mobile device 166 can rely on a current location of the mobile device 166 relative to the hazard detector 104. The virtual 3-D scene 1001 can be constructed to include the virtual camera 1002 and the graphic representation 1006 of the hazard detector 104 without all of the physical detail of the surrounding room/environment. The relative location of the hazard detector 104 can be determined using a variety of different methods. In some embodiments, the relative location of the hazard detector 104 can be determined using electromagnetic triangulation and/or signal strength analysis. For example, one of the hazard detector 104 and/or the mobile device 166 can emit an electromagnetic signal, such as a Wi-Fi signal, and one or more smart-home devices in the smart-home environment 901 can compare received signal strengths to triangulate the location of the emitting device. In some embodiments, the relative location of the hazard detector 104 can be determined based on the location and/or movement of the mobile device 166. For example, the user 902 can move the mobile device 166 to the location of the hazard detector 104 in the smart-home environment 901 and provide an input, such as a button click or finger tap on a touchscreen, to mark that location as the location of the hazard detector 104. Afterwards, as the user 902 moves the mobile device 166 away from the marked location, the GPS and/or accelerometers on the mobile device 166 can record a motion path away from the hazard detector 104. This can be used to determine the relative location and/or orientation of the virtual camera 1002 relative to the graphic representation 1006 of the hazard detector 104. In some embodiments, the user may mark a location in the smart-home environment 901 using the camera and/or display of the mobile device 166. For example, the user can aim the camera of the mobile device 166 at the ceiling in the smart-home environment 901 and tap a location in the displayed image where the hazard detector 104 is located. The mobile device 166 can then calculate an approximate location of the hazard detector 104 based on the ceiling height and the height of the mobile device 166. These heights may be estimated, retrieved from architectural plans, entered by the user 902, and so forth. In some embodiments, the relative location of the hazard detector 104 can be captured by the camera of the mobile device 106 using computer vision techniques to recognize the shape of the hazard detector 104 in the image. For example, the user 902 may aim the camera of the mobile device 166 towards the hazard detector 104, and the resulting image captured by the camera can be analyzed and compared to a known shape of the hazard detector 104. When it is located in the image, the size of the hazard detector 104 in the image can be used to estimate a distance from the camera where the hazard detector 104 is located. For example, as the hazard detector 104 becomes smaller in the image captured by the camera, the mobile device 166 can proportionally estimate that the distance between the camera and the hazard detector 104 is increasing. Additionally, the shape (skew, perspective, etc.) of the image of the hazard detector 104 can be used in conjunction with an orientation of the mobile device 166 to determine the orientation of the hazard detector relative to the mobile device 166. For example, the orientation of the mobile device 166 can be ascertained by virtue of onboard accelerometers, compasses, and/or gravitational centers. The shape of the hazard detector 104 in the captured image can be used to determine whether the mobile device 102 is directly beneath the hazard detector 104 or off to one side of the hazard detector 104. Again, any of these methods can be used to locate any smart-home device besides the hazard detector 104 used merely as an example above.

In some embodiments, the location of the hazard detector 104 and/or the locations/orientations of various physical features of the smart-home environment 901, such as walls, furniture, ceilings, floors, etc., can be added to the virtual environment by a number of different methods. In some embodiments, the smart-home environment may be mapped using infrared projectors and/or receivers (e.g., Kinect®) technology). For example, the mobile device 166 may include an infrared projector that "paints" an area in front of the mobile device 166 with encoded infrared radiation. One or more infrared receivers/cameras on the mobile device 166 can capture the reflected infrared radiation and generate a physical mapping of the smart-home environment 901. Objects, such as chairs, tables, walls, doors, etc. can be recognized by comparing the geometries of objects in the infrared reflections with known geometries of these typical household items. Alternatively or additionally, unrecognized objects can have geometries created based on the infrared mapping without requiring an external model. In any case, these objects and/or geometries can be placed into the virtual 3-D scene 1001.

FIG. 10B illustrates how the geometry of the smart-home environment 901 can be mapped visually using the camera of the mobile device 166, according to some embodiments. In this example, the user 902 can provide inputs to the mobile device 166 that identify locations such as floors, corners, walls, ceilings, doors, etc. through a touchscreen of the mobile device 166. The mobile device 166 can then construct planes and/or 3-D geometries in the virtual 3-D scene 1001 that approximate the locations of these planes and/or 3-D geometries identified visually by the camera of the mobile device 166. For example, a smart phone 166-2 mobile device can have its camera pointed towards a corner 1044 in a room in the smart-home environment 901. The image can be visually analyzed by the smart phone 166-2 to identify the boundaries between the walls and the floor 1046 in the image. The user 902 can then select the area in the image corresponding to the floor 1046 to identify the floor as such. The user 902 can also trace a boundary 1042 between the floor 1046 and a wall. The user 902 can also identify corners 1044 in the image. Alternatively or additionally, the software can be equipped to automatically detect and determine the location of the boundary 1042 and/or the corner 1044, and to distinguish the floor 1046, walls, and/or ceiling from each other. In these embodiments, the user can visually trace the boundary of the floor 1046 by moving the camera such that the image visually traces the boundary 1042. As the boundary 1042 is traced and surfaces of walls/floor/ceilings are recognized, the smart phone 166-2 can construct planes in the virtual 3-D scene 1001 to form the room. Objects that are visually identified by the camera of the smart phone 166-2 can be placed in the virtual 3-D scene 1001 from an online library made available to the smart phone 166-2 from a device management server. For example, when the smart phone 166-2 captures an image of a chair, a computer vision algorithm can identify the chair in the image and retrieve a similar chair from a library of chairs that have matching geometries and/or textures and place the 3-D model of the chair in the virtual 3-D scene 1001 at the corresponding location.

Figure 10C:
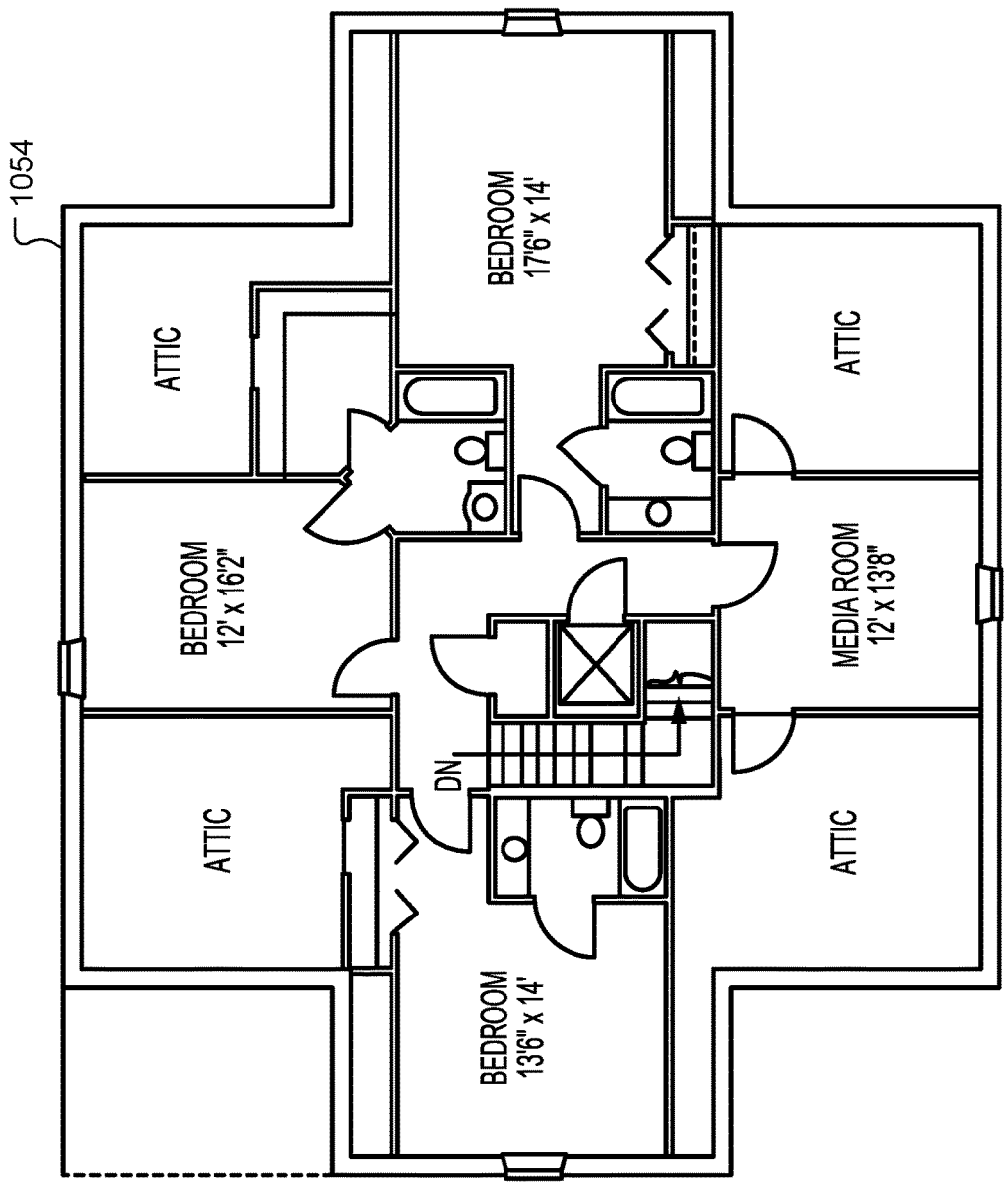
FIG. 10C illustrates a graphical interface on a computing device that allows a user to design the layout of the smart-home environment, according to some embodiments.

FIG. 10C illustrates a graphical interface on a computing device that allows a user to design the layout of the smart-home environment 901, according to some embodiments. In some embodiments, the virtual 3-D scene 1001 can be constructed by the user 902 using modeling and/or architectural design software techniques. For example, an application may be provided that allows a user to provide measurements of their home/rooms and identify locations of objects and/or geometries that exist in each room. The application may execute on a computing device that is the same as or different from the mobile device 166. For example, if the mobile device 166 comprises a smart phone, the smart phone may execute an app that allows the user to enter measurements and draw locations of walls, doors, windows, stairs, etc. for their home. The app may also allow users to select objects, such as chairs, beds, tables, etc., from a library of objects and place them at the locations in each room. The app may allow the user to download architectural plans from a third-party service or public repository. For example, the architectural layout 1054 can be downloaded to the app and used a starting point for the design of the virtual 3-D scene 1001. The architectural layout 1054 can be used as-is, or can be augmented by the user with additional information, such as the addition/placement of furniture and smart-home devices. In some embodiments, the software may be operated on a separate computing device from the mobile device 166, such as a laptop or desktop computer and then transferred to the mobile device 166.

Turning back to FIG. 10A, once the location of the virtual camera 1002 and the location of the graphic representation 1006 of the hazard detector 104 are determined, and any other physical features of the smart-home environment 901 are optionally added to the virtual 3-D scene 1001, a 3-D object can be added to represent the three-dimensional field of view of the hazard detector 104. The field of view object 1004 can be predefined for each type of smart-home device and for each field of view for each device. For example, the field of view object 1004 for the hazard detector 104 can correspond to the motion detector of the hazard detector 104, and may be selected from a library of field of view objects corresponding to the hazard detector 104. Thus, the different field of view objects for the different fields of view corresponding to each smart-home device can be predefined by a manufacturer of the smart-home devices and provided to users through the application used to visualize the installation/operating environment of the smart-home devices ("visualization application"). In some embodiments, the field of view objects for each smart-home device can be generated by a user using specifications provided by the smart-home device manufacturer or measured by the user. For example, the user 902 may know that the motion detector of the hazard detector 104 has a range of approximately 15 feet with a field of view of 120°. The user 902 can then enter the specifications into the application, and the application can generate the field of view object 1004 corresponding to these specifications. This allows the visualization techniques described herein to be used with smart-home devices from any manufacturer.

The field of view object 1004 may exist as a solid geometry or 3-D model in the virtual 3-D scene 1001. In some embodiments, the field of view object may be referred to as simply a "virtual object" that is representative of the field of view. In some embodiments, this virtual object may include a cone projecting away from a location of the smart-home device in the virtual 3-D scene. In some embodiments, the field of view object 1004 may be opaque and colored with a bright color that is easily distinguished from the surroundings, such as yellow, orange, red, etc. In some embodiments, the field of view object 1004 may be translucent or semi-translucent such that when the field of view object 1004 is rendered, walls, floors, ceilings, furniture, doors, and/or other objects in the virtual 3-D scene 1001 are visible behind the field of view object 1004. The borders of the field of view object 1004 may be colored slightly darker, lighter, or in a different color to emphasize the borders relative to the rest of the field of view object 1004 and the rest of the virtual 3-D scene 1001. This can help users distinguish the borders of the field of view object 1004 from other visual elements in the display. This may be particularly true for boundaries that are farthest away from the mobile device 166 that may otherwise be obscured by the rest of the field of view object 1004 itself.

Figure 11:
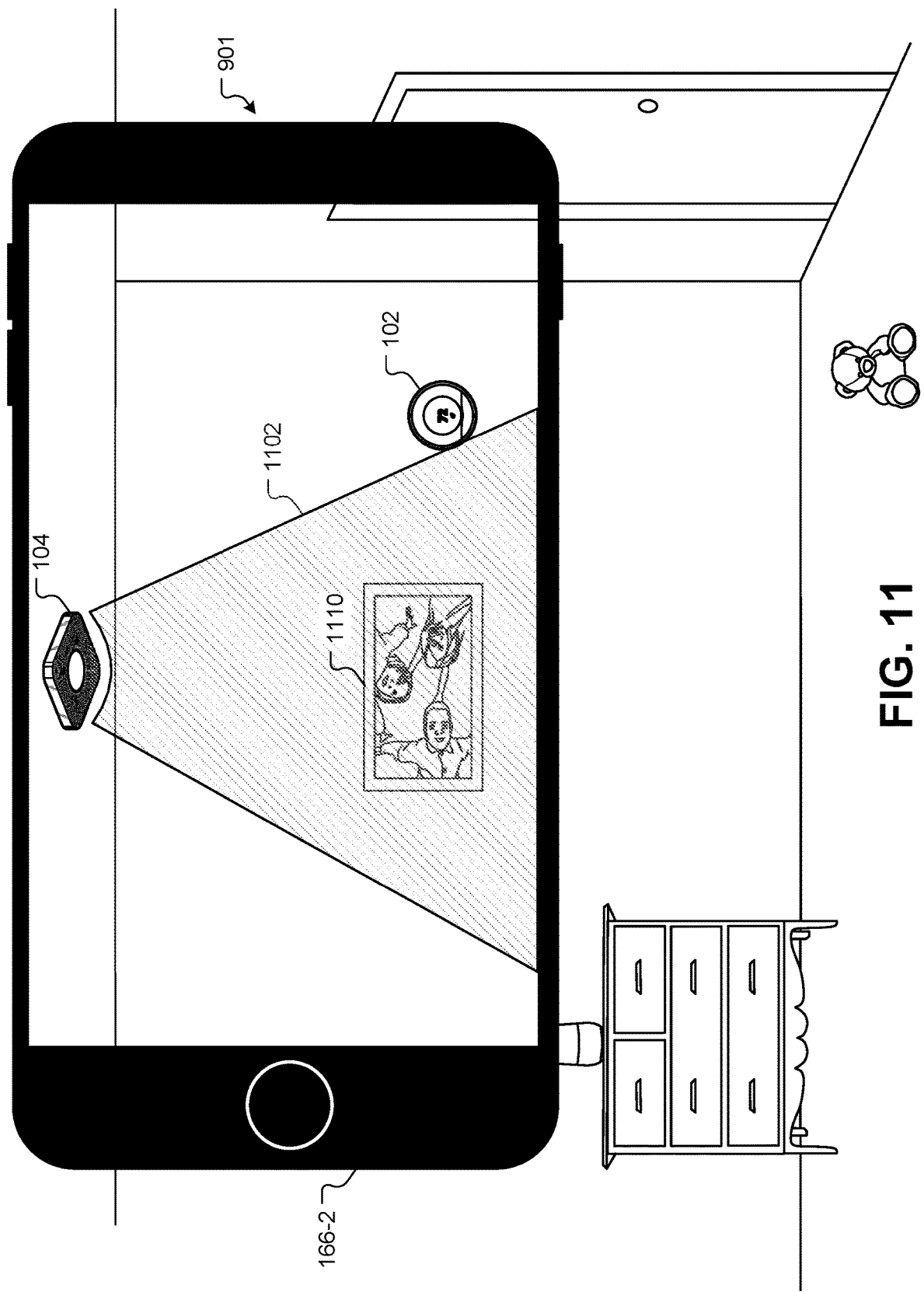
FIG. 11 illustrates a view of the smart-home environment through a smart phone that allows the user to visualize a field of view of the hazard detector, according to some embodiments.

FIG. 11 illustrates a view of the smart-home environment 901 through a smart phone 166-2 that allows the user to visualize a field of view 1102 of the hazard detector 104, according to some embodiments. The virtual 3-D scene 1001 can be rendered into a 2-D image from the perspective of the virtual camera 1002. This rendering operation can take place in real-time such that the 2-D image is displayed on the display of the smart phone 166-2 without a visually perceptible delay. For example, as the user pans the smart phone 166-2 around the smart-home environment 901, the view of the smart-home environment 901 displayed on the smart phone 166-2 can be updated such that the user feels as though they are looking through a window into the smart-home environment 901.

The field of view object 1004 has been rendered as part of the virtual 3-D scene 1001. In some embodiments, the rendering operation may exclude all elements of the virtual 3-D scene 1001 except for the field of view object 1004. The rendering of the field of view object 1004 can then be composited with the real-time image captured by the camera of the mobile device 166. For example, instead of displaying a rendered image of the graphic representation 1006 of the hazard detector 104, the display of the smart phone 166-2 can show the actual image of the hazard detector 104 and the surrounding environment. In embodiments where the field of view object 1004 is translucent or semi-translucent, it can be composited as a layer on top of the visual layer of the image captured by the camera, and elements of the smart-home environment 901 behind the field of view object 1004 may be visible through the rendered field of view object 1004. For example, the picture 1110 hanging on the wall in FIG. 11 may be visible through the field of view 1102 on the display.

If the field of view 1102 is shaded with a color, such as red, the picture 1110 may be visible through the translucent red foreground of the field of view 1102.

Although other elements of the virtual 3-D scene 1001 need not be displayed on the smart phone 166-2, they can still serve a useful purpose during the rendering operation. The shape of the field of view object 1004 can be clipped such that it does not extend through walls, floors, furniture, and so forth in the virtual 3-D scene 1001. For example, part of the rendering operation may trace rays from a source of the field of view object 1004 (e.g., the motion detector of the graphic representation 1006 of the hazard detector 104) and clip any portions of the field of view object 1004 that are blocked by objects in the virtual 3-D scene 1001. For example, the field of view object 1004 will not extend through a chair in the virtual 3-D scene 1001. Thus, when the field of view object 1004 is composited with the real-world image on the display, the field of view object 1004 will not appear to extend through physical objects (e.g., walls, furniture, etc.) in the smart-home environment 901. This provides a realistic view of what can be "seen" by the smart-home device from the perspective of the user.

The visualization displayed on the screen of the smart phone 166-2 can allow the user 902 to visually ascertain the coverage of the field of view 1102 of the hazard detector 104. For example, the user can see that the motion detector of the hazard detector 104 does not extend all the way to the door of the smart-home environment 901. This may cause the user 902 to move the hazard detector 104 to a location closer to the door. In some embodiments, the visualization application may allow the user to test new locations for the hazard detector 104 without physically moving the hazard detector 104. For example, the user may select the hazard detector 104 as displayed on the smart phone 166-2 and drag the image of the hazard detector 104 to the right. The rendering of the corresponding field of view 1102 will also move to the right to stay attached to the moved image of the hazard detector 104. Some embodiments may render the graphic representation 1006 of the hazard detector 104 such that a rendered version of the hazard detector 104 is visible in the new location and/or during the grad/move operation. Some embodiments may instead slide the actual image of the hazard detector 104 to the new location, replacing the previous location with a surrounding background color (e.g., the color of the ceiling). When the coverage of the field of view 1102 is satisfactory (e.g., captures the door) the user can mark the location in the image on the ceiling of the new location of the hazard detector 104 on the display. The user can then, through the image on the display, see the new location of the hazard detector 104 for reference. The user can then physically mark this location of the ceiling using a pencil, and then move the hazard detector 104 to the new location. After moving the hazard detector 104, the user can then view the new location of the hazard detector 104 through the smart phone 166-2 to ensure that the hazard detector 104 was moved to the correct location corresponding to the mark in the image, and that the new location has moved the field of view 1102 such that it captures the necessary information.

Figure 12:
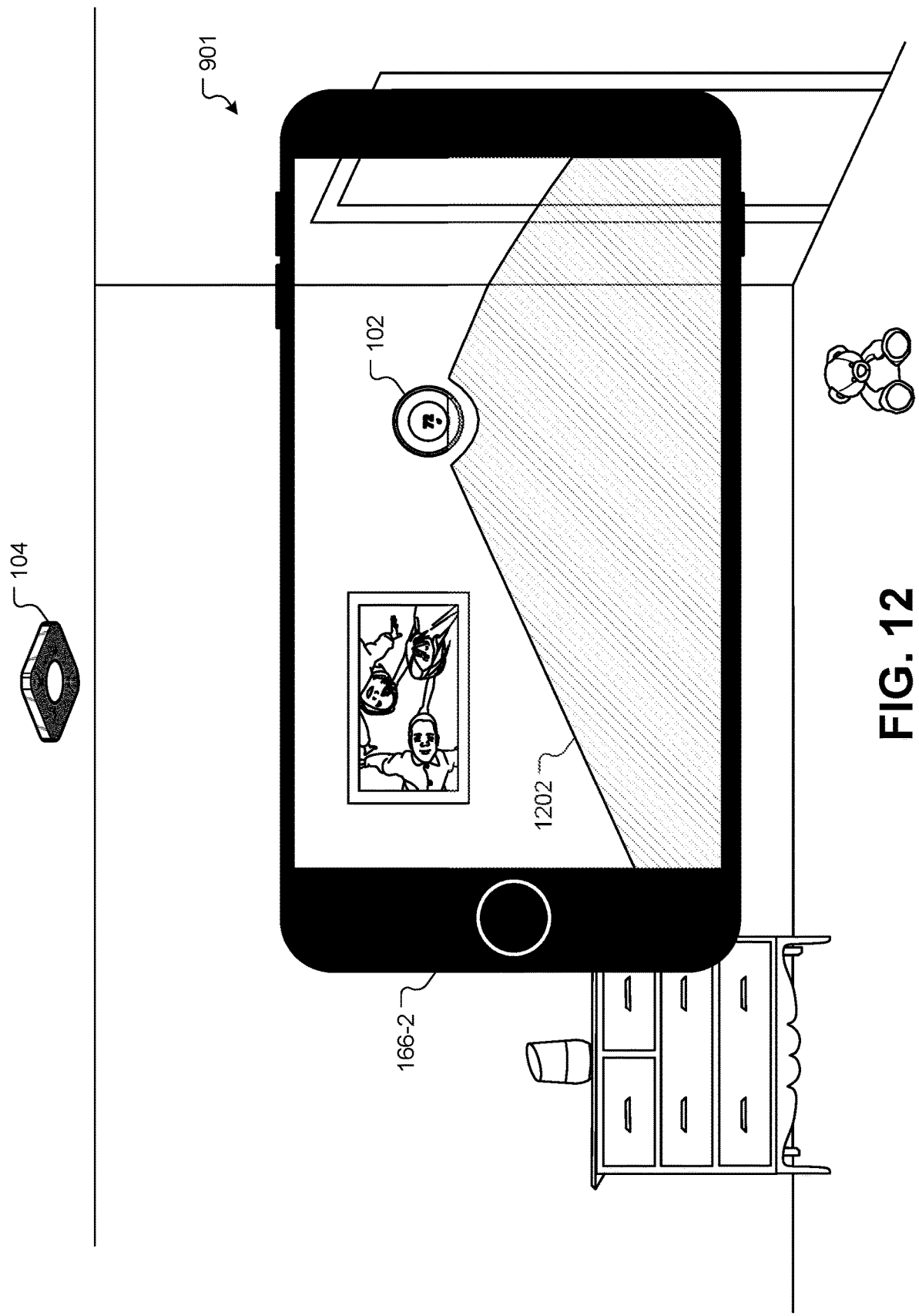
FIG. 12 illustrates another example of a thermostat with a corresponding field of view that may be visualized through a smart phone, according to some embodiments.

FIG. 12 illustrates another example of a thermostat 102 with a corresponding field of view 1202 that may be visualized through a smart phone 166-2, according to some embodiments. In this example, the user can visualize the fields of view 1202 of one of the motion detectors of the thermostat 102. For example, the user can determine from this visualization that the thermostat 102 will detect an approaching user as they enter the door to the smart home environment 901.

In this example, the field of view 1102 from the hazard detector 104 is no longer visible on the smart phone 166-2. In a smart home environment 901 that includes more than one smart-home device, the visualization application may allow the user 902 to select a smart-home device that is currently active in the display. Furthermore, the visualization application can allow the user to select between different fields of view that might originate from a single smart-home device. For example, the user may select the thermostat 102 (and/or deselect the hazard detector 104) and select the approach (or second) PIR of the thermostat 102 for display. In some embodiments, the visualization application can visually recognize smart home devices that are within the field of view of the camera and automatically switch the visualization to the recognized smart-home device. For example, as the user pans the camera of the smart phone 166-2 down and away from the hazard detector 104, the field of view 1102 of the hazard detector 104 can stay visible, even as the hazard detector 104 passes out of the view of the camera. However, when the thermostat 102 enters the field of view of the camera, the visualization application can automatically recognize the image of the thermostat 102 and switch to the thermostat 102 as the active smart-home device without requiring a user input. When switching to the thermostat 102, the visualization application can remove the field of view 1102 for the hazard detector 104 and activate the field of view 1202 of the thermostat 102. As will be described in greater detail below, some embodiments allow for the display of multiple fields of view for a single device simultaneously, as well as fields of view of multiple devices simultaneously.

Figure 13:
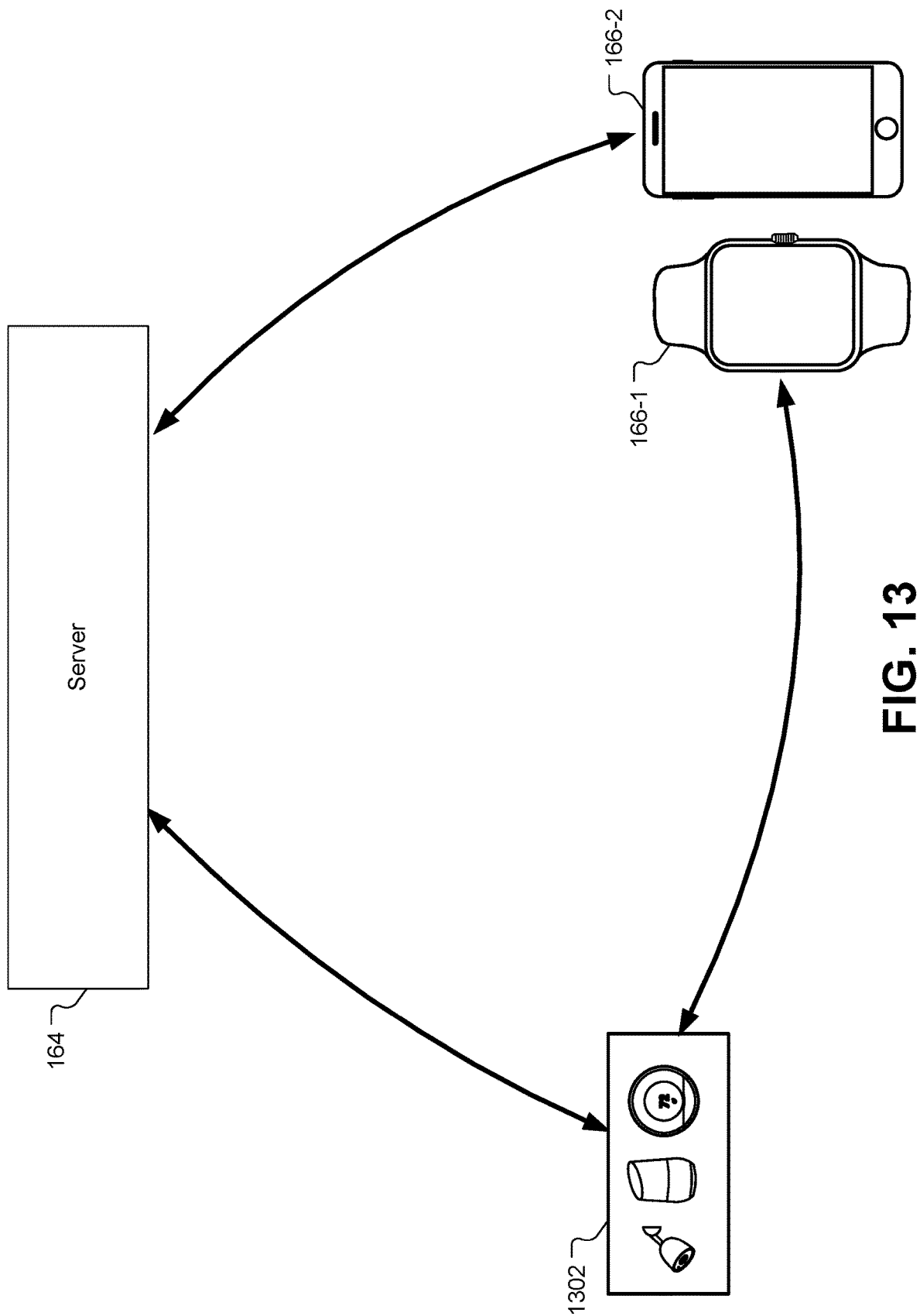
FIG. 13 illustrates an architecture comprising different devices that may be involved in the visualization process, according to some embodiments.

FIG. 13 illustrates an architecture comprising different devices that may be involved in the visualization process, according to some embodiments. As described above, there may be numerous processing operations that take place in order to display a visualization of the field of view on the mobile device 166. These operations may include designing a mapping or 3-D environment of a home or a room, turning that mapping or 3-D environment into a virtual 3-D scene 1001, adding a field of view object 1004 to the virtual 3-D scene 1001, tracking the location and/or orientation of the mobile device 166 and/or the selected smart home device, moving the virtual camera 1002 in the virtual 3-D scene 1001 to correspond to the location and/or orientation of the mobile device 166 in the smart-home environment 901, adjusting or clipping the field of view object 1004 based on the geometry of the room in the virtual 3-D scene 1001, rendering a view of the virtual 3-D scene 1001 to generate a 2-D view of the virtual 3-D scene 1001 from the perspective of the virtual camera 1002, and causing at least a render of the field of view object 1004 to be displayed on the mobile device 166 in real-time as would be viewed by the user. Each of these operations may be optional. Furthermore, each of these operations may be a segmented portion of an image capture, processing, and display pipeline, and each of these operations may be performed by different devices.

FIG. 13 illustrates how multiple devices in the smart home system can communicate with each other during the image capture, processing, and display process. One or more smart home devices 1302 can communicate with a device management server 164 through a Wi-Fi router and/or the Internet. The device management server 164 can also communicate with numerous mobile devices, such as smart watches 166-1, smart phones 166-2, wearable technology, and so forth. Like the smart home devices 3002, the mobile devices 166 can communicate through a Wi-Fi router, the Internet, cellular networks, and/or other communication networks with the device management server 164. In some embodiments, the mobile devices 166 can also communicate with the one or more smart home devices 1302 directly through a local Wi-Fi network or other wireless communication networks, such as Bluetooth® or Thread®.

Different pieces of the image capture, processing, and display pipeline can be performed at each of the different computing devices illustrated in FIG. 13. In some embodiments, the entire process may be executed on the mobile devices 166. For example, the smart phone 166-2 can capture an image of a room, generate the virtual 3-D scene, insert the field of view object, track its location relative to one or more smart home devices, render views of the scene with the field of view object, and display the rendered images in real time on its display screen. In other embodiments, operations such as the rendering operation and other operations using the virtual 3-D scene may be performed at the device management server 164. For example, the smart phone 166-2 may capture images of the environment and transmit those images to the device management server 164. The device management server 164 may construct the virtual 3-D scene, insert the field of view object, and perform the clipping and rendering operations. The device management server 164 can then send a stream of 2-D images to the smart phone 166-2 for real-time display. This effectively moves the heavier processing operations (e.g., 3-D modeling, rendering, etc.) to the server where more processing power may be available. Other embodiments may split the image capture and image display operations between two different devices. For example, the smart phone 166-2 may be used by one user to capture a view of the room, the virtual 3-D scene operations may be performed on any device, and portions of the rendered scene may be displayed on another user's smart watch 166-1. These two mobile devices 166 may be in different locations, allowing one user to be in the smart-home environment any other user to view the smart home environment remotely. Other embodiments may use images captured by the one or more smart home devices, such as a monitoring camera, and/or me perform some processing operations on the one or more smart home devices 1302. To summarize, any of the processing operations described above can be isolated as individual functions and performed on any device individually in FIG. 13. The inputs and/or outputs of each function can then be transmitted to another device in the system to perform subsequent operations, including processing and display of images in any combination and without limitation.

As will be described in greater detail below, applications or processes operating on any of the smart home devices 1302, the device management server 164, and/or the mobile devices 166 can allow users and/or processes from one device to interact with users and/or processes on other devices. For example, an installation professional can log into the device management server 164 from a personal computing device. When authorization from the user is received, the personal computing device of the installation professional can be connected to the mobile device of the user during the smart-home device installation process. This can allow the installation professional to provide real-time, live assistance during the installation process. Additionally, live images and visualizations can be transmitted from the mobile device 166 to the personal computing device of the installation professional. The installation professional can also provide inputs (e.g., drawings on the screen, arrows, etc.) Through their personal computing device to be displayed on the user's mobile device 166. In another example, the images and/or visualizations from the mobile device 166 can be uploaded to the server 164, and the server 164 can process these images to make recommendations for additional smart-home devices, installation procedures, common hazards and errors, and so forth.

Figure 14:
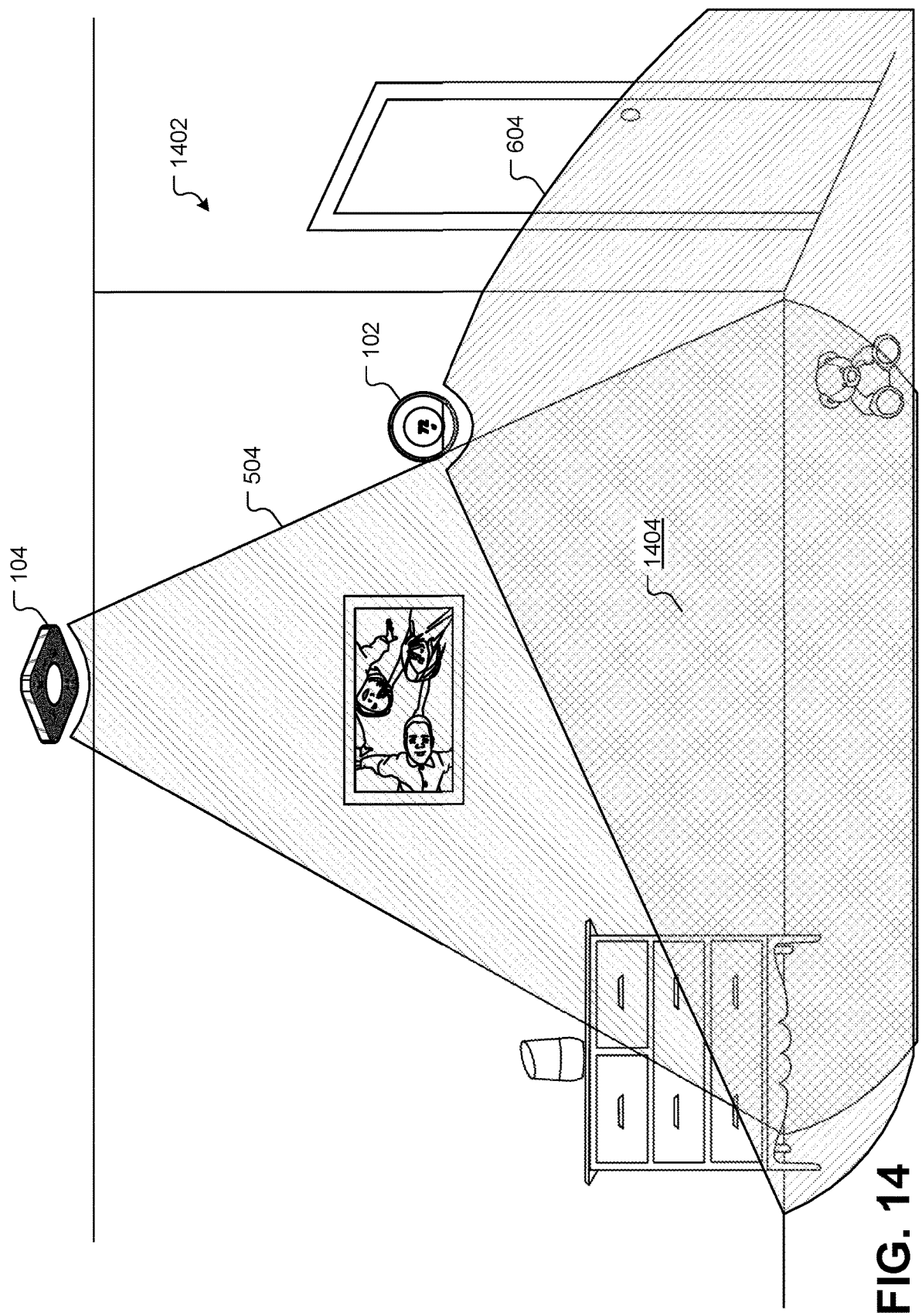
FIG. 14 illustrates a complex smart-home environment with multiple smart-home devices, according to some embodiments.

FIG. 14 illustrates a complex smart-home environment 1402 with multiple smart-home devices 102, 104, according to some embodiments. From this point forward in this disclosure, the rendered fields of view 504, 604 may be included as part of the figures without specifically illustrating that they are viewed through the screen of a mobile device. This is done merely for clarity, and it will be understood that any image depicting a field of view object in a smart-home environment is being viewed through the display of the mobile device after undergoing processing operations such as those described above. For example, FIG. 14 illustrates a view of the complex smart-home environment 1402 through the view of a mobile device, even though the outline of the actual mobile device in question is not visible in FIG. 14.

When multiple smart-home devices are present, the visualization application may allow for the display of multiple fields-of-view simultaneously. In this example, the field of view 504 of the hazard detector 104 is shown simultaneously with the field of view 604 of the thermostat 102. The visualization application allows the user to select between any and/or all fields of view that may be available in the complex smart-home environment 1402. This provides the benefit of allowing users to see how fields of view overlap with each other. In this example, the fields of view 504, 604 correspond to motion sensors in the hazard detector 104 and the thermostat 102. The user may want these fields of view to overlap as uniformly as possible such that a user that is detected by the thermostat 102 will also be detected by the hazard detector 104. By displaying the fields of view simultaneously, users can move the installation location of one of the smart home devices 102, 104 such that the fields of view 504, 604 overlap more consistently/completely.

To aid in this operation, the visualization application may allow different visualization features to be selected by the user. For example, users are able to select the color, shading, translucence, and/or other visual features for each of the fields of view 504, 604 as they are displayed on the device. Specifically, the field of view 504 of the hazard detector 104 can be displayed in a first color having a first fill pattern and/or a first translucence, while the field of view 604 of the thermostat 102 can be displayed in a second color having a second fill pattern and/or a second translucence. Additionally, when these fields of view 504, 604 are rendered in the corresponding virtual 3-D scene, portions of the fields of view 504, 604 that overlap can be identified as their corresponding field of view objects collide with each other in the scene. The overlapping volumes of these two fields of view objects can be identified, and the overlapping volumes can be displayed having their own individual coloring/fill/translucence features. For example, the overlapping volume 1404 of the fields of view 504, 604 can be displayed in a third color having a third fill pattern and/or a third translucence. This can serve to visually highlight areas where fields of view overlap in the smart home environment 1402. This can be particularly advantageous when placing multiple smart-home devices (e.g. multiple hazard detectors 104, multiple cameras 118, or combinations thereof) to ensure adequate sensor coverage in the smart home environment. Some embodiments may allow the user to select additional options that highlight overlapping volumes/areas. For example, a user may select an option that only displays the overlapping volumes. In another example, a user may select an option that eliminates overlapping volumes from the display. In another example, a user may invert the field of view objects in the virtual 3-D scene such that volumes are rendered outside of the field of view objects. These rendered volumes can then be displayed on the mobile device to specifically show areas that are not covered by the fields of view 504, 604 of the smart-home devices 102, 104. In the example of FIG. 14, this would invert the displayed image such that areas outside of the fields of view 504, 604 would be shaded/highlighted, while areas inside the fields of view 504, 604 would be clear.

In order to select between the different fields of view 504, 604, the mobile device through which the smart home environment 1402 is viewed can receive selections of devices and/or fields of view through the display. For example, the user may select the field of view 504 of the hazard detector 104 by clicking or tapping either the image of the hazard detector 104 and/or the displayed field of view 504. This operation may "turn off" the display of other fields of view, such as the field of view 604 of the thermostat 102. To switch between fields of view, the user may then click or tap the display of the thermostat 102 and/or the field of view 604 of the thermostat 102. This operation may "turn off" the display of the field of view 504 of the hazard detector 104 and "turn on" the field of view 604 of the thermostat 102. In some embodiments, tapping an image of a smart-home device and/or its corresponding field of view may toggle the view of the corresponding field of view on or off. This allows users to simultaneously turn on multiple fields of view by tapping/clicking on the images of each corresponding device. Users can then individually turn off fields of view by again tapping/clicking the desire smart home devices.

FIG. 15A illustrates a field of view 604 with range indications, according to some embodiments. Generally, most fields of view for smart-home devices will have an effective range associated with each field of view. For example, the motion detector of the thermostat 102 may have an effective range of 6 feet, while a second motion detector on the thermostat 102 may have an effective range of approximately 25 feet. As illustrated in the previous figures, the effective range of the field of view may be displayed uniformly in the image on the mobile device. However, the effectiveness of the field of view will generally decrease as it extends away from the smart-home device. For example, the effectiveness of a motion detector with a range of 25 feet may be more effective at 15 feet that it is at 25 feet. The images captured by a camera may be sufficient to detect facial features or monitor infant at 10 feet, but not 15 feet, even though the image may still be captured. Some embodiments take the diminishing quality of the field of view into account and display this information as part of the fields of view on the mobile device.

In some embodiments, the rendered field of view displayed on the mobile device may use color, fill patterns, translucence, or other visual indicators to convey the strength of the field of view to the user. Some fields of view may use a varying color spectrum as they extend away from the smart-home device. For example, the field of view 604 may be shaded red close to the thermostat 102, then transition to blue across the color spectrum as it moves farther away from the thermostat 102. Some fields of view may vary in translucence as they move away from the smart home devices. For example, the field of view 604 may be completely opaque near the thermostat 102 and become more translucent as it moves away from the thermostat 102. These transitions in color, translucence, intensity, and so forth, may be displayed gradually and change continuously as the field of view 604 moves away from the thermostat 102.

Some embodiments may quantize different regions of the field of view 1504 to convey which regions of the field of view are most effective. In the example of FIG. 15A, the field of view 604 may be divided into a first region 1504 and a second region 1502. These regions may include a border that visually separates these two regions such they are easily visually distinguishable by the user when viewing the display. In some embodiments, the first region 1504 may be considered an effective region, while the second region 1502 may be considered an extended region. The user may understand that the effective region of the field of view 604 is effective to detect motion within a predefined specification, while the extended region of the field of view 604 may still detect motion, although less effectively. To generate this view, the corresponding field of view object in the virtual 3-D scene can be segmented into multiple volumes. Portions of the volume that are within the effective range of the smart-home device can be rendered in a first color, while portions of the volume that are within the extended range of the smart-home device can be rendered in a second color. Alternatively or additionally, the translucence and/or intensity of the colors may also be rendered differently. For example, the effective region may be more opaque than the extended region. In the example of FIG. 15A, the first region 1504 may have a different color (e.g., green) than the second region 5002 (e.g., yellow, red). Note that the division into two regions illustrated in FIG. 15A is provided only as an example and is not meant to be limiting.

Other implementations may use more than two regions, and each region may include varying colors, intensities, patterns, translucence, and/or combinations thereof to convey information. For example, the first region 1504 may include a gradual transition from red to blue as the first region 1504 extends away from the thermostat 102. The second region may then gradually transition from blue to dark blue such that the color transition between the first region 1504 and the second region 1502 is continuous. However, the border between the two regions may still be rendered and visually perceptible to the user. An example of FIG. 15A, the color of the first region 1504 and the second region 1502 may be the same or have a gradual transition, but a line 1506 may be displayed to separate the two regions visually.

In addition to displaying fields of view associated with smart-home devices, the visualization application can also provide visualizations that aid in the installation of smart home devices. For example, some smart-home devices may require installation in certain locations that have specific requirements such as height, orientation, position, location, and so forth. For example, a smart home camera may need to be placed a certain height above ground in order to capture enough light and have a sufficient view of the surrounding region. A motion detector for a security system may also require installation within a certain height range on a wall to ensure that it can adequately detect human presence while excluding the presence of pets. Some smart home devices may include environmental sensors. These smart-home devices may need to be installed in locations where other environment conditions will not interfere with the operation of these environmental sensors. For example, a thermostat may need to be placed in a location that is not near any other heat sources, such as hot water pipes, heater vents, electric heating, incident sunlight, and other heat sources that may interfere with temperature sensors on the thermostat. A hazard detector may need to be placed in a location that as adequate ventilation and is not directly above any appliances that may generate incidental smoke, such as a stove or oven. The visualization application described above can be used to visualize locations where these and other types of smart-home devices can be safely installed.

Figure 15B:
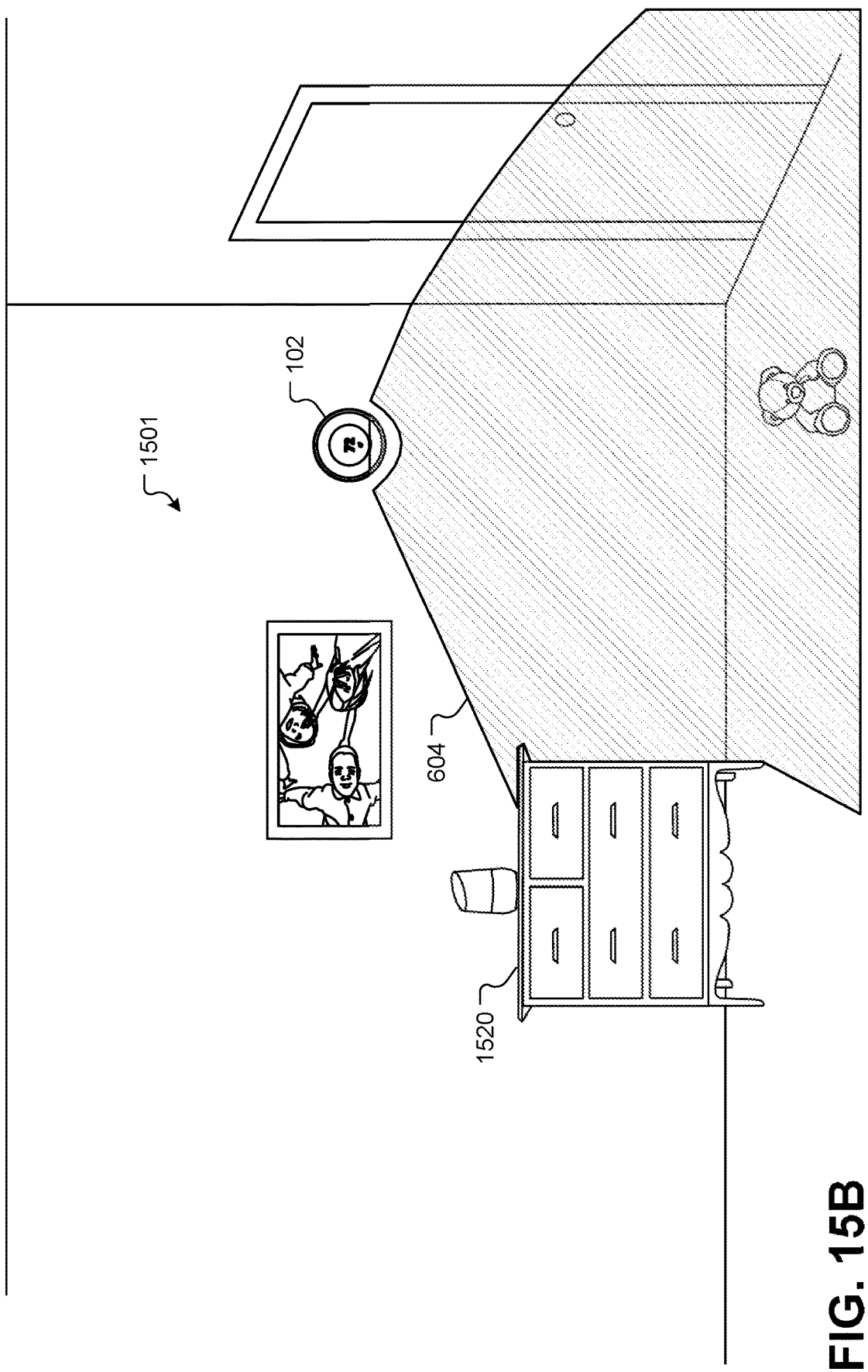
FIG. 15B illustrates a field of view for a smart-home device that is altered because of obstructions, according to some embodiments.

FIG. 15B illustrates a field of view 604 for a smart-home device that is altered because of obstructions, according to some embodiments. In this example, the field of view 604 is emitted from a smart-home device, such as a thermostat 102, to represent the field of view of a motion sensor on the thermostat 102. As the virtual 3-D scene of the smart-home environment 1501 is generated, different objects in the smart-home environment 1501 can be added to the scene. These objects can be detected and/or added using any of the methods described above. For example, a user may select items from a library of furniture objects and place them in the room within the visualization application. The objects may be detected visually using computer vision algorithms, scanned by emitting/receiving active infrared, and so forth.

When an object, such as one representing the dresser 1520 is detected/added in the virtual 3-D scene, the corresponding field of view objects for the smart-home device may intersect with the object. An example of FIG. 15B, the field of view object in the virtual 3-D scene would intersect volumetrically with the 3-D model of the dresser 1520. This may cause a number of operations to take place. For example, the field of view object can be clipped such that it does not intersect with the volume of the 3-D model of the dresser 1520. Some embodiments may also use ray-tracing algorithms or other methods to clip additional areas from the field of view object that would no longer be visible to the smart-home device after they are obstructed by the dresser 1520. These additional volumetric areas behind objects that block the field of view of the smart-home device can also be removed.

As described above, the other objects in the virtual 3-D scene can be removed such that only the field of view object is rendered and composited on the display of the mobile device. As can be seen in FIG. 15B, the field of view 604 is shown such that it does not extend behind the dresser 1520. Because this rendering operation is done in real-time, the user can walk around the room and see areas that would be blocked by objects in the room. For example, the user can walk behind the dresser 1520 and see that they are no longer in the field of view 604. Note that the other features described herein, such as changing the field of view 604 and/or generating other alerts when a user enters the field of view can still remain active when the field of view object is clipped based on other objects in the smart-home environment 1501. In another example, the walls/doors/windows in the room may also clip the field of view object. This can allow users to see how the field of view is altered when the door is opened, when a window is opened, and so forth. It also visually reminds users that the field of view object may not extend through solid services, such as walls and floors. In some embodiments where the field of view of the sensor can extend through solid objects, such as electromagnetic radiation, Wi-Fi signals, magnetic sensors, and so forth, the field of view object need not be clipped by solid objects. Instead, these field of view objects can be clipped by objects or sources that would interrupt the field of view. For example, a metal door or conductive sheet may interfere with a Wi-Fi signal or other wireless communication signal. The field of view illustrating the range of the wireless communication field can be clipped by the interference source in a way that is similar to the visual clipping of the field of view in FIG. 15B by solid objects but which accounts for the physics of the electromagnetic field.

Some embodiments may include a user setting that allows them to turn on/off the clipping operation based on obstructing objects. For example, a user may wish to see the field of view regardless of any objects that might block the field of view. This may be particularly helpful when users are initially placing the smart-home device or determining where to place objects in the smart-home environment 1501.

Figure 15C:
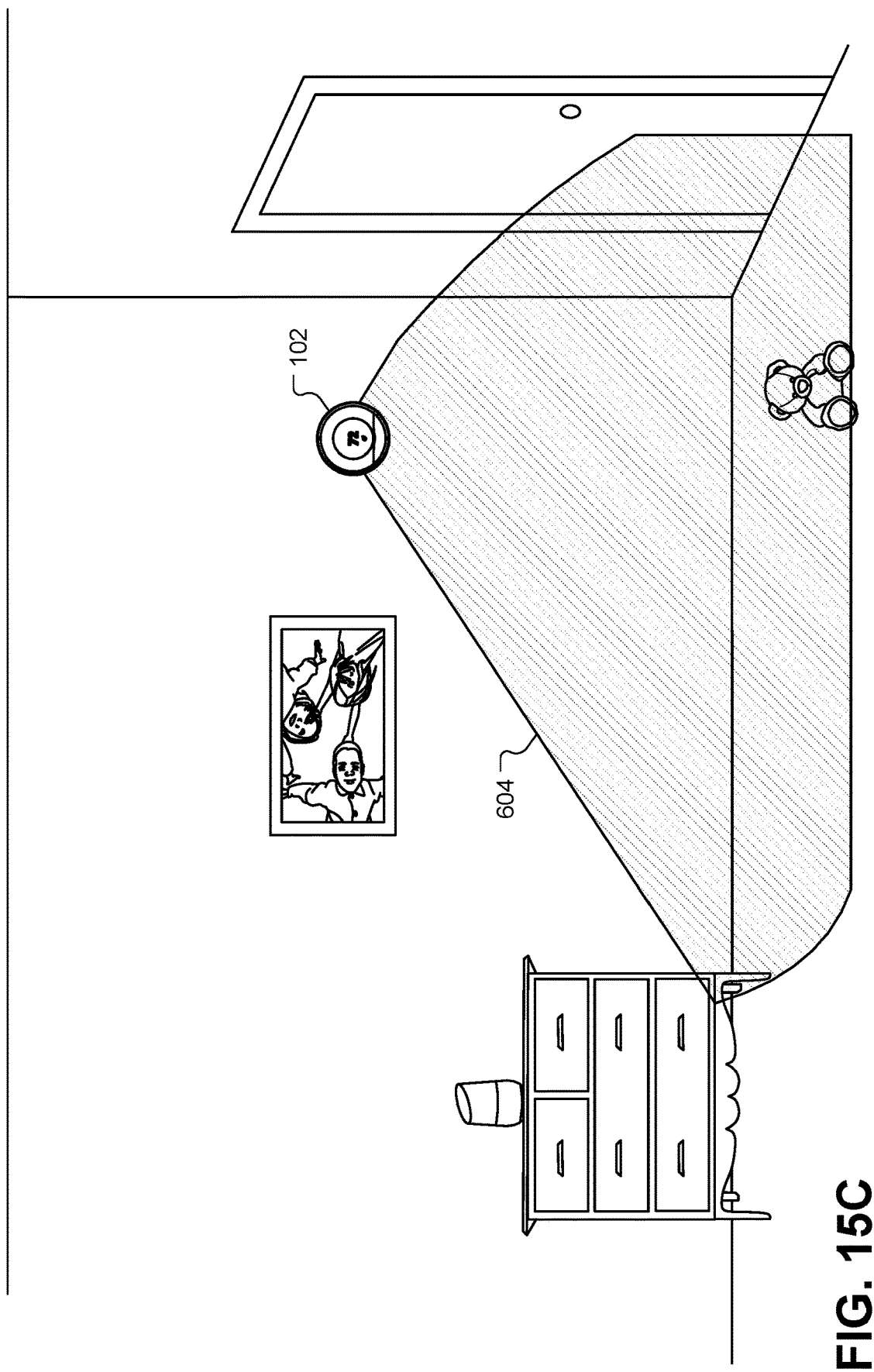
FIG. 15C illustrates a field of view that is adjusted based on sensitivity preferences of the smart-home device, according to some embodiments.

FIG. 15C illustrates a field of view that is adjusted based on sensitivity preferences of the smart-home device, according to some embodiments. Some smart-home devices may allow a user to adjust the sensitivity of a particular sensor. For example, if a motion detector on a security system sensor is inadvertently detecting household pets, the sensitivity of the motion detector can be turned down. In another example, a strength of a Wi-Fi signal can be boosted when sensors are having trouble communicating with each other within the smart-home environment.

When a user adjusts the sensitivity, range, shape, and/or other characteristic of the field of view for the sensor on the smart-home device, the smart-home device can transmit the new setting to the mobile device such that the visualization of the field of view can be updated in real-time. Alternatively or additionally, the user can adjust these field of view characteristics using the visualization application on the mobile device, and the visualization can change accordingly in real-time. Some embodiments may also transmit the adjustments made in the visualization application to the smart-home device such that its settings can be updated remotely through the mobile device.

When new sensor characteristics are received by the visualization application, the shape, size, orientation, and/or other characteristics of the corresponding field of view object in the virtual 3-D scene can be adjusted accordingly. In the example of FIG. 15C, the sensitivity of the motion detector may have been decreased. This has caused the field of view 604 of the motion sensor to be reduced in size. Specifically, the radius of the cone of the field of view object has decreased, and the effective range (e.g., the distance from the thermostat 102) has been reduced. This feature can allow users to manually adjust the sensitivity of the field of view object to capture a field of view as desired. For example, users can increase the sensitivity of a sensor until its field of view overlaps with a field of view of another smart-home device.

Some embodiments may also display information regarding the effect that altering the sensitivity of a sensor may have on electrical operation of the smart-home device through the visualization application. For example, the display may indicate that increasing the sensitivity of a motion detector may decrease the lifetime of the battery by a percentage amount. This allows users to balance energy efficiency with sensor sensitivity.

Figure 15D:
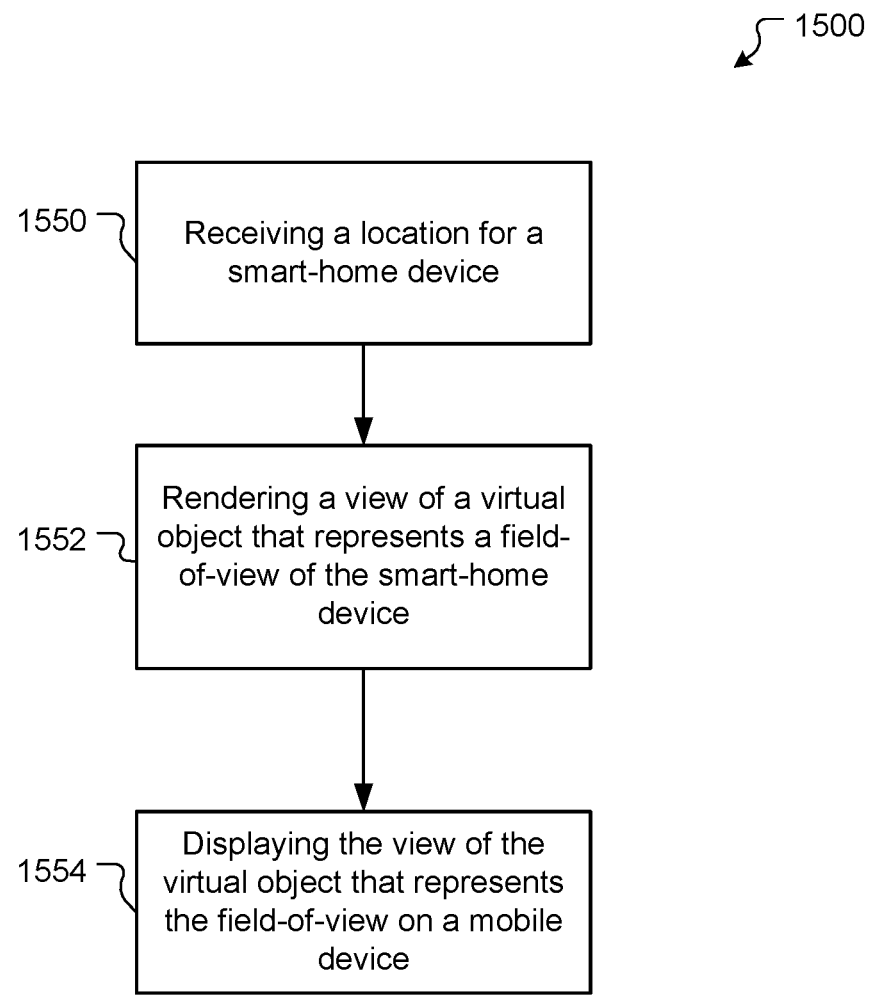
FIG. 15D illustrates a flowchart of a method for optimizing the placement of a smart-home device, according to some embodiments.

FIG. 15D illustrates a flowchart of a method for optimizing the placement of a smart-home device, according to some embodiments. The method may include receiving a location for a smart-home device (1550). The location for the smart-home device may be in a room or other subdivision of an enclosure, such as a house, an office building, a warehouse, or any other commercial/residential enclosure. The location may be received by a mobile device, such as a smart phone, tablet computer, augmented reality device, virtual-reality device, and so forth. The location may be received as the location of the mobile itself. The location also may be received as a transmission from the smart-home device providing location information, such as GPS coordinates or a location relative to the location of the smart-home device. The mobile device may include a display and/or a camera. The location of the smart-home device may be received from an image received by the camera of the smart-home device. For example, a user may select a portion of the screen indicating the location of the smart-home device. The mobile device may also use computer vision algorithms to recognize the shape of the smart-home device in the image and thereby determine the location of the smart-home device.

The method may also include rendering a view of a virtual object that represents a field-of-view of the smart-home device (1552). As described above, the field-of-view may include a responsive area of a sensor on the smart home device, such as an area that would detect motion for a PIR motion sensor. The field-of-view may also include an area in which transmissions or light may be sent or received by the smart-home device. For example, the field-of-view may include an electromagnetic range for wireless transmissions, a range for a magnetic sensor, a range in which voices may be accurately recorded and recognized by a microphone, a visual range for a camera, a range in which chemicals can be detected, such as radon, carbon monoxide, or other gases that may be received by the smart-home device, and/or any other environmental condition that can be sensed or affected by the smart-home device.

The view of the virtual object may be rendered based on a position corresponding to a position of the mobile computing device. For example, a 3D virtual scene of the environment surrounding the mobile device may include a virtual camera that is positioned according to the real-world position of the mobile device. The virtual object may include a translucent solid object or wireframe object that is inserted into the 3D virtual scene to represent the field-of-view. The view of the virtual object may be rendered such that other objects in the 3D virtual scene are removed. The virtual object can then be composited or layered on top of an image, and the perspective of the rendering may be such that the virtual object appears as an augmented reality addition to the real-world environment when viewed through the mobile device.

The method may also include displaying the view of the virtual object that represents the field-of-view on the mobile device (1554). The rendering and display of the virtual object may take place in real time at interactive frame rates such that there is a less than approximately a 1 second delay between the capture of the image by the camera of the mobile device and the display of the composited image on the display of the mobile device. The view may also be updated in real time such that it is updated in a plurality of image frames that are displayed sequentially as a real-time video. The method may also include any of the other features for optimizing the placement of a smart-home device described elsewhere in this disclosure. These other features may be included in any combination and without limitation.

Figure 16:
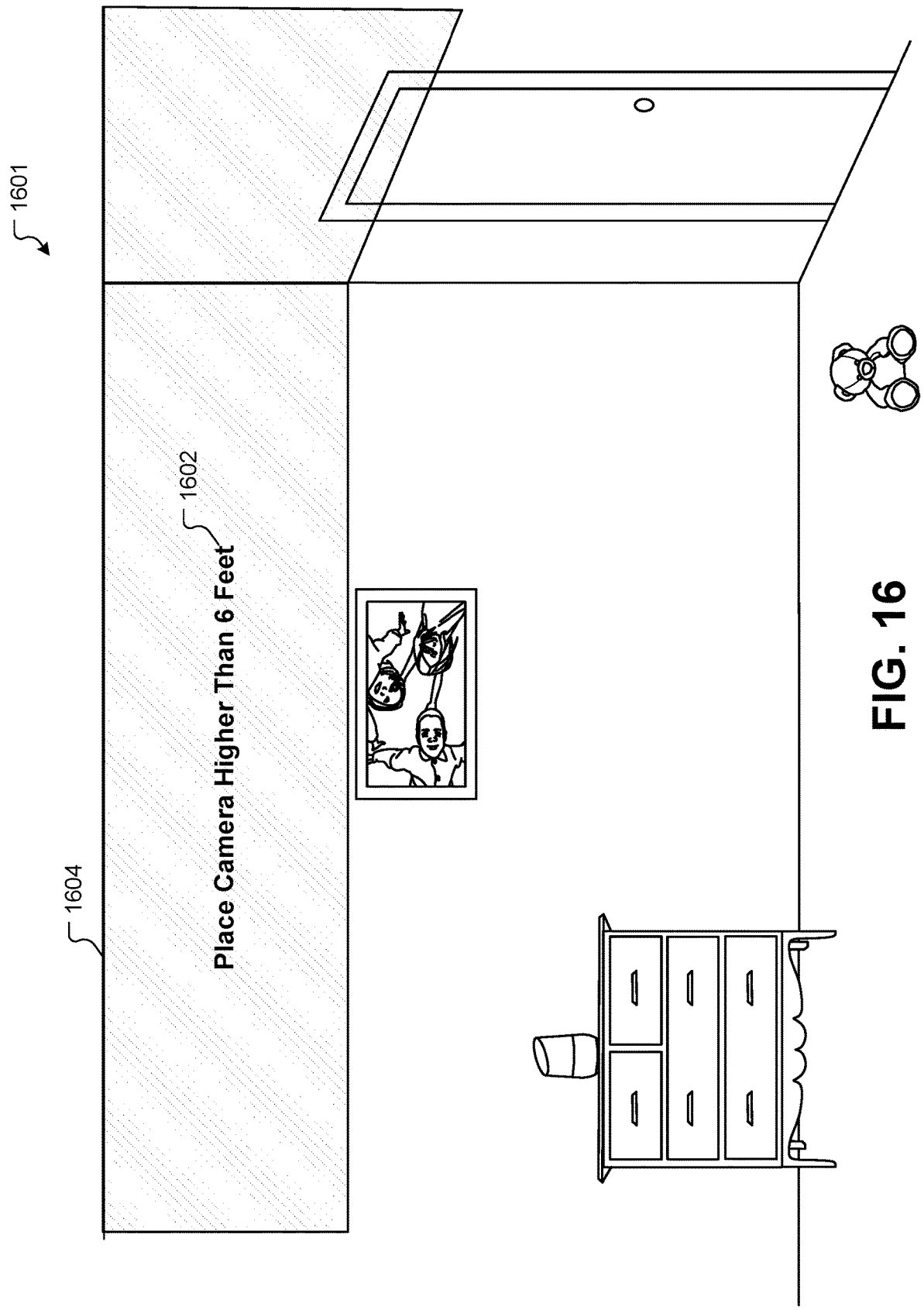
FIG. 16 illustrates a visualization of a smart-home environment with visualizations for installing a smart-home device, according to some embodiments.

FIG. 16 illustrates a visualization of a smart-home environment 1601 with visualizations for installing a smart-home device, according to some embodiments. In this example, the user may wish to place a camera for an infant monitoring system, a security system, and/or other smart-home system. As described in detail above, the visualization application on the mobile device can acquire and/or generate elements of a 3-D model of the smart-home environment 1601 by receiving user inputs, visually scanning the room, using IR scanning, receiving architectural designs, and/or any other method of modeling the smart-home environment 1601.

As part of the installation process, the user can provide an input to the visualization application indicating that they are placing a specific smart-home device, such as a camera. In some embodiments, the installation process may include an online registration process that registers the smart-home device with the device management server described above. The visualization application may be integrated with one or more other applications that monitor and/or control smart-home devices in the smart home environment 1601. For example, the application may include controls for adjusting the temperature of the thermostat, controlling a security system, monitoring hazard detectors, and/or receiving inputs and providing outputs to other smart-home devices. During the installation process, the visualization application can automatically launch or operate within the device management application in response to registering the camera or indicating that the camera is to be added to the local smart-home network. Alternatively or additionally, the user can launch the visualization application and specifically request a visualization for installation of a particular smart-home device.

The installation of the camera may include many different considerations regarding where it should be placed in the smart-home environment 1601. In this example, the visualization application will focus exclusively on a proper height at which the camera should be installed, although it will be understood that other installation considerations may also benefit from augmented reality visualizations and are contemplated within the scope of this disclosure. In the virtual 3-D scene of the smart-home environment 1601, the application can again add virtual objects to the virtual 3-D scene to aid in the visualization of the installation requirements. In this example, instead of placing a field of view object, the visualization application can insert rectangles, planes, and/or other surfaces along the walls/ceilings that indicate locations where the smart-home device can be safely installed. These surfaces can then be rendered and composited with the real-world view of the smart-home environment 1601 on the display of the mobile device. FIG. 16 illustrates what would be seen through the display of the mobile device with the rendered surfaces or objects displayed.

As was the case with the field of view objects, the installation surfaces may be rendered in different colors to indicate to the user the suitability of different locations for installation. In this example, the visualization can display areas 1604 that are rendered against the walls of the smart-home environment 1601. The areas 1604 can be rendered in a translucent color that indicates that placement of the camera in these areas 1604 would be suitable, such as a translucent green. This allows the user to see the wall behind the areas 1604 clearly. Some embodiments may also include text 1606 that is rendered and displayed relative to the areas 1604 and indicating additional installation instructions to the user. In the example of FIG. 16, the text 1602 indicates an installation guideline that the camera should be placed higher than 6 feet in the smart-home environment 1601. The visualization may also include other instructions that are rendered and overlaid on the image of the mobile device, such as registration instructions, initialization instructions, power-on instructions, safety warnings, user tips for operating the smart-home device, instructions for connecting to a wireless network, wiring instructions, and so forth.

Figure 17:
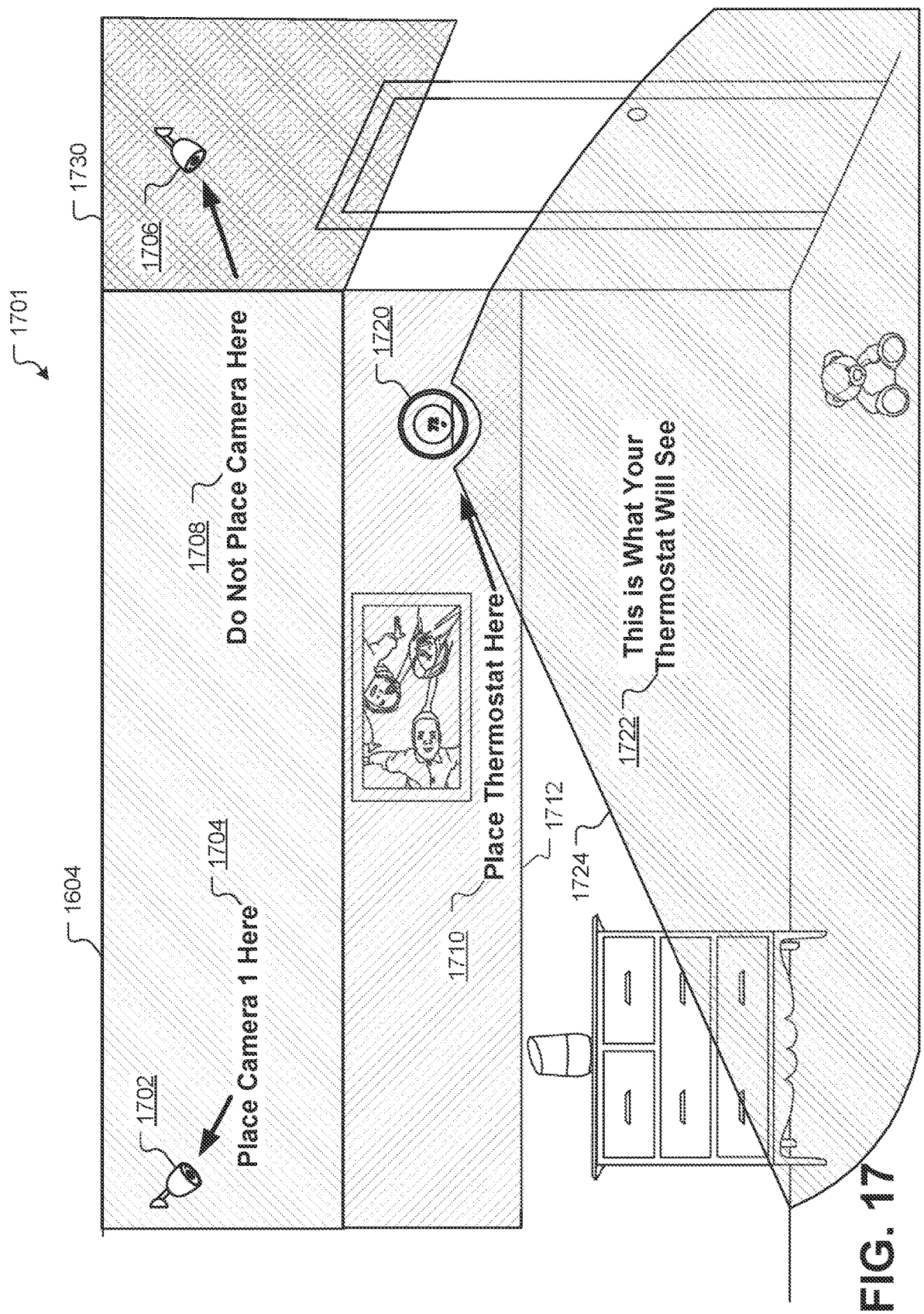
FIG. 17 illustrates augmented reality visualizations for installing multiple smart-home devices, according to some embodiments.

FIG. 17 illustrates augmented reality visualizations for installing multiple smart-home devices, according to some embodiments. When the user has multiple smart-home devices to install, the visualization application can display augmented reality visualizations for each of the smart-home devices simultaneously and/or individually. In this example, the user may be installing a camera and a thermostat in the same smart-home environment 1701. As described above, for each of these smart-home devices, the visualization application can display areas 1604, 1712 that indicate optimal placements of the smart-home devices. Area 1712 can indicate the optimal height for placing the thermostat, while area 1604 can indicate the optimal height for placing the camera. Each of these areas 1604, 1712 can be colored, shaded, etc., differently to differentiate them from each other.

In addition to displaying the areas 1604, 1712 for optimal placement, some embodiments may also display visualizations 1702, 1720 of the smart-home devices. For example, inside of area 1604, the visualization application can insert a visualization 1702 of the camera. This not only helps the user visually see where the camera should be installed, but also allows the user to visually assess how the smart-home environment 1701 will look with the camera in the recommended location. Some embodiments may allow the user to select (e.g., through a click or finger tap) the visualization 1702 of the camera and move the camera to a new location in the smart-home environment 1701. As described above, textual indications 1704 can also be rendered as part of the augmented reality visualization to provide installation instructions, warnings, placement recommendations, and other relevant information based on the context of the scenario, the smart-home environment 1701, and/or the particular smart-home device.

Some embodiments may also give visual warnings when the user moves the visualization 1702 outside of the recommended area 1604 for installation. For example, if the user drags the visualization 1702 outside of the recommended area 1604, a textual warning may appear in the visualization application. Alternatively or additionally, other indications may be displayed, such as changing the color or fill pattern of the area 1604 to red or causing the area 1604 to flash as a warning. Some embodiments may also display an area 1730 preemptively warning the user not to install the smart-home device in that area 1730. In this example, such an area 1730 may be above the door of the smart-home environment 1701. Placing the camera here may make it difficult to detect/identify a person entering through the door until the person was already in the smart-home environment 1701 and turned around to face the camera. The fill pattern, translucence, color, and/or other visual characteristics of the area 1730 can be set such that it visually indicates that the camera should not be placed in the area 1730. For example, area 1730 may be colored red, be more opaque than area 1604, have a cross-hatched fill pattern, flash or blink, and so forth. Some embodiments may also provide a visualization 1706 of the camera in the area 1730 illustrating where the camera should not be placed, as well as text 1708 that warns the user, provides an explanation as to why the camera should not be placed in the area 1730, and/or other information that will help the user understand why area 1730 is not recommended for installation.

Similarly, the visualization application can simultaneously display a visualization 1720 of the thermostat. Along with the visualization 1720 of the thermostat, the visualization application can also provide text 1710 that is rendered to indicate where the thermostat should be placed. Although not shown explicitly in FIG. 17 additional areas may be generated and rendered that indicate places where the thermostat should not be placed as described above.

It should be noted that neither the camera nor the thermostat need to actually be installed for the display shown in FIG. 17 to be generated by the visualization application. The visualizations 1702, 1720 of the smart home devices are only virtual and rendered from the 3-D virtual scene for display purposes. However, all of the field of view visualizations described elsewhere in this disclosure can also apply to the virtual smart-home devices that are displayed before actual installation. For example, the visualization application can generate a field of view 1724 for one of the motion detectors on the thermostat. This can allow the user to see the sensor coverage of the smart-home devices before they are installed. Textual indicators 1722 can be rendered and displayed that provide information regarding the coverage of the field of view of the sensors. Some embodiments may preliminarily detect that the field of view objects in the virtual 3-D scene do not overlap when multiple smart home devices are present. Textual warnings can be generated in this pre-installation scenario that indicate the lack of overlap to users or highlight areas of the smart-home environment 1701 that are not covered by smart-home devices in the simulation.

Figure 18B:
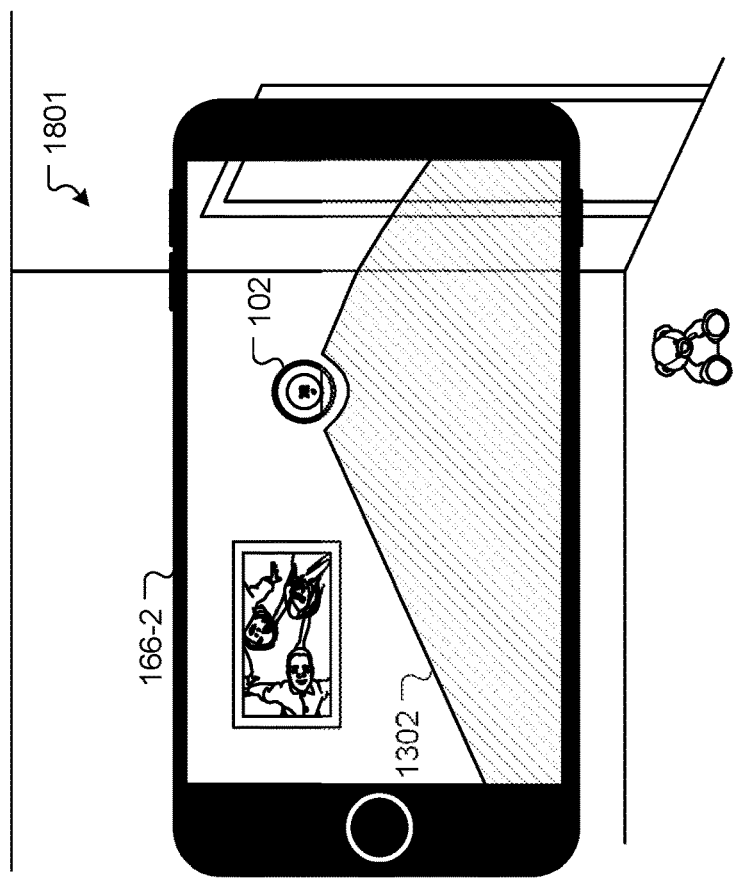
FIG. 18B illustrates a view of a proposed location for a smart-home device through the mobile device before installation, according to some embodiments.
Figure 18A:
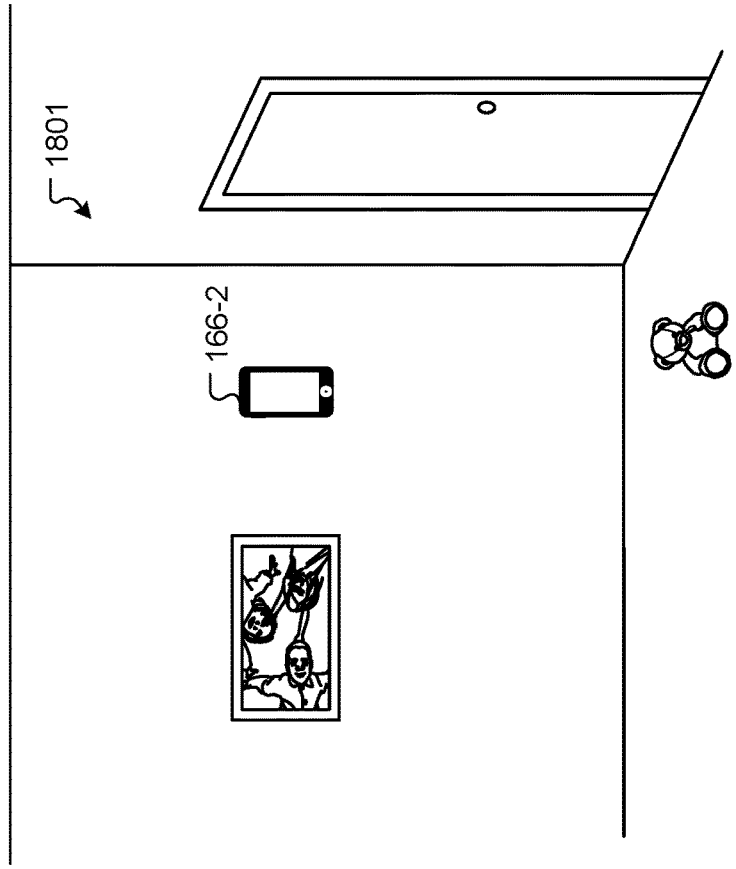
FIG. 18A illustrates a method for marking a potential location of the smart-home device before installation using the mobile device, according to some embodiments.

FIG. 18A illustrates a method for marking a potential location of the smart-home device before installation using the mobile device 166, according to some embodiments. As described above, some embodiments do not require any detailed architectural plans or other information regarding the smart-home environment 1801. Instead, these embodiments can rely on the relative location of the mobile device 166 and the location or proposed location of the smart-home device. This example illustrates one method of using the mobile device 166 to mark a location for the smart-home device even before it is installed.

In this example, the user can use their smart phone 166-2 to mark the location or proposed location of the smart-home device. For example, when installing the thermostat, the user can hold their smart phone 166-2 at the location on the wall illustrated in FIG. 18A. The user can then provide an input to the visualization application on the smart phone 166-2 (e.g., using a finger tap) to mark the location of the smart phone 166-2 in a virtual 3-D environment. At this point, the virtual 3-D environment need not include any information other than the location of the smart phone 166-2. This allows the user to simply hold their smart phone 166-2 in a proposed location for the thermostat without marking the wall, drilling any holes, or performing any other installation procedure.

After marking the location on the wall, the user can move the smart phone 166-2 away from the wall to a location where the marked point on the wall can be observed through the display/camera of the smart phone 166-2. The visualization application can track the relative motion of the smart phone 166—to as it moves away from the location that was marked on the wall. Using the internal compass, gyroscope, accelerometers, etc., of the smart phone 166-2, the visualization application can generate a location in the virtual 3-D environment for the virtual camera relative to the location in the virtual 3-D environment for the smart-home device that was previously marked. The visualization application can then insert a visualization 102 of, for example, a thermostat, and insert a field of view object that approximates the field of view of a motion sensor on the thermostat. The view of the virtual 3-D environment that includes the visualization 102 of the thermostat and the corresponding field of view object can be rendered from the point of view of the virtual camera corresponding to the location of the smart phone 166-2 in the smart-home environment 1801.

FIG. 18B illustrates a view of a proposed location for a smart-home device through the mobile device before installation, according to some embodiments. The 2-D image rendered from the virtual 3-D environment may include the visualization 102 of the thermostat and the field of view 1302 rendered from the field of view object. This allows the user to look "through" the display on their smart phone 166-2 to determine sensor coverage for the thermostat at the proposed location, to evaluate the look and feel of the thermostat at the proposed location in the room, and to assess any problems that may arise from installing the thermostat at the proposed location. It will be understood that any of the visualization techniques related to placement of the thermostat and/or the visualization of the field of view described in this disclosure may apply in the example of FIGS. 18A-18B. For example, the field of view 1302 may include visualization techniques that indicate the effectiveness of the field of view 1302 at various ranges, the overlap of the field of view 1302 with other fields of view, installation instructions or textual warnings rendered and displayed on the smart phone 166-2, proposed, recommended, and/or discouraged placement locations, and so forth. Also, the specific example of the thermostat and the smart phone 166-2 is merely provided by way of example and not meant to be limiting. Other embodiments may use any smart-home device as well as any computing device suitable to perform the operations described above.

Figure 19A:
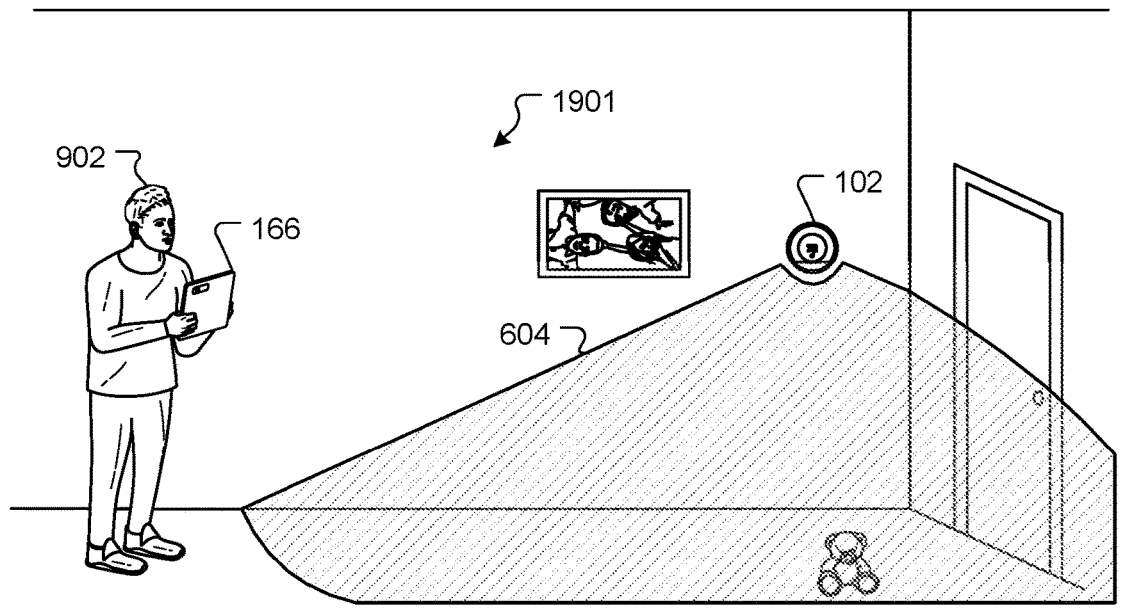
FIG. 19A illustrates an augmented reality visualization to test fields of view, according to some embodiments.

FIG. 19A illustrates an augmented reality visualization to test fields of view, according to some embodiments. At times, it may be useful for a user to determine whether the field of view of a sensor will adequately detect the movement/presence of a human within the field of view. For example, a user may wish to walk through a potential or actual field of view for a motion detector sensor to see if common traffic through an area will intersect with the field of view volume. This test ability can apply both to a thermostat 102 that is actually installed in a smart-home environment 1901, as well as to potential locations in the smart-home environment 1901 prior to actual installation using the embodiments described above in FIGS. 18A-18B.

In FIG. 19A, a thermostat 102 has been installed in the smart-home environment 1901. The user 902 can visualize the fields of view 604 through their mobile device 166 using the methods described above. The field of view 604 illustrated in FIG. 19A would only be visible through the mobile device 166, but is shown in FIG. 19A in order to illustrate what would be seen by the user 902 through the mobile device 166. Before the user 902 intersects with the field of view 604, the field of view 604 can have a first set of visual characteristics, such as a first color, a first translucence, a first fill pattern, a first intensity, and so forth.

Figure 19B:
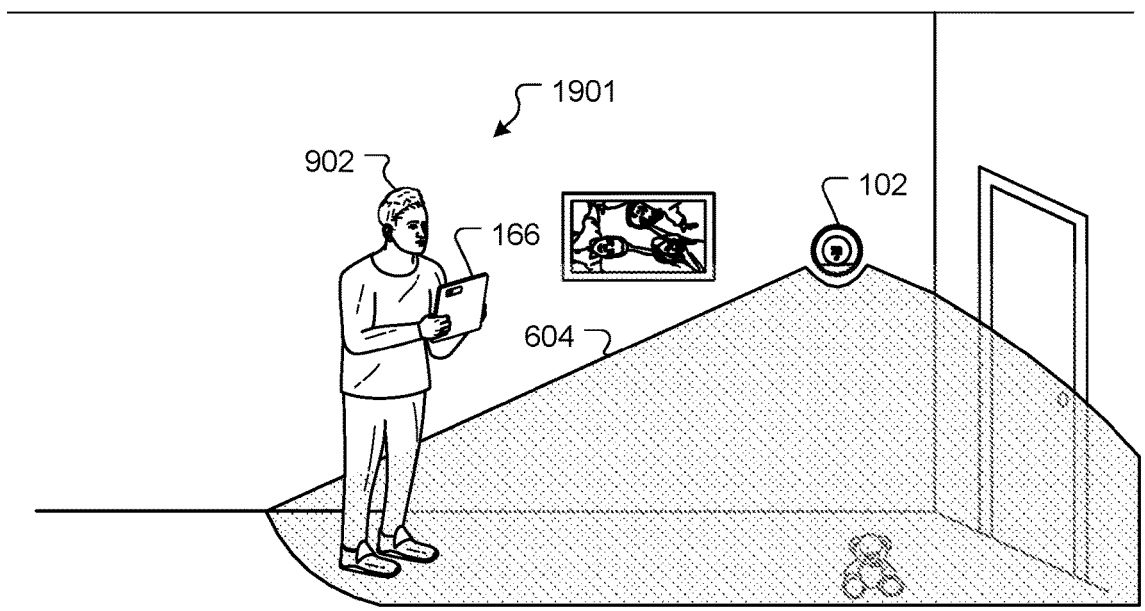
FIG. 19B illustrates how the field of view can change as it detects the user, according to some embodiments.

FIG. 19B illustrates how the field of view 604 can change as it detects the user 902, according to some embodiments. As the user 902 walks forward into the field of view 604, the mobile device 166 can track the relative motion of the user 902 as they move forward. This can advance the position of the virtual camera in the corresponding virtual 3-D scene into the field of view 604. When the visualization application approximates that an intersection between the human user and the field of view 604 occurs, the visualization application can change the physical characteristics and/or provide other indications that the smart-home device, e.g. the thermostat 102, would effectively detect the user 902. For example, the field of view 604 can be displayed with a second set of visual characteristics, such as a second color, a second translucence, a second fill pattern, a second intensity, and so forth, to distinguish it from the first set of visual characteristics described above in relation to FIG. 19A. Additionally or alternatively, the visualization application can provide other indicators, such as an audible alarm or beep or textual indicators (e.g., "Detected!"). The visualization application can also cause the mobile device 166 to vibrate or buzz. These indication methods can be useful for allowing the user 902 to walk through the smart-home environment 1901 and know when they would be detected by the smart-home device(s) in the smart home environment 1901 without constantly looking at or "through" their mobile device 166.

Some embodiments may generate an approximated human frame in the virtual 3-D scene that moves behind the virtual camera. This can be useful for detecting situations where the position of the mobile device 166 might not intersect with the field of view 604 while the frame of a human user 902 would intersect. For example, the motion detector configured to detect approach to the thermostat 102 in FIG. 19B may be oriented downward to detect the approaching lower torso of the human user. This may cause the user's feet to intersect with the field of view 604 long before the mobile device 166 would intersect with the field of view 604. However, by generating a human frame in the virtual 3-D scene behind the virtual camera (which corresponds to the location of the mobile device 166 in the smart-home environment 1901), the visualization application can detect an intersection between the volume of the human frame and the volume of the field of view object corresponding to the thermostat. When this intersection occurs, the visual characteristics of the field of view 604 in the rendered image can change as described above to indicate that smart-home device would detect the user.

Some embodiments may use a simpler process that estimates the intersection of the user 1902 based on the location of the mobile device 166. For example, instead of generating a human frame in the virtual 3-D scene, some embodiments may instead determine when a volumetric extension of the mobile device 166 in the vertical direction would intersect with the field of view object. When the mobile device 166 moves above or below any portion of the field of view object, the visualization application could change the visible characteristics of the rendered field of view object to indicate that the user would be detected by the smart-home device. This volumetric extension in the vertical direction is useful for sensors that are oriented up or down relative to a user. This volumetric extension may also extend in a horizontal direction for sensors that are oriented to the left or right of the user. Other embodiments may generate a volumetric extension of the mobile device 166 in the virtual 3-D scene in a direction configured to intersect with a sensor field of view orientation.

In addition to installing a smart-home device in a location in a smart-home environment such that a field of view is unimpeded, other considerations may also affect the placement of smart home devices during installation. The visualization application described herein can also display visualizations and/or warnings that help the user avoid installing smart-home devices in locations that may not be optimal. This may include visualizations of heat sources or other potential sources of sensor interference, as well as internal visualizations of the wall surrounding the proposed installation location.

Figure 20:
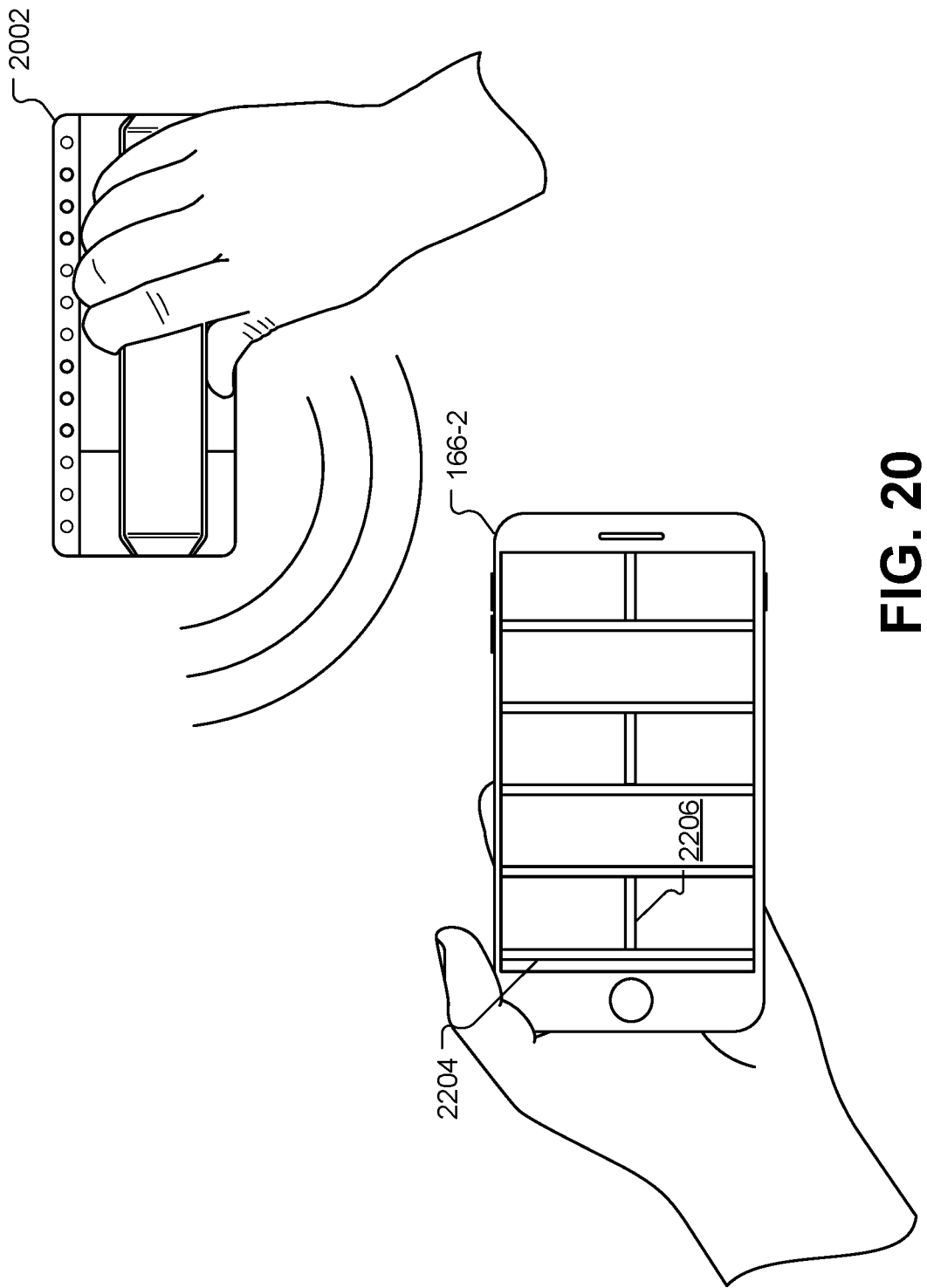
FIG. 20 illustrates an example of how internal wall information can be received by the mobile device, according to some embodiments.

FIG. 20 illustrates an example of how internal wall information can be received by the mobile device, according to some embodiments. These embodiments pair a mobile device 166 with a scanning device 2002. The scanning device 2002 may also be referred to as a "smart stud finder." The scanning device 2002 may use different electronic methods to sense studs and other solid objects within a wall. For example, some embodiments may detect changes in capacitance in a sensor to detect a solid object. The scanning device 2002 may include a plate that will detect changes in a dielectric constant that occur when the scanning device 2002 is moved over a stud or other obstruction. Some embodiments of the scanning device 2002 may include small radar or microwave systems that emit electromagnetic radiation with reflections detected by a sensor in the scanning device 2002.

A user may utilize information ascertained by the scanning device 2002 in conjunction with the mobile device 166 to generate an internal view of a wall to aid in the installation of a smart-home device. For example, the user can place the scanning device 2002 on one side of a wall, activate the scanning device 2002, and slowly move the scanning device 2002 across the wall. When the scanning device 2002 is activated, internal accelerometers, gyroscopes, compasses, etc., in the scanning device 2002 can record the relative motion of the scanning device 2002 from the starting location. As the scanning device 2002 is moved across the wall, this motion can be divided into a number of time intervals or buckets. Each time interval can store a relative location of the scanning device 2002 along with a status of the scanning device that indicates whether or not the scanning device 2002 is detecting a stud or internal obstruction in the wall. This stream of data comprising locations/motion, timing, and/or internal wall status can be transmitted to the mobile device 166.

After receiving the stream of data from the scanning device 2002, a mobile device 166, such as a smart phone 166-2, can generate objects in the virtual 3-D scene that correspond to wall studs, pipes, or other obstructions that may be common inside of a wall. Because the mobile device 166 can detect its own location and the relative location of the scanning device 2002, the visualization application operating on the mobile device 166 can generate 3-D stud objects, pipes, ventilation ducts, and/or other 3-D models of objects within the wall. In some embodiments, the stream of data transmitted from the scanning device 2002 can be used to determine widths of objects in the wall. These widths can be compared to known widths of studs (e.g., 1.5 in), pipes (e.g., 3 in), ventilation ducts (e.g., 12 in), etc., to identify objects in the wall by virtue of their sensed dimensions. Corresponding models of studs, pipes, ducts, etc., can then be inserted into the virtual 3-D scene from a library of such objects.

Some embodiments can generate approximate visualizations of the internal contents of the wall without using the scanning device 2002. For example, common stud spacing can be used to estimate stud placement. Studs that are placed 16 inches apart on center can be automatically generated running from one side of the wall to the other. Some embodiments may allow user inputs that provide the mobile device 166 with a first stud location and/or stud spacing dimensions. This allows a user to use a traditional stud finder to find the location of studs in the wall, then enter this information into the visualization application. The visualization application can then generate a visualization based on three-dimensional stud objects that are added to the virtual 3-D scene and rendered for view on the mobile device 166. In some embodiments, architectural plans can be loaded into the visualization application. These architectural plans may include locations for studs, pipes, ventilation ducts, electrical wiring, sewer vents, and other internal wall items.

An example of the visualization application is illustrated on the smart phone 166-2 in FIG. 20. In this example, a plurality of studs 2204 have been rendered and displayed at the measured locations in the wall. This can help users avoid stud locations (or hit stud locations) when installing a smart-home device. For example, this can help the user determine not they need to use drywall anchors or wood screws during installation process. Some embodiments may also automatically generate additional framing elements that can be assumed to be installed in many walls, such as saddle studs, cripple studs, top plates, bottom plates, and so forth. In cases where these additional framing elements are not explicitly sensed by the scanning device 2002 or otherwise provided to the visualization application, the visualization application can estimate where these additional framing elements would be located based on standard measurements, building codes, and/or other known default locations. The visualization application can then automatically insert these elements into the virtual 3-D scene and render them as part of the visualization. The example of FIG. 20 illustrates horizontal blocking studs 2206 that have been automatically added to the visualization at a standard height. Adding these additional elements may be an option in the visualization application that can be turned on/off or adjusted by the user.

Figure 21:
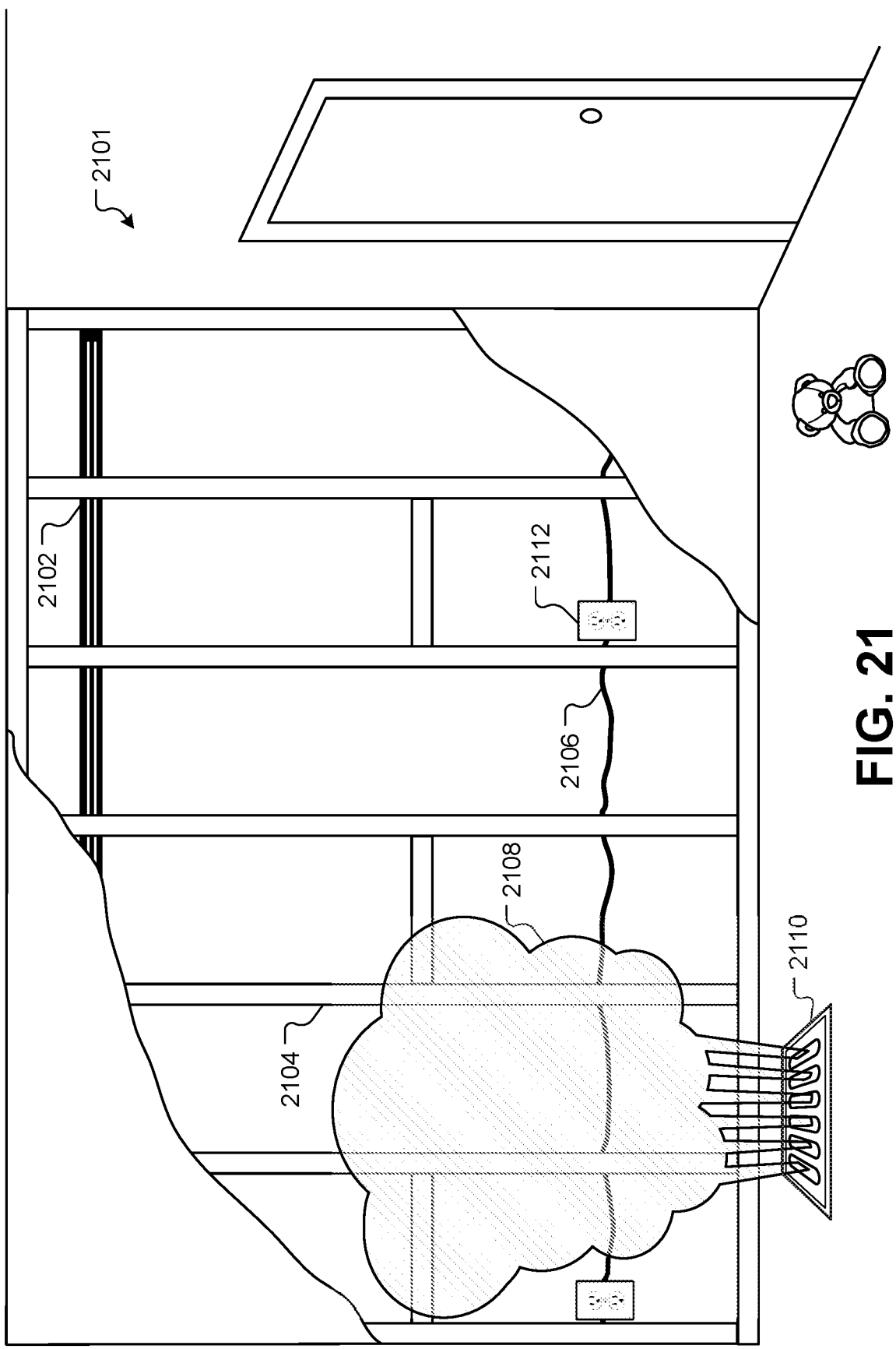
FIG. 21 illustrates additional environmental elements that may be estimated, modeled, and/or visualized during an installation process by the visualization application, according to some embodiments.

FIG. 21 illustrates additional environmental elements that may be estimated, modeled, and/or visualized during an installation process by the visualization application, according to some embodiments. The view depicted in FIG. 21 may be considered a view through a mobile device. As described above, objects inside the wall, such as building studs 2104 can be detected using a scanning device, provided by user input, estimated using common measurements, received through digital architecture plans, and so forth. As the user looks through the mobile device, a visualization of the objects inside the wall can be rendered and displayed as a composited overlay image on the camera image captured by the mobile device.

In some embodiments, the visualization application can also visually detect additional objects in the captured image that are known to affect the operation of smart-home devices and/or the sensors thereon. For example, the visualization application may detect the presence of an HVAC vent 2110 that delivers hot/cold air to a smart-home environment 2101. This can be accomplished by comparing the captured image of the HVAC vent 2110 with known images of HVAC vents using computer vision and matching algorithms. Alternatively or additionally, the user can select a portion of the image displayed on the mobile device and designate the selected object as an HVAC vent 2110. For example, the user can tap or click on the image of the HVAC vent 2110 that is displayed on the screen of the mobile device, and the visualization application can thereafter generate visualizations related to the selected object.

After identifying the HVAC vent 2110 using one of the methods described above, the visualization application can generate an effect object in the virtual 3-D scene related to the HVAC vent 2110. For example, the visualization application can generate a plume of gas representing hot air as it rises out of the HVAC vent 2110. Alternatively, the visualization application can generate a plume of gas representing cold air as it is forced out of the HVAC vent 2110 and moves along the floor. This effect object can be generated using known techniques for generating mist, fog, or other turbulent air simulations in computer animation. The effect object can then be rendered to generate a 2-D image overlay of the hot air plume 2108 that can be displayed near the HVAC vent 2110 as illustrated in FIG. 21.

The HVAC vent 2110 is used merely as an example and not meant to be limiting. The same techniques described above can be used to recognize other objects in an image and generate corresponding effect objects in the virtual 3-D scene. In some embodiments, a window can be recognized through computer vision algorithms or by user selection, and an effect object can be generated that models the sunlight that may enter the room through the window. Using the compass and GPS receiver on the mobile device, the visualization application can estimate a position and/or orientation of the window and correctly model the direction and intensity of sunlight rays that would enter through the window. The visualization application can also generate an animation of how the sunlight rays will move throughout the day and at different times of year. This can provide a complete picture for the user of how incident sunlight may possibly affect any smart-home device that may be affected by sunlight, such as the thermostat.

Some embodiments may also visually recognize or receive indications of other objects in the smart-home environment 2101 and generate additional objects based on that identification. For example, the visualization application can visually recognize or receive a selection of one or more electrical outlets 2112. Based on the location of the electrical outlets 2112, the visualization application can generate 3-D objects representing electrical wiring inside the wall traveling between the electrical outlets 2112. These 3-D objects can be rendered and displayed as electrical wires 2106 inside the wall on the display of the mobile device. The same principle may also apply to the light switches, dimmer switches, phone jacks, coaxial cable jacks, ethernet cable jacks, and/or any other outlet that would indicate wiring within the wall. This visualization can help users ensure that they do not accidentally drill into the electrical wires 2106 and/or otherwise interfere with an existing electrical system. Additionally, the same principle may apply to other elements that can be visually recognized in the image of the smart-home environment 2101. For example, by visually recognizing and/or receiving a selection of a sink, the visualization application can generate water pipes and/or sewage pipes in the wall based on the location of the sink. By visually recognizing and/or receiving a selection of a fireplace, the visualization application can generate a fireplace flue extending upwards in the wall based on location of the fireplace.

Some embodiments may use a mobile device that is equipped with a thermal imager and/or thermal camera. These embodiments can detect thermal signatures and thermal radiation in the smart-home environment 2101 and generate objects based on those thermal images. For example, a hot-water pipe 2102 may travel inside the wall. Although this would be invisible to the naked eye, and possibly missed using a scanning device based on its height above the user, the thermal radiation from the pipe 2102 may generally radiate through the wall enough that it would be received by the thermal camera on the mobile device 166. The visualization application can recognize the shape and position of the thermal signature as a hot-water pipe 2102 and generate a 3-D object representing the pipe 2102 in the virtual 3-D scene to be rendered and displayed on the mobile device. Alternatively or additionally, when a thermal signature does not match a known thermal signature from a library of heat sources, the visualization application can instead generate a 3-D object based on the shape of the thermal signature itself. This can be displayed on the mobile device as an unknown heat source in the wall.

Figure 22A:
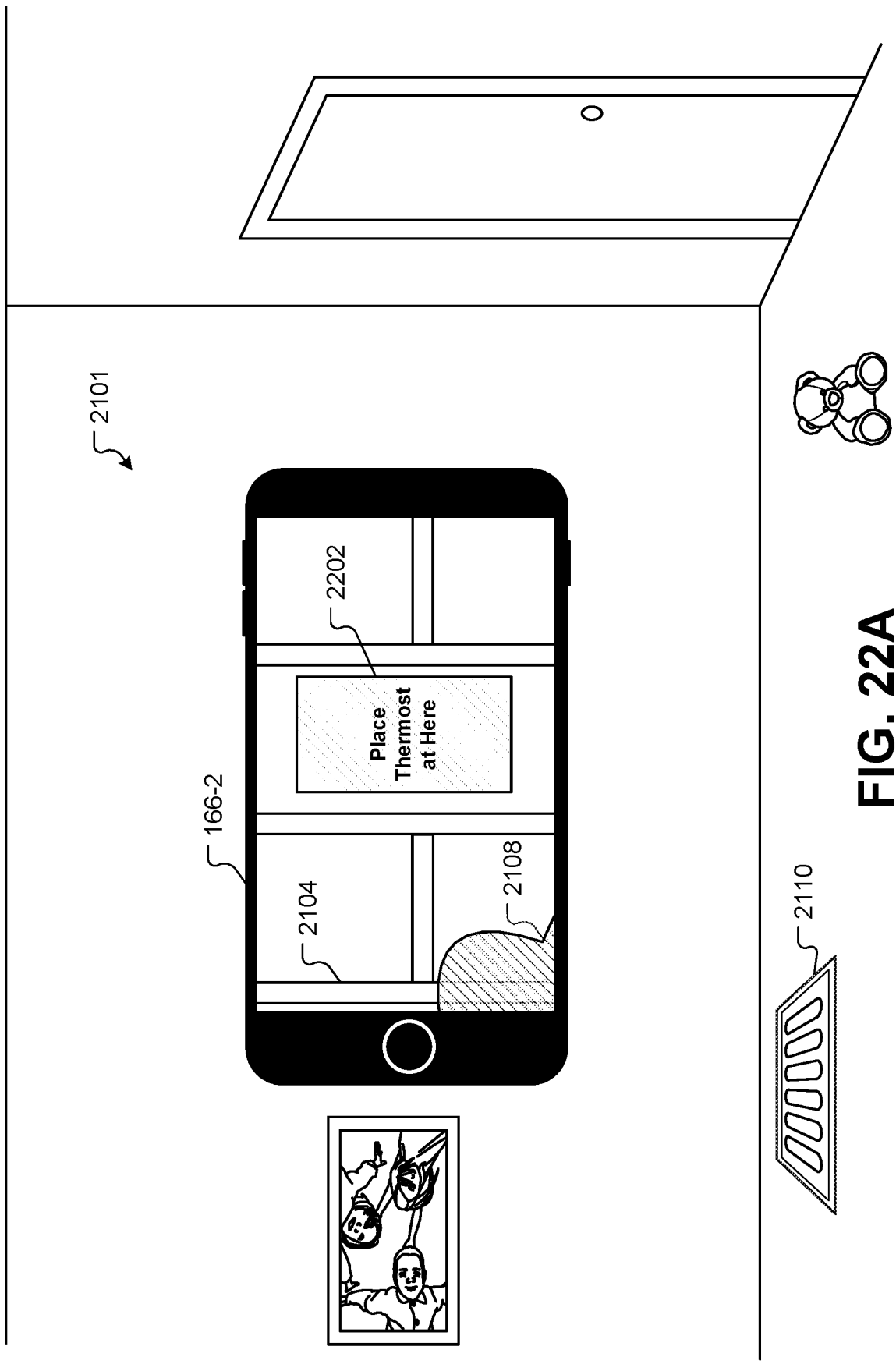
FIG. 22A illustrates a view through a smart phone of installation location that includes non-visible sources of interference, according to some embodiments.

FIG. 22A illustrates a view through a smart phone 166-2 of installation location that includes non-visible sources of interference, according to some embodiments. In this example, the portion of the hot air plume 2108 from the HVAC vent 2110 that is visible through the smart phone 166-2 is visible on the display. Additionally, the wall studs 2104 are also visible as rendered images on the display of the smart phone 166-2. In some embodiments, the visualization application may also locate gaps between objects (e.g., studs 2104) that are a threshold distance away from any interference source (e.g., the hot air plume 2108) and recommend such locations to the user. In this example, the visualization application has identified a space between wall studs 2104 that is a sufficient distance away from the hot air plume 2108 where a thermostat to be installed. Consequently, the visualization application can render an area 2202 for display on the smart phone 166-2 indicating an acceptable area for thermostat placement. Some embodiments may also generate text describing how/where the thermostat should be placed. This visualization may be generated in conjunction with visualizations described above, such as those recommending camera placement above a certain height, those recommending thermostat placement between certain heights, those recommending security sensor placement near a door, and so forth. Those installation constraints can be combined with the constraints identified in the wall/environment in FIG. 22A to identify and generate a visualization of the area 2202 for installation.

This feature allows the user to provide input(s) to the visualization application indicating that they intend to install a thermostat. The user can then look through the smart phone 166-2 at the wall, and the visualization application can analyze the visible objects and/or generate the internal wall objects that are within view. The visualization application can then analyze the area and identify suitable locations based on distances from interference sources and the location of solid objects with the wall. Thus, the user can simply look through their smart phone 166-2 and immediately see the optimal location for installation of their smart-home device.

Once an installation location has been identified by the visualization application, the visualization application can then provide additional information on how to install the smart-home device. For example, many smart-home devices may include a multi-step installation procedure that includes mounting the smart-home device to a location on the wall/ceiling of the smart-home environment, connecting the smart-home device to existing wiring and/or electrical systems, turning on the smart-home device and setting up the software, connecting the smart-home device to a wireless network, and/or approving the smart-home device for normal operation in the smart-home environment. Instructions for these installation and use steps are typically provided in printed media with the smart-home device when it is purchased. The embodiments described herein use the visualization application and augmented reality visualizations to provide additional installation and setup instructions that can optionally be coupled with real-time customer support.

Figure 22B:
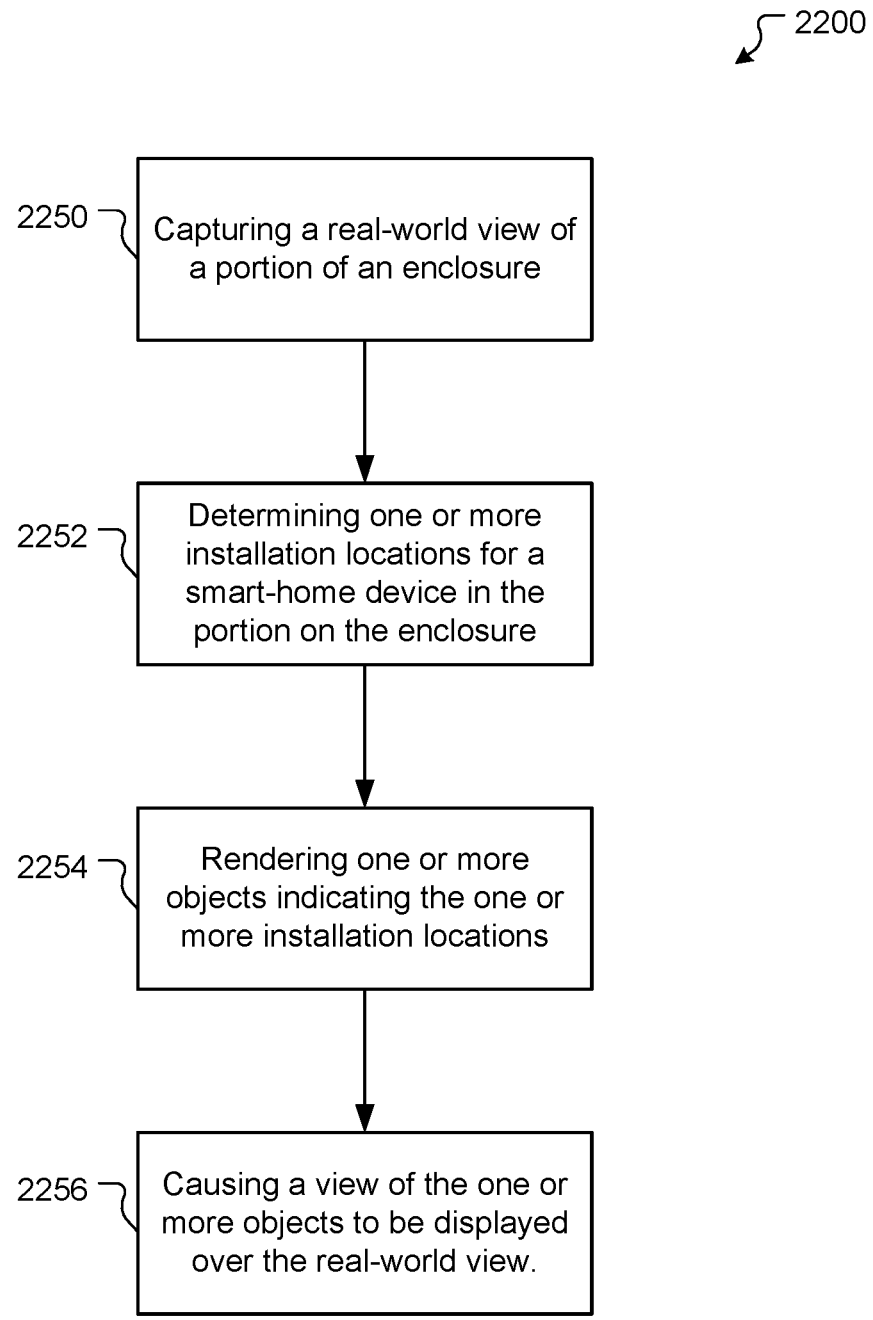
FIG. 22B illustrates a flowchart of a method for installing a smart-home device, according to some embodiments.

FIG. 22B illustrates a flowchart of a method for installing a smart-home device, according to some embodiments. The method may include capturing a real-world view of a portion of an enclosure (2250). The real-world view may be captured by a camera on a mobile device. The portion of the enclosure may be a room or other subdivision of any of the enclosure types listed herein.

The method may further include determining one or more installation locations for the smart-home device in the portion of the enclosure (2252). Installation location may be determined based on a device type for the smart-home device. For example, a camera device may best be installed more than 6 feet above the ground. A motion sensor device may best be installed in a corner. A thermostat may best be installed approximately 5 feet above the ground. As described herein, the location may also be determined to avoid objects or environments that may interfere with the operation and/or installation of the smart-home device.

The method may additionally include rendering one or more objects indicating the one or more installation locations (2254). The one or more objects may include wireframes, panels, solid objects, 2-D objects, text descriptions, and/or any other virtual object that may be rendered to indicate a location for installation. For example, some buttons may overlay a panel with a translucent color on a portion of a wall where the smart-home device should be installed. Some embodiments may include text indicating where installation should or should not occur. Somebody may include text or other indications that show hazards that may interfere with the operation and/or installation of the smart-home device. Some embodiments may include arrows or other instructional objects that illustrate to the user where installation should take place. Somebody is may also display field of view of objects at certain locations to help users understand how such placement will affect the operation of the smart-home device.

The method may further include causing a view of the one or more objects to be displayed over the real-world view (2256). As described above, the rendered objects may be composited on a real-time view of the real-world view captured by the camera of the mobile device. The composited image may be displayed as a real-time video on the screen of the mobile device.

Figure 23:
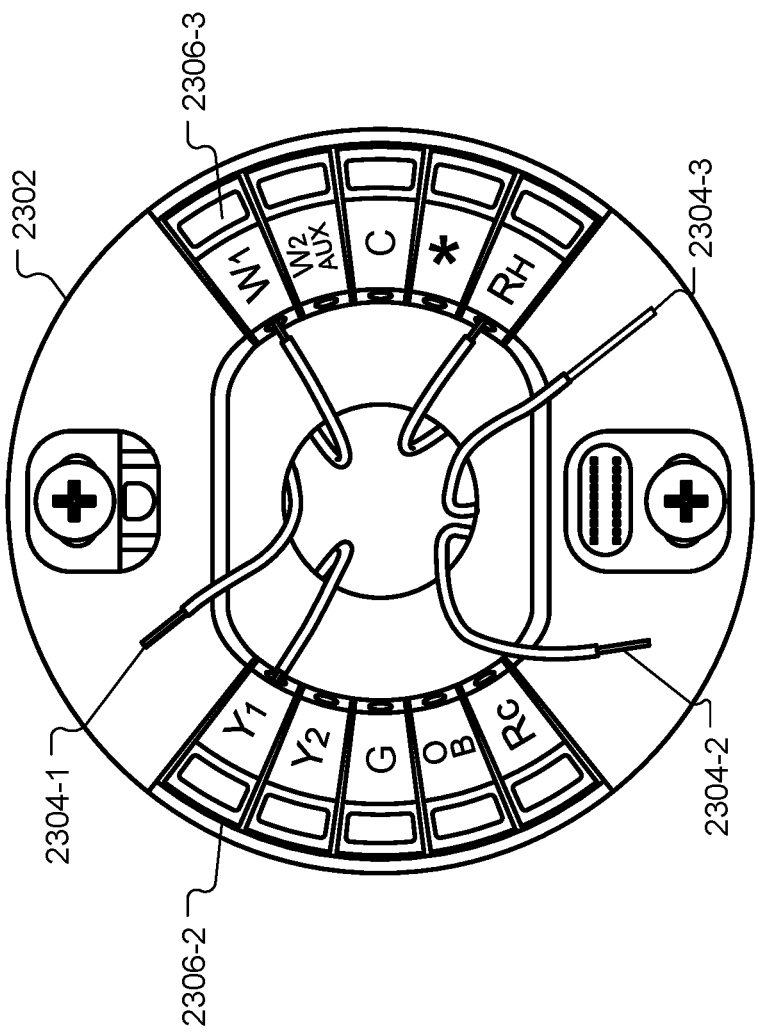
FIG. 23 illustrates a back plate for a thermostat during an installation procedure, according to some embodiments.

FIG. 23 illustrates a back plate 2302 for a thermostat during an installation procedure, according to some embodiments. Some embodiments of the thermostat may include a back plate 2302 and a head unit (not shown). During installation, the back plate can be separated from the head unit and mounted to the wall using, for example, a pair of screws and an internal bubble level. The existing HVAC wiring can be fed through a hole in the center of the back plate 2302, and the individual wires can be individually inserted in the wiring receptacles surrounding the hole, each of which has a push tab that allows the wire to be inserted into the corresponding port. This example of the thermostat back plate 2302 is just one example of how a smart-home device can be installed. For the sake of brevity, diagrams of every existing smart-home device are not provided in this disclosure, but it will be clear to one having skill in the art in light of this disclosure that these same principles described below can be applied to any smart-home device, not just the thermostat.

After the wires are fed through the center hole in the back plate 2302, the user then may need to identify wires by virtue of the color of their exterior insulation to determine into which port on the back plate 2302 they should be inserted. This is normally a process that can be fraught with user error. For example, users may have a hard time recognizing the correct color of the wires, particularly for colorblind individuals and/or wiring that is relatively old. The insulation on the wires also may need to be trimmed to a proper length. Insulation that is trimmed too short may prevent the wire from properly inserting into the wiring receptacle, while insulation is trimmed too long may lead to inadvertent short-circuits as exposed wiring makes contact with other wires. In some cases, the condition of the exposed wiring may have deteriorated or be bent in such a way that it cannot be properly inserted into a wire receptacle. These and other problems can be solved by the visualization application providing an augmented reality view of the installation process.

In the example of FIG. 23, some wires have already been inserted into wiring receptacles 2306-2 and 2306-3. However, wires 2304-1, 2304-2, and 2304-3 are still exposed and not properly connected. The visualization application can identify incorrect wiring scenarios, check the quality of wires before they are inserted in wiring receptacles, aid the user and making correct placements, and/or provide other guidance to ensure that the installation process is done correctly and can be accomplished by virtually any user.

Figure 24:
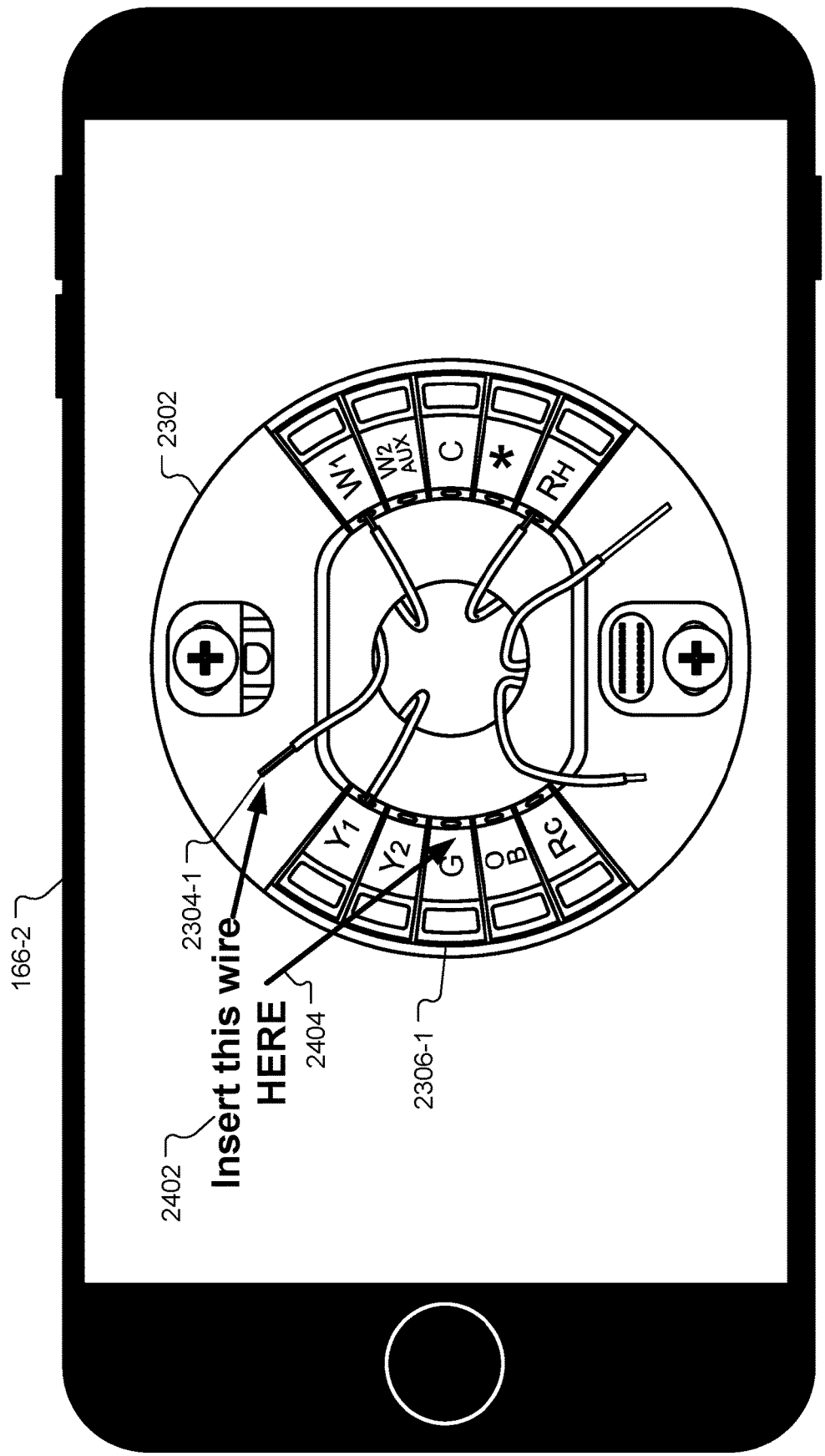
FIG. 24 illustrates a view of the smart-home device during installation through a smart phone, according to some embodiments.

FIG. 24 illustrates a view of the smart-home device during installation through a smart phone 166-2, according to some embodiments. As described above, viewing the smart-home device "through" the display of the smart phone 166-2 may include capturing an image of the smart-home device using the camera of the smart phone 166-2 adding visual elements to the image, and displaying the captured image with the additional visual elements on the display of the smart phone 166-2. Again, any mobile device with a display screen may be used, and the smart phone 166-2 is merely provided as one particular example.

To generate additional visual elements, some embodiments may use the virtual 3-D scene described above. Specifically, these embodiments may include a 3-D model of the smart-home device and may generate text objects, arrow objects, virtual wiring diagrams, virtual wires and/or receptacles, and so forth, that are either identified in the captured image or added to the captured image to aid in the installation process. These 3-D models can then be rendered and displayed in real time on the screen of the mobile device show the user how to proceed.

In some embodiments, the use of a virtual 3-D scene that is rendered in real-time may not be entirely necessary. For example, some embodiments may use two-dimensional image processing techniques to identify physical elements of the installation process from the captured images. For example, computer vision algorithms can be used to identify the wire 2304-1 as such in the captured image. Any text 2402, arrows, and/or other instructional elements that are added to the displayed image can be added as a two-dimensional overlay on the image. This may be accomplished without requiring the use of any virtual 3-D models that are rendered in real-time. The choice of whether to use 2-D or 3-D images can be based on the complexity of the installation situation and the nature of the smart-home device. For example, for the thermostat back plate 2302 that can be analyzed from a frontal view using 2-D visualization and image processing techniques, the virtual 3-D scene need not be used as an option. In contrast, for a complex installation of, for example, a control device for a security system, it may be beneficial to provide a 3-D user experience in augmented reality using the techniques described in detail above.

In FIG. 24, the user may view the thermostat back plate 2302 through the screen of the smart phone 166-2. As illustrated, the user has already attached the back plate 2302 to the wall using the depicted screws, and the existing wiring has been fed through the center hole and is ready for installation in the wiring receptacles of the back plate 2302. As the image captured by the camera of the smart phone 166-2 is analyzed by vision algorithms, each of the wires can be identified both by their shape and their color in the image. For example, wire 2304-1 can be identified by virtue of its shape as a wire (long, continuous, with an exposed end and colored external insulation, etc.) and its function as a ground wire can be determined based on the color of the insulation. Similarly, wiring receptacle 2306-1 can be identified by its shape, position on the backplate 2302, and/or the lettering on the receptacle 2306-1 indicating that it is the wiring receptacle that should receive the ground wire 2304-1. Wiring receptacles can be identified by comparing their shape and lettering to a library of known wiring receptacle models or visual signatures that can be stored and for each particular thermostat or other smart-home device.

Once the wire 2304-1 and the wiring receptacle 2306-1 have been identified, the visualization application can also determine that the wire 2304-1 is not installed in the wiring receptacle 2306-1. This can be accomplished by visually detecting the exposed copper end of the wire 2304-1 and determining that it is a sufficient distance away from the port of the wiring receptacle 2306-1. Once this determination is made, the visualization application can generate wiring instructions that are overlaid on the captured image and displayed on the display of the smart phone 166-2. For example, some embodiments may generate text 2402 that instructs the user to insert the wire 2304-1 into the wiring receptacle 2306-1. Arrows 2404 and/or other visual indicators can be used to identify the wire 2304-1 and wiring receptacle 2306-1 for the user.

Some embodiments may dynamically change the display as the user begins to insert the wire 2304-1 into the receptacle 2306-1. For example, as the wire 2304-1 moves towards the receptacle 2306-1, the arrows 2404 can change their position so that they continuously point at the wire 2304-1 and the receptacle 2306-1 respectively. This provides an animation that assures the user that they are correctly installing the wire as the installation takes place. In some embodiments, the visualization application can provide an animation that shows the user how to insert the wire 2304-1 into the receptacle 2306-1 before this is actually performed by the user. For example, a three-dimensional wire can be rendered and/or a two-dimensional view of the wire 2304-1 can be generated that is moved from its current location to the port of the wiring receptacle 2306-1. This provides a visualization for the user to perform the installation of the wire 2304-1 as a guide before they physically carry out the process. Some embodiments may also provide additional indicators, such as audible instructions that are played from the speaker of the smart-home device providing a voice instruction for the installation process. For example, an audible voice may be played asking the user to "install the black wire into the G port." These audible instructions can be stored in a library that is specific to the smart-home device or generally applicable to a common installation step for multiple smart-home devices. Playing these audible instructions can be triggered by the visual detection of the un-inserted wire scenario depicted in FIG. 24.

In the embodiments described thus far, the identification of the wire 2304-1 and the wiring receptacle 2306-1 and the generation of the text 2402 and/or the visual indicators 2404 have been automatically performed and generated by the visualization application itself. However, some embodiments may use the visualization application to link to a live customer service representative through the device management server described above. For example, as the image of the smart-home device is captured during installation, it can be transmitted to a located remotely second computing device. This second computing device can be operated by an installation professional, by a technical assistant, or by another regular user. For example, one user can perform the physical installation, while another user views the installation from a remote location (e.g., in a separate room, in a separate building, in a separate state, etc.) and provides guidance and/or assistance. Thus, the visualization application can provide a real-time link to live help during the installation process.

In the example of FIG. 24, it may be assumed that a first user is holding the smart phone 166-2 and a second user is viewing the image captured by the smart phone 166-2 remotely on a second computing device. As the second user views the image, they can visually identify the wire 2304-1 and/or the receptacle 2306-1 and provide live, verbal instructions to the user that can be captured by a microphone on the second computing device and transmitted to the smart phone 166-2. The smart phone can then broadcast the verbal instructions provided by the second user on the speaker of the smart phone 166-2 at the installation location.

In some embodiments, the second computing device may allow the second user to add graphical elements to the image displayed on the smart phone 166-2. For example, the second computing device may include controls and/or toolbars that allow the second user to add text and arrows, visually circle or highlight areas displayed on the screen, add models or pictures of wires being correctly installed, add other images of models of physical elements in the installation process, and/or the like. For example, the second user may type the text 2402 displayed on the smart phone 166-2 and draw the arrows 2404 showing the user how to insert the wire 2304-1 into the receptacle 2306-1. This can be accompanied by a live verbal/video connection such that the second user can guide the first user through the installation process.

These embodiments allow for a live customer service scenario that can be realized through the augmented reality display of the visualization application to guide users through what may otherwise be a very complicated and error-prone installation process. Additionally, the visualization application can couple live interactions with another user together with real-time augmented reality displays for other situations besides the installation process. For example, the same techniques described above can be used to troubleshoot device operation after the smart-home device has been installed. The user can view the smart home device through their mobile device and receive real-time visual and/or audio instructions and feedback as they troubleshoot the operation of the device. A second user can walk the first user through menus, provide settings and other inputs that can be entered by the first user, and/or give any other instruction in a way that previously would have required a live visit from the second user. Instead of asking the first user to explain what they see on the screen, the second user will have a live view of the screen on the smart-home device, which can eliminate confusion and requiring the first user to verbally describe what they visually see in an accurate manner.

The following figures provide additional examples of how the visualization application can aid in installation, troubleshooting, and/or customer service scenarios. Visual and/or textual elements that are added to the display of the smart phone 166-2 will be understood to be generated either automatically by the visualization application, or remotely by a second user viewing the images captured by the smart phone 166-2. Therefore, any information displayed and/or provided by the smart phone 166-2 can be generated automatically by visualization application without any human interference using computer vision algorithms, pre-existing libraries, and/or visualizations as described above. Alternatively or additionally, any information displayed and/or provided by the smart phone 166-2 can also be generated by a second user using a second computing device that is connected to a real-time video feed captured by the smart phone 166-2. For example, the text 2402 and/or the arrows 2404 can be generated automatically by the visualization application, and a live second user can simultaneously provide additional visual indicators (e.g., additional arrows) on the screen along with live verbal instructions. Therefore, the automatic operations of the visualization application can be combined in real-time with live interactions from a second user from a second computing device. Again, these examples use the back plate 2302 of the thermostat and the smart phone 166-2 merely as examples and are not meant to be limiting. One having skill the art will understand in light of this disclosure that the same techniques can be applied to any type of smart-home device using any mobile device to provide the visualization application.

Figure 25:
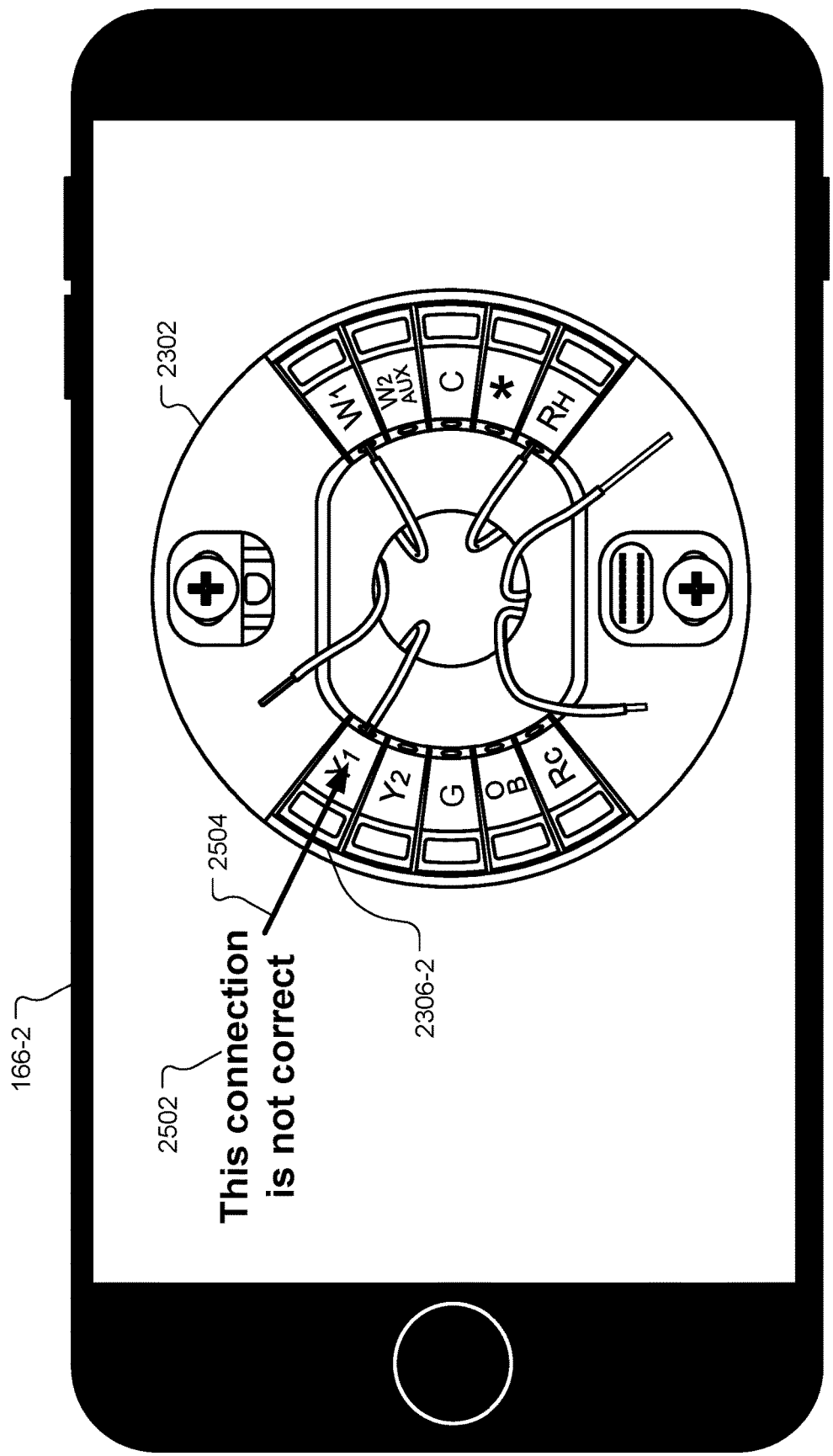
FIG. 25 illustrates how the visualization application can identify mistakes made by the user during the installation process, according to some embodiments.

FIG. 25 illustrates how the visualization application can identify mistakes made by the user during the installation process, according to some embodiments. As described above, the visualization application can identify the function associated with different wires by virtue of their colored insulation. The function of each wire can then be used to determine whether or not the wire was inserted into the correct wiring receptacle by the user. Some users may not want step-by-step instructions during the installation process, as they may be comfortable with wiring the smart-home device themselves. However, they may benefit from this error-checking feature that ensures that their installation was correct.

In this example, the user may have inserted a wire into the wiring receptacle 2306-2 on their own, with or without the help of augmented reality visualizations, text, arrows, and/or live interaction with another user as described above. When the user holds the smart phone 166-2 in front of the smart-home device 2302, the visualization application can analyze the image captured by the camera of the smart phone 166-2. Specifically, the visualization application can identify the different wires and their functions by virtue of their color or other visual characteristics, such as location, length, thickness, gauge, etc. The visualization application can then determine whether the wires were inserted correctly by comparing the visual path of the wire and the detected location of the wiring receptacles.

If it is determined by the visualization application that a wire has been inserted incorrectly into at least one of the wiring receptacles, the visualization application can generate an error message. In this example, the visualization application may generate text 2502 indicating that the specified connection is not correct. The visualization application may also generate an arrow to indicate the specific wiring receptacle 2306-2 that is incorrectly connected. Although not shown explicitly in FIG. 25, some embodiments may provide additional instructions, including visual/audible/tactile indications of an error (e.g., a buzzing sound, a vibration, etc.). Some embodiments may then generate additional text, arrows, animations, outlines, highlights, and so forth, that indicate how to correct the wiring error. For example, some embodiments may display an animation of the arrow 2504 moving from the incorrect wiring receptacle 2306-2 to the correct wiring receptacle. Some embodiments may generate explicit text, such as, "Move this wire to the $Y_2$ wiring receptacle."

In some embodiments, when a wiring or other installation error is detected by the visualization application, the visualization application can contact a second user through a second computing device. For example, the visualization application can automatically connect to an installation professional on a second computing device. The live video feed from smart phone 166-2 along with the details of the detected errors and/or the text 2502 and arrows 2504 displayed on the screen can be transmitted in real-time to the second computing device. The second user can then communicate with the first user through a live audio and/or video feed. For example, the second user can speak into a microphone of the second computing device, and their verbal instructions can be transmitted and broadcast through the speaker of the mobile phone 166-2 to guide the first user through the installation process to fix the wiring error. In another example, a pop-up window may appear on the display of the smart phone 166-2 displaying a live video of the second user explaining how to correct the wiring error. In some embodiments, this connection to the second user may be automatic, while in other embodiments, this connection to the second user may be displayed as an option when the wiring error is detected. For example, the visualization application can display the indication of the error for the first user, and then provide an option to connect to the second user if additional help correcting the wiring error is needed. The first user can tap/click a help button provided by the visualization application to connect to the second computing device.

Figure 26:
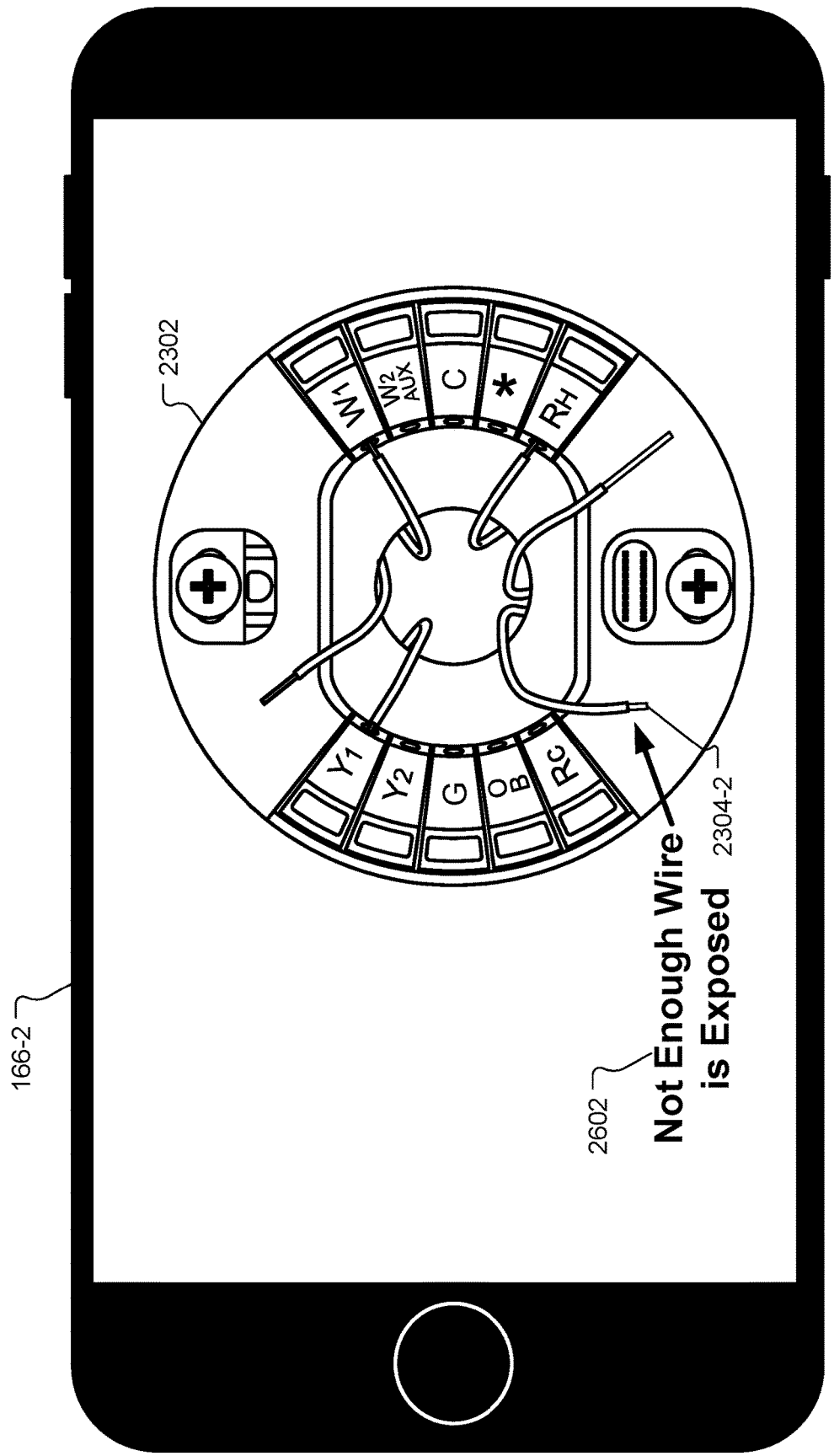
FIG. 26 illustrates an example of the visualization application detecting a wire that is not properly trimmed, according to some embodiments.

Other types of errors can also be readily detected by the visualization application by visually analyzing the wiring, wiring receptacles, and/or any connections may thereby. FIG. 26 illustrates an example of the visualization application detecting a wire that is not properly trimmed, according to some embodiments. In this example, the visualization application can visually identify the difference between the internal copper wiring and the external insulation of a wire. To properly install a wire into one of the wiring receptacles, the amount of copper wiring exposed from the installation may need to fall within a specific range, such as between ⅜ inches and ¼ inches. If not enough of the copper wire is exposed, the wire may not seat properly in the wiring receptacle. This may be a difficult problem to detect visually after installation is complete, as it may look to the user like the wire is properly inserted while the internal connection is actually deficient. Conversely, if too much of the copper wire is exposed, then it is possible to create an inadvertent short circuit with a wire in a neighboring wiring receptacle.

The visualization application can detect either of these situations prior to installation to alert the user and prevent the technical problems of insufficient electrical connections and/or inadvertent short circuits. As described above, the visualization application can detect and isolate images of individual wires using computer vision algorithms. The visualization application can also distinguish between the insulation and the internal copper wiring of a wire based on the color, gauge, reflectivity, and/or other visual characteristics that distinguish the insulation from the copper wiring. The visualization application can then estimate a measurement of the exposed copper wiring based on the known dimensions of the smart-home device 2302. For example, at the beginning of the installation process, the user can specify the particular type of smart-home device being installed. In this example, the user can specify that they are installing a thermostat. Based on that indication, the visualization application can retrieve the known dimensions of the back plate 2302 of the thermostat. Based on the known diameter of the backplate 2302, the visualization application can then estimate the length of the exposed copper wiring using a proportional comparison between the known dimension of the backplate 2302 and the relative length of the exposed copper wiring and the diameter of the back plate 2302 in the visual image captured by the camera.

If it is determined that not enough copper wiring is exposed, the visualization application can automatically generate text 2602, arrows, or other visual/audible/tactile warnings indicating the problem. In this example, the text 2602 indicates that not enough wiring has been exposed on wire 2304-2. This error can be automatically detected when the back plate 2302 is brought into the view of the camera of the smart phone 166-2. This error can also be detected in response to a user requesting that the visualization application check the installation process. When such an input from the user is received, the visualization application can analyze the existing wiring connections as described above, along with the state of any wires that are yet unconnected.

In some embodiments, the visualization application can detect wires where not enough copper wiring is exposed even after they are inserted into a wiring receptacle. For example, some installations and/or wiring receptacles may be designed such that at least a portion of the internal copper wiring should be minimally exposed after the wire has been inserted. The visualization application can detect that no such minimal exposure is visually perceptible in the image captured by the camera and generate a warning to the user that they may need to disconnect the wire and trim back the insulation to ensure that the wire is properly seated in the wiring receptacle.

Figure 27:
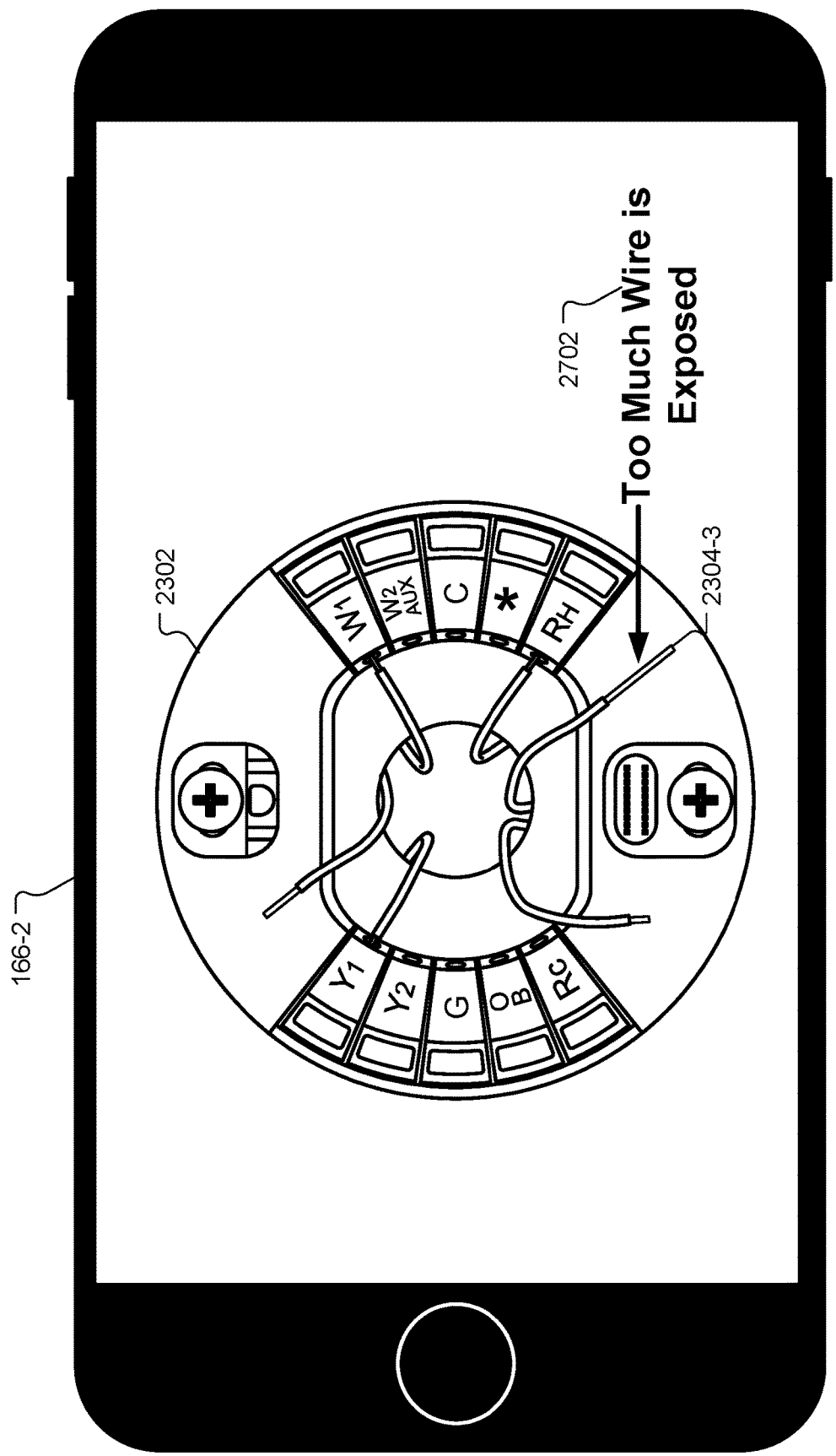
FIG. 27 illustrates how the visualization application can detect when too much wiring is exposed, according to some embodiments.

FIG. 27 illustrates how the visualization application can detect when too much wiring is exposed, according to some embodiments. As described above, the technical problem with leaving too much wire exposed is that inadvertent short circuits may be caused with neighboring wires in neighboring wiring receptacles. Using a process similar to the process for detecting when not enough copper wiring is exposed, the visualization application can identify a wire 2304-3 in the image, and using another known measurement of an object in the image, such as the back plate 2302, the visualization application can estimate the length of copper wire exposed on wire 2304-3. The estimated length can then be compared to an acceptable range in which the amount exposed copper wiring should fall for a proper installation.

If the length of the copper wiring is too long, the visualization application can generate text 2702, arrows, animations, and/or other visual/audible/tactile warnings to the user indicating the error and/or providing instructions on how to correct the error. For example, some embodiments may provide a link to a video that demonstrates how to properly trim the exposed copper wiring and/or how to properly trim back the external installation. Some embodiments may provide a link to additional information describing the problem and possible ramifications (e.g., short circuits) that may result from not correcting the error. Some embodiments may also automatically connect to a second computing device such that a second user can provide live instructions. Some embodiments may generate a control that allows a user to provide an input indicating that they wish to connect to a second computing device for live help.

Figure 28:
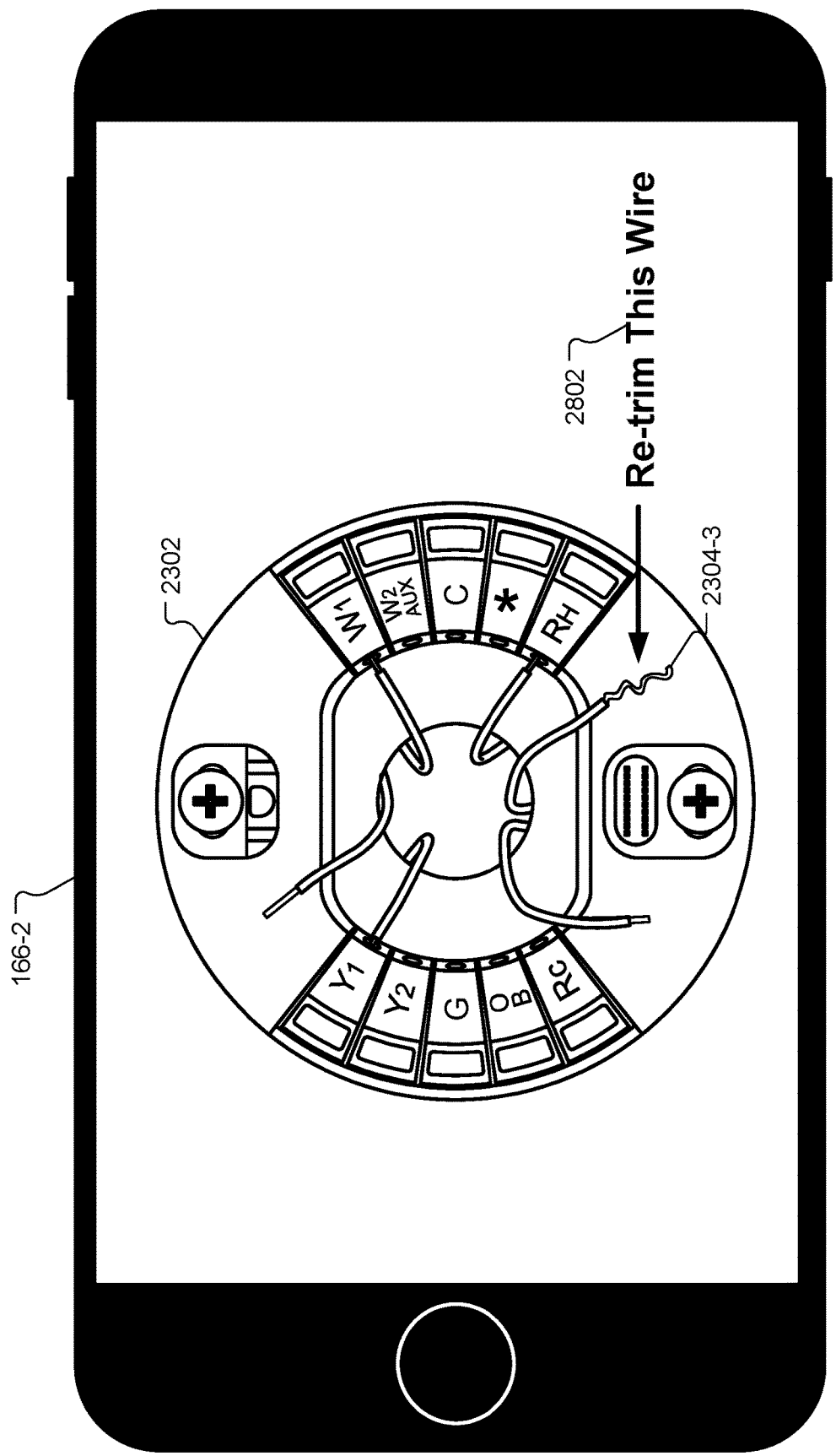
FIG. 28 illustrates a visualization application detecting a wire that needs to be re-trimmed, according to some embodiments.

FIG. 28 illustrates a visualization application detecting a wire that needs to be re-trimmed, according to some embodiments. In addition to detecting the exposure of the copper wiring, the visualization application can also examine the quality of the exposed wiring that will be inserted into the wiring receptacle. For example, the visualization application can detect the color of the exposed copper wiring, and by virtue of the color and/or color patterns, identify wires that have corrosion or other coatings that may prevent a proper electrical connection in the wiring receptacle. The visualization application can then provide instructions or links to instructions and/or live help to instruct the user on how to clean or re-trim the problematic wiring.

In this example, the wire 2304-3 may be crimped or bent in such a way that it may be difficult to properly insert the wire into the corresponding wiring receptacle. This situation can be detected by a computer vision algorithm that traces the visual path of the wire 2304-3. If the visual path in the image is not sufficiently straight or include curves/bends that are above a threshold amount, then the visualization application may generate text 2802, arrows, animations, and/or other visual/audible/tactile indications alerting the user to the error. The visualization application can then provide instructions or links to instructions/live help to instruct the user on how to clean or re-trim the problematic wiring.

Figure 29:
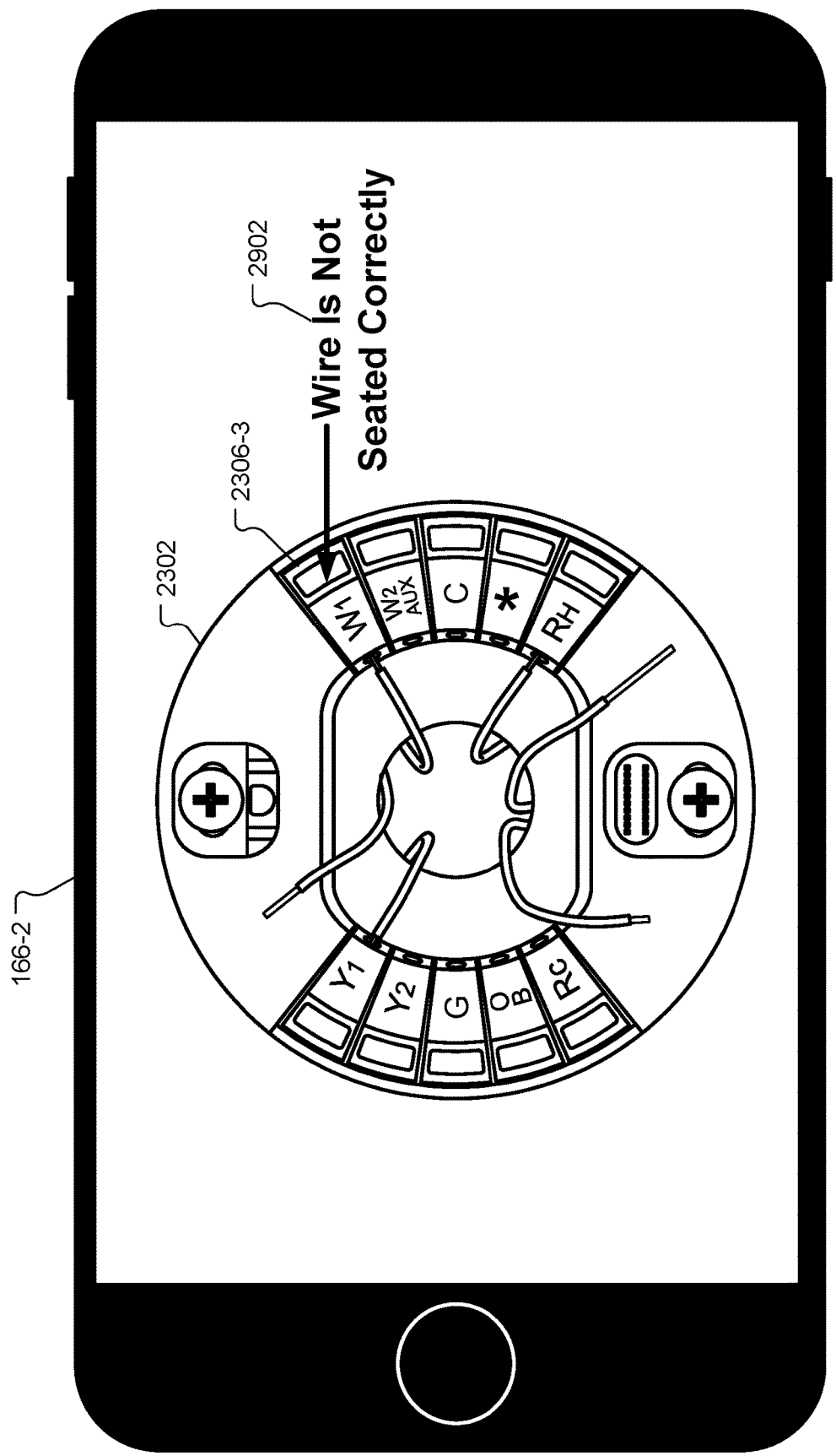
FIG. 29 illustrates the visualization application detecting a wire that is inserted into the correct wiring receptacle, but not seated correctly, according to some embodiments.

FIG. 29 illustrates the visualization application detecting a wire that is inserted into the correct wiring receptacle, but not seated correctly, according to some embodiments. In this example, the wire may visually appear to be inserted correctly into the wiring receptacle 2306-3. However, the wire may be inserted at an improper angle or otherwise not properly seated such that a reliable electoral connection my not be made inside the wiring receptacle 2306-3. Some embodiments of smart-home devices may include wiring receptacles with a push-button control that allows the wire to be inserted. For example, the user can press the push-button control, which will open a connector inside the wiring receptacle and allow the wire to be inserted therein. When the push-button control is released, the connector will clamp the wire in place such that it cannot easily be removed without again engaging the push-button control.

In this example, the wire may have been inserted in such a way that the push-button control did not properly release and clamp the wire in place. The visualization application can detect such a scenario by comparing the visual height of the push-button control of the wiring receptacle 2306-3 with neighboring wiring receptacles. If the visual height of the push-button control is significantly lower than the visual height of the push-button controls of neighboring wiring receptacles, then the visualization application can alert the user that the wire may not be seated correctly. The visualization application can generate text 2902, arrows, animations, and/or other visual/audible/tactile indications that an error may be present. As described above, the visualization application can also link to videos, webpages, and/or live instructions describing how to correct the problem.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method for optimizing placement of smart-home devices, the method comprising:
    capturing, by a camera of a mobile computing device, a view of an installation location for a smart-home device, wherein the mobile computing device comprises a display;
    rendering, by the mobile computing device, a view of a virtual object that represents a real-world obstruction that will interfere with operation or installation of the smart-home device; and
    displaying, by the mobile computing device, the view of a virtual object that represents real-world obstruction with the view of the installation location on the display of the mobile computing device.

2. The method of claim 1, wherein the real-world obstruction comprises a stud inside of a wall behind the installation location for the smart-home device.

3. The method of claim 1, wherein the real-world obstruction comprises a pipe inside of a wall behind the installation location for the smart-home device.

4. The method of claim 1, wherein the real-world obstruction comprises an electrical wire inside of a wall behind the installation location for the smart-home device.

5. The method of claim 1, further comprising receiving a location of the real-world obstruction from a scanning device configured to sense solid objects within a wall behind the installation location for the smart-home device, wherein the scanning device records locations of real-world obstructions as the scanning device is moved across the wall.

6. The method of claim 1, further comprising receiving a location of the real-world obstruction from an architecture plan of an enclosure.

7. The method of claim 1, further comprising determining a location of the real-world obstruction based on a predetermined spacing between studs in a wall behind the installation location for the smart-home device.

8. A mobile computing device comprising:
    one or more processors;
    one or more memory devices storing instructions that, when executed by the one or more processors, cause the mobile computing device to perform operations comprising:
        capturing, by a camera of a mobile computing device, a view of an installation location for a smart-home device, wherein the mobile computing device comprises a display;
        rendering, by the mobile computing device, a view of a virtual object that represents a real-world obstruction that will interfere with the operation or installation of the smart-home device; and
        displaying, by the mobile computing device, the view of a virtual object that represents real-world obstruction with the view of the installation location on the display of the mobile computing device.

9. The mobile computing device of claim 8, wherein the mobile computing device comprises a smart phone.

10. The mobile computing device of claim 8, wherein the real-world obstruction comprises a plume of air generated from a vent.

11. The mobile computing device of claim 10, wherein the virtual object comprises an effect object representing turbulent air.

12. The mobile computing device of claim 8, wherein the operations further comprise:
  receiving, by the mobile computing device, a selection by a user of an object in the view of the installation location; and
  generating the view of the virtual object in response to the selection by the user, wherein the virtual object is associated with the object in the view of the installation location.

13. The mobile computing device of claim 8, wherein the view of the installation location comprises a window, and the real-world obstruction comprises sunlight incident on the smart-home device.

14. The mobile computing device of claim 8, wherein the operations further comprise:
  determining a new installation location that avoids the real-world obstruction; and
  displaying an indication of the new installation location on the display of the mobile computing device.

15. A non-transitory computer-readable medium comprising instructions that, when executed by one or more processors, cause the one or more processors to perform operations comprising:
  capturing, by a camera of a mobile computing device, a view of an installation location for a smart-home device, wherein the mobile computing device comprises a display;
  rendering, by the mobile computing device, a view of a virtual object that represents a real-world obstruction that will interfere with the operation or installation of the smart-home device; and
  displaying, by the mobile computing device, the view of a virtual object that represents real-world obstruction with the view of the installation location on the display of the mobile computing device.

16. The non-transitory computer-readable medium of claim 15, wherein the smart-home device comprises a thermostat.

17. The non-transitory computer-readable medium of claim 15, wherein the virtual object is rendered as part of a virtual 3-D scene from a perspective of a virtual camera that corresponds to a position of the mobile computing device in the 3-D virtual scene.

18. The non-transitory computer-readable medium of claim 15, wherein rendering the view of the virtual object comprises clipping a portion of the view of the virtual object based on an object within a field-of-view of the smart-home device.

19. The non-transitory computer-readable medium of claim 15, wherein the real-world obstruction comprises an obstruction to a field-of-view of the smart-home device.

20. The non-transitory computer-readable medium of claim 19, wherein the smart-home device comprises a motion sensor, the field-of-view of the smart-home device comprises an area in which the motion sensor can detect motion, and the real-world obstruction comprises an object that blocks the field-of-view of the motion sensor.

* * * * *